United States Patent
Allen et al.

(10) Patent No.: US 11,296,981 B2
(45) Date of Patent: *Apr. 5, 2022

(54) SERVERLESS PACKET PROCESSING SERVICE WITH CONFIGURABLE EXCEPTION PATHS

(71) Applicant: Amazon Technologies, Inc., Seattle, WA (US)

(72) Inventors: Stewart Allen, Seattle, WA (US); Andrew Davenport, Bellevue, WA (US); Ciprian Dan Cosma, Seattle, WA (US); Anthony Nicholas Liguori, Bainbridge Island, WA (US); Joseph Elmar Magerramov, Bellevue, WA (US); Nachiappan Arumugam, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,720

(22) Filed: Jun. 24, 2019

(65) Prior Publication Data

US 2020/0403912 A1   Dec. 24, 2020

(51) Int. Cl.
*H04L 12/721*   (2013.01)
*H04L 45/00*   (2022.01)
(Continued)

(52) U.S. Cl.
CPC .......... *H04L 45/38* (2013.01); *G06F 9/45558* (2013.01); *H04L 47/822* (2013.01);
(Continued)

(58) Field of Classification Search
CPC ... H04L 45/38; H04L 47/822; G06F 9/45558; G06F 2009/45587; G06F 2009/45595
See application file for complete search history.

(56) References Cited

U.S. PATENT DOCUMENTS

| | | | |
|---|---|---|---|
| 6,993,021 B1 | 1/2006 | Chuah et al. | |
| 7,522,601 B1 * | 4/2009 | Morrow | H04L 45/00 370/392 |

(Continued)

FOREIGN PATENT DOCUMENTS

| | | |
|---|---|---|
| CN | 102598591 | 7/2012 |
| EP | 1298853 | 4/2003 |

OTHER PUBLICATIONS

"A Brief Primer on Anycast", Matthew Prince, Oct. 21, 2011, pp. 1-4.

(Continued)

*Primary Examiner* — Noel R Beharry
*Assistant Examiner* — Chuong M Nguyen
(74) *Attorney, Agent, or Firm* — Robert C. Kowert; Kowert, Hood, Munyon, Rankin & Goetzel, P.C.

(57) ABSTRACT

Indications of packet processing operations to be performed for packets of a resource group, as well as configuration settings of the group, are obtained. A packet that satisfies a requirement of the configuration settings and meets a fast path criterion is processed at a fast path node configured for the group. In response to determining that another packet does not satisfy a criterion for fast path processing, the other packet is transmitted to an exception path target.

20 Claims, 25 Drawing Sheets

(51) Int. Cl.
*H04L 47/70* (2022.01)
*G06F 9/455* (2018.01)
(52) U.S. Cl.
CPC .............. *G06F 2009/45587* (2013.01); *G06F 2009/45595* (2013.01)

(56) References Cited

U.S. PATENT DOCUMENTS

| | | | |
|---|---|---|---|
| 7,782,782 B1 | 8/2010 | Ferguson et al. | |
| 7,865,586 B2 | 1/2011 | Cohn | |
| 8,244,909 B1 | 8/2012 | Hanson et al. | |
| 8,331,371 B2 | 12/2012 | Judge et al. | |
| 8,358,658 B2 | 1/2013 | Flynn et al. | |
| 8,478,896 B2 | 7/2013 | Ehlers | |
| 8,693,470 B1 | 4/2014 | Maxwell et al. | |
| 9,384,029 B1* | 7/2016 | Brandwine | G06F 9/45558 |
| 9,934,273 B1 | 4/2018 | MacCarthaigh | |
| 9,935,829 B1 | 4/2018 | Miller et al. | |
| 9,998,955 B1 | 6/2018 | MacCarthaigh | |
| 10,097,454 B1 | 10/2018 | MacCarthaigh | |
| 10,931,629 B2 | 2/2021 | Chander et al. | |
| 2001/0037406 A1* | 11/2001 | Philbrick | H04L 67/325 709/250 |
| 2002/0083297 A1* | 6/2002 | Modelski | G06F 9/30145 712/18 |
| 2003/0198189 A1* | 10/2003 | Roberts | H04L 45/00 370/252 |
| 2006/0251088 A1 | 11/2006 | Thubert et al. | |
| 2007/0115990 A1 | 5/2007 | Asati et al. | |
| 2008/0005441 A1 | 1/2008 | Droux et al. | |
| 2008/0225875 A1 | 9/2008 | Wray et al. | |
| 2009/0132552 A1* | 5/2009 | Adya | G06F 16/957 |
| 2010/0074256 A1 | 3/2010 | Seok et al. | |
| 2010/0094990 A1 | 4/2010 | Ben-Yehuda et al. | |
| 2010/0281181 A1 | 11/2010 | Johnson et al. | |
| 2013/0086279 A1 | 4/2013 | Archer et al. | |
| 2014/0169168 A1 | 6/2014 | Jalan et al. | |
| 2014/0282849 A1* | 9/2014 | Collison | H04W 12/68 726/1 |
| 2015/0012917 A1 | 1/2015 | Jiang et al. | |
| 2015/0194215 A1* | 7/2015 | Douglas | H04L 45/7453 711/108 |
| 2015/0195178 A1 | 7/2015 | Bhattacharya et al. | |
| 2016/0094668 A1 | 3/2016 | Chang et al. | |
| 2016/0261723 A1 | 9/2016 | Bergeron | |
| 2016/0344798 A1 | 11/2016 | Kapila | |
| 2016/0352620 A1 | 12/2016 | Schmutzer et al. | |
| 2017/0366605 A1 | 12/2017 | Chang et al. | |
| 2018/0302277 A1 | 10/2018 | Shimamura et al. | |
| 2019/0140983 A1 | 5/2019 | Tu et al. | |
| 2019/0386891 A1* | 12/2019 | Chitalia | H04L 41/22 |
| 2020/0106744 A1* | 4/2020 | Miriyala | H04L 47/2475 |
| 2020/0145331 A1 | 5/2020 | Bhandari et al. | |
| 2020/0274952 A1 | 8/2020 | Waskiewicz et al. | |

OTHER PUBLICATIONS

"Amazon Elastic Compute Cloud", User Guide for Linux, API Version, Jun. 15, 2014, pp. 1-684.

Amazon Web Services, "Shuffle Sharding: massive and magical fault isolation", http://www.awsarchitectureblog.com/2014/04/shuffle-sharding.html, Sep. 17, 2014, pp. 1-6.

Costin Raiciu, et al "Improving Datacenter Performance and Robustness with Multipath TCP" SIGCOMM'11, Aug. 15-19, 2011, pp. 1-12.

Albert Greenberg, et al "VL2: A Scalable and Flexible Data Center Network" Communications of the ACM, vol. 54, No. 3, Mar. 2011, pp. 1-10.

Chuanxiong Guo, et al "BCube: A High Performance, Server-centric Network Architecture for Modular Data Centers" SIGCOMM'09 Aug. 17-21, pp. 1-12.

"On the Impact of Packet Spraying in Data Center Networks", Advait Dixit, et al., 2013, pp. 1-9.

U.S. Appl. No. 14/736,165, filed Jun. 10, 2015, Colm Mac-Carthaigh.

Masahiro Satou, et al., "Server Side Networking for Cloud Data Centers", 2012 IEEE 1st International Conference on Cloud Networking (CLOUDNET), Nov. 28, 2012, pp. 17-22.

Kapil Bakshi, "Considerations for Software Defined Networking (SDN): Approaches and Use Cases", AEROSPACE Conference, 2013 IEEE, Mar. 2, 2013, pp. 1-9.

U.S. Appl. No. 16/136,142, filed Sep. 19, 2018, Paul John Tillotson, et al.

U.S. Appl. No. 16/136,138, filed Sep. 19, 2018, Paul John Tillotson, et al.

U.S. Appl. No. 16/136,137, filed Sep. 19, 2018, Paul John Tillotson, et al.

U.S. Appl. No. 16/136,133, filed Sep. 19, 2018, Paul John Tillotson, et al.

U.S. Appl. No. 16/136,131, filed Sep. 19, 2018, Paul John Tillotson, et al.

* cited by examiner

SERVERLESS PACKET PROCESSING SERVICE WITH CONFIGURABLE EXCEPTION PATHS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment. As demand for virtualization-based services at provider networks has grown, more and more networking and interconnectivity-related features may have to be added to meet the requirements of applications being implemented using the services.

Figure 1:
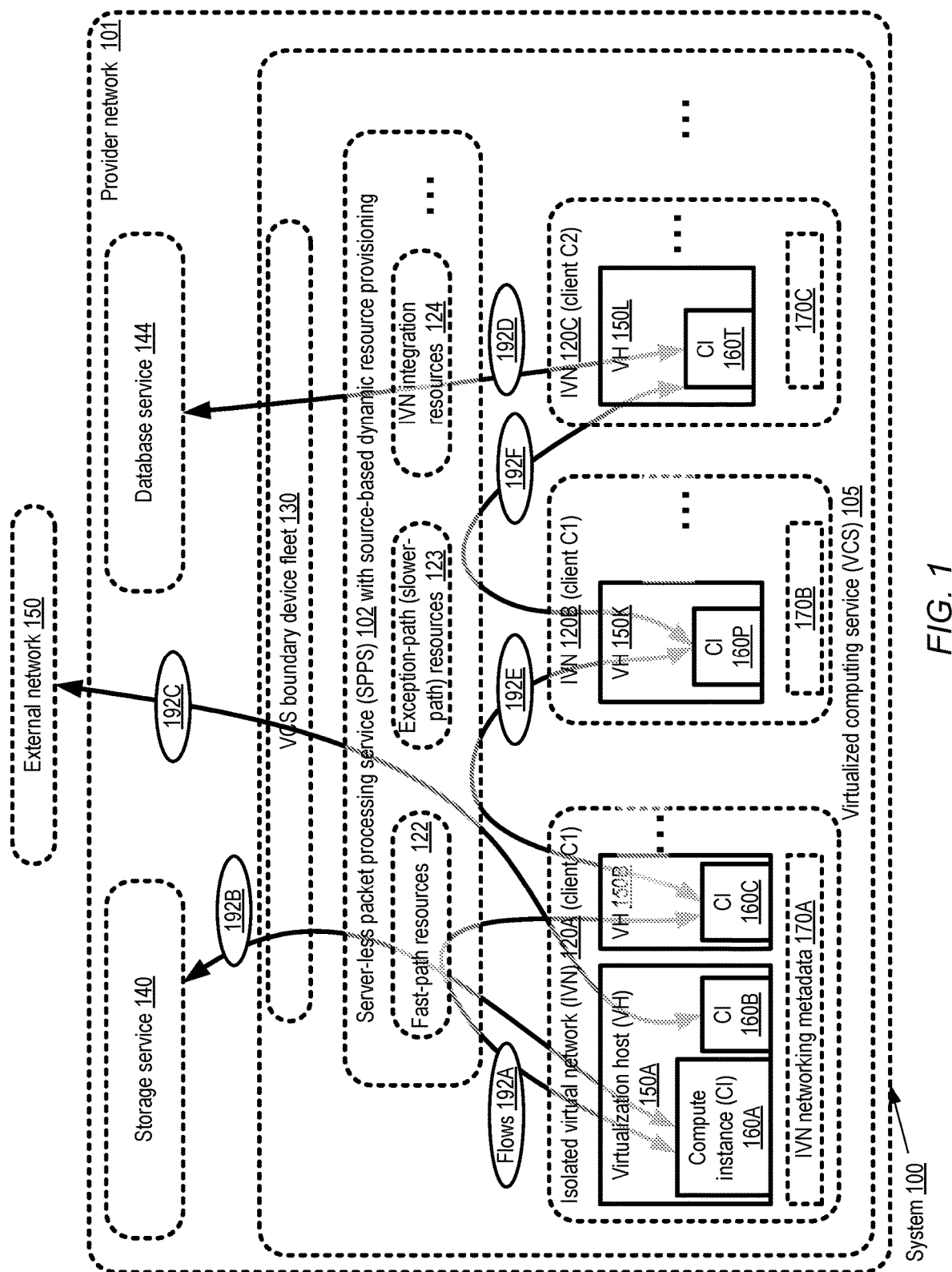
FIG. 1 illustrates an example system environment in which a packet processing service may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for implementing a packet processing service at which customer-designed pipelines for packet processing operations, associated with traffic sources or destinations that are configured within isolated virtual networks of a provider network, may be executed using dynamically provisioned and programmed service nodes. Networks set up by an entity such as a company or a public sector organization to provide one or more network-accessible services (such as various types of cloud-based computing, storage or analytics services) accessible via the Internet and/or other networks to a distributed set of clients may be termed provider networks. A provider network may sometimes be referred to as a "public cloud" environment. Within a provider network, in some embodiments, groups of resources may be configured as isolated virtual networks on behalf of respective clients. As indicated by the name, an isolated virtual network (IVN) may be logically isolated from the rest of the provider network (and other networks outside the provider network) with respect to various aspects of network configuration—for example, internal or "private" IP addresses may be assigned to resources of a given IVN independently of the addresses assigned within other networks, security settings of a given IVN may restrict the sources and destinations with which resources of the IVN may communicate, and so on.

A packet processing service as described herein can be used for implementing a variety of applications including load balancing, policy-based routing, network address translation, and intrusion detection. The disclosed packet processing service can comprise a plurality of nodes in various embodiments, divided into two high-level categories: control plane nodes and data plane nodes. Control plane nodes can be responsible for administrative tasks such as provisioning, propagation of changes to metadata used for packet processing operations, and so on, while data plane nodes can be responsible primarily for processing packets received at the service. The data plane nodes may be further subdivided into fast-path processing nodes and slower-path processing nodes, with fast-path nodes being used (ideally) for the vast majority of packets received, and slower-path nodes being used for less frequent operations as discussed below in further detail. The slower-path nodes may be referred to as "exception-path" nodes in at least some embodiments, as they may only be expected to be used relatively infrequently (i.e., in scenarios that may be considered exceptional rather than common). In at least some embodiments, at least some data plane nodes of the service may be provisioned or assigned dynamically to traffic endpoints, e.g., without requiring a client to submit requests to set up the nodes. As such, from the perspective of the clients of the packet processing service, the service may be considered "server-less" in such embodiments, in that the clients may not have to concern themselves with details regarding service node establishment, health monitoring of service nodes, scaling up or scaling down of the fleet of nodes that are used on the clients' behalf, and so on. A server-less packet processing service may transparently support desired levels of scalability, availability and reliability for various types of packet processing tasks in different embodiments.

At a high level, at least two categories of clients may utilize a server-less packet processing service (SPPS) in various embodiments. A first category may comprise application vendors, who wish to utilize the SPPS to present various types of sophisticated networking-related applications to their own end customers, and a second category may comprise such end customers themselves. For example, a packet processing application vendor may design a complex packet processing pipeline that is able to detect attempted network attacks very rapidly (e.g., using sophisticated pattern matching or machine learning algorithms), and use the SPPS to implement virtual appliances that are able to implement such pipelines. End users, such as business entities which have set up their own networks within the provider network and/or at external premises, may request that instances of such virtual appliances be configured to help protect their networks. Similarly, also using SPPS nodes, other vendors may offer advanced load balancing appliances, appliances for network address translation, appliances that can be used by telecommunication organizations to manage per-user bandwidth usage, and so on. In many cases, the end users of such appliances may have respective isolated virtual networks (IVNs) set up within the provider network at which the SPPS is implemented, and the appliances may be utilized for traffic generated at or directed to compute instances within such IVNs. By design, the SPPS may be tightly integrated with the IVN infrastructure in at least some embodiments—e.g., packet processing operations for implementing and enforcing IVN configuration requirements (e.g., security rules selected by the clients on whose behalf the IVNs have been set up, routing rules of the IVNs, and the like) may be implemented transparently, together with vendor-supplied packet processing pipelines that implement the appliance logic. In various embodiments, packet processing appliance vendors as well as their end users may be able to benefit from the seamless scalability, availability, and reliability of an SPPS, while the deep integration of the SPPS with IVN configuration management may ensure that all IVN-related security and routing rules will be automatically enforced as well (without requiring the vendors to explicitly integrate the security and routing rules with their appliances). As and when IVN configurations of the traffic sources and/or destinations are changed, the SPPS may automatically be notified of the changes, and corresponding changes may be made to packet processing programs being implemented at the SPPS nodes in various embodiments. Packet processing application vendors as well as end users may not need necessarily even be aware of IVN configuration-related packet processing tasks being performed at the SPPS in some embodiments.

As one skilled in the art will appreciate in light of this disclosure, certain embodiments may be capable of achieving various advantages and practical applications/benefits, including some or all of the following: (a) enabling very high volumes of message traffic to be processed efficiently in accordance with customizable packet processing application pipelines, using automatically scaled fleets of packet processing nodes, (b) enhancing the security of packet processing applications, e.g., by automatically enforcing security-related settings of isolated virtual networks set up on behalf of end users of such applications, without requiring the providers/vendors of the application pipelines to incorporate the security-related settings into their pipelines and/or (c) enhancing the user experience of administrators and packet processing application vendors, by eliminating the need for such users to request provisioning of packet processing resources or to manually incorporate isolated network configuration settings into packet processing applications.

According to some embodiments, a system may comprise one or more computing devices of a "server-less" packet processing service (SPPS). The devices may include instructions that upon execution on or across one or more processors cause the devices to obtain, via one or more programmatic interfaces, a request to establish a packet processing pipeline for network traffic of a set of resources of an isolated virtual network (IVN) of a virtualized computing service (VCS). The packet processing pipeline may comprise one or more stages, and respective instances of the pipeline may be exposed in the form of virtual appliances in at least some embodiments. For at least one stage of the pipeline, the request may indicate at least one rule. Any combination of one or more different types of rules may be used at a pipeline stage—e.g., some rules may involve looking up and performing actions (e.g., executable programs or functions) within tables using keys derived from the headers of received packets, other rules may simply involve execution of specified programs, and so on. The programs and/or rules may, for example, be expressed using an efficient low-level programming language or framework custom-designed for packet processing tasks, such as eBPF (extended Berkeley Packet Filter). The request may not specify specific resources to be used to implement the pipeline in various embodiments. The instructions when executed may identify, based at least in part on a number of traffic sources within the isolated virtual network, a plurality of fast path packet processing nodes (FPPNs) for the network traffic of the set of resources. Each such (FPPN) may be implemented using a combination of hardware and software in various embodiments.

The programs and/or rules indicated in the pipeline establishment request may be deployed or pushed to one or more of the FPPNs, where they may be stored in respective caches for handling subsequent packets belonging to the same flow (where a given flow may be distinguished from other flows based on a tuple comprising source and destination addresses and ports, for example). In at least some embodiments one or more network configuration operations may be performed, e.g., in response to a programmatic request, to establish a traffic entry point and/or exit point of the pipeline. For example, one or more virtual network interfaces may be configured as entry or exit points in one embodiment. In response to the arrival of a particular packet an entry point, one or more packet processing operations may be performed in accordance with a security-related configuration setting of the IVN in some embodiments; such packet processing operations may not necessarily be included as part of the pipeline for which the request was received earlier. The rules corresponding to respective stages of the deployed pipeline may be applied for the received packet, e.g., one or more eBPF programs may be executed with respect to the received packet at one or more stages. Based at least in part on the result of the application of the rules, and/or a routing configuration setting of the IVN, one or more routing-related actions with respect to the received packet may be implemented in various embodiments. Any of several different types of routing actions may be implemented, based on the logic of the pipelines and the configuration settings of the IVN—e.g., in some cases at least one packet corresponding to the received packet (such as a re-written or modified version of the received packet) may be transmitted to a destination via an exit point of the pipeline, while in other cases the received packet may simply be dropped without sending any corresponding packets towards a destination.

In at least some embodiments, control plane elements of the SPPS may detect when traffic sources or destinations (e.g., compute instances such as guest virtual machines) are added to or removed from the IVN. In response to a configuration of some number of additional traffic destinations or sources, one or more additional SPPS nodes (e.g., FPPNs, and/or other slower-path packet processing nodes) may be automatically configured in such embodiments. Similarly, if/when traffic destinations or sources are decommissioned or removed from the IVN, in some embodiments the number of SPPS nodes assigned to the IVN may be reduced. In at least some embodiments, as mentioned above, the count of SPPS nodes may be determined based at least in part on the number of traffic sources rather than destinations. As such, unlike in some conventional load balancers or other packet processing applications, the SPPS node count may be scaled up or down based on the number of sources from which traffic may have to be processed, not on the number of destinations of the traffic. In one embodiment, a shuffle sharding algorithm may be used to map traffic sources (e.g., compute instances or virtualization host from which traffic is to be processed) to SPPS nodes, such that distinct but potentially overlapping subsets of the SPPS nodes available at an IVN are assigned to process traffic from respective sources. In some embodiments, one set of SPPS nodes may be assigned for processing inbound traffic directed to a given set of compute instances or other resources, and a different (but potentially overlapping) set of SPPS nodes may be assigned for processing outbound traffic originating at the same set of compute instances or resources.

In some embodiments, locality considerations may be used to select the specific SPPS nodes assigned to a particular traffic source or destination. As suggested by the term "fast-path", one of the objectives of the SPPS may include performing desired types of packet processing very efficiently, resulting in the smallest practicable latency for the transmission of traffic. Accordingly, in embodiments in which the sources/destinations of traffic are distributed among numerous racks of a data center, respective sets of FPPNs may be pre-configured (e.g., in advance of actual requests to set up packet processing pipelines) at computing devices located at a plurality of selected racks that are placed in numerous approximately uniformly distributed positions within the data center. When a packet processing pipeline is to be set up (e.g., as an instance of a virtual appliance) for traffic of one or more compute instances, and the compute instances are located on hosts of racks R1, R2 and R3, FPPNs that happen to be configured on racks R4 and R5, which happen to be relatively close to R1, R2 and R3, may be assigned to the compute instances. As such, the proximity of the devices at which the FPPNs have been pre-configured to the devices which represent sources/destinations of the packets to be processed may be taken into account when assigning FPPNs to pipelines in some embodiments. Note that the assignments of SPPS nodes (including FPPNs) to traffic sources/destinations may be dynamically modified over time in some embodiments, e.g., based on workload changes and other factors.

Any of a wide variety of execution platforms may be used for FPPNs and/or other SPPS nodes in different embodiments, including for example compute instances running at virtualization hosts of a virtualized computing service, non-virtualized hosts, special purpose hardware servers with one or more cards attached via a peripheral interconnect (e.g., a PCIe or Peripheral Component Interconnect express interconnect), with the packet processing programs/rules being executed at the cards, and so on. According to some embodiments, the SPPS nodes used for a pipeline instance set up for traffic generated at or directed one or more end-user IVNs may themselves be configured within another IVN—that is, IVNs may be used for SPPS nodes as well as for the traffic sources and destinations. In at least some embodiments, groups of SPPS nodes may be configured as respective independently-updated and independently-configured cells, such that if a failure event occurs within a given cell, the impact of the failure cannot cross the cell boundary and affect other cells. When a software, firmware or hardware update is to be applied in such a cell-based embodiment, the update may only be propagated to the nodes (e.g., FPPNs) of one cell at a time. Prior to propagating the update to another cell, the SPPS control plane may attempt to verify that the cell to which the update was applied meets a stability criterion (e.g., that there has not been an increase in dropped packets, or other undesirable metrics, for packet processing pipelines being implemented using the updated cell).

As mentioned earlier, in at least some embodiments, programs and/or rules associated with packet processing stages may be cached at FPPNs. If a packet is received at an FPPN, such that the FPPN cannot find an entry applicable to the packet in its cache, the FPPN may submit a query to a slower-path packet processing node (SPPN), indicating a cache miss. Several different types of SPPNs may be configured as part of the SPPS data plane in various embodiments, including nodes that are primarily responsible for IVN configuration-related packet processing, nodes that make vendor-supplied packet processing pipeline-based decisions in response to cache misses, as well as nodes that comprise repositories for storing persistent state information associated with the processing of various network flows. One or more of the SPPNs may decide the specific packet processing actions to be taken for the packet that resulted in a cache miss (as well as for subsequent packets of the same flow in some cases) at the FPPN. If possible, an entry that can be cached at the FPPN (for use with respect to subsequent packets of the same flow, for example), may be transmitted to the FPPN from an SPPN in some embodiments. In some cases, state information stored in a repository accessible from the SPPNs (for example, state information that was generated in response to an earlier cache miss from a different FPPN) may be used to respond to a given FPPN cache miss. In some embodiments, in response to a detection of a failure at a given FPPN, the workload of the failed FPPN may be assigned to one or more replacement FPPNs, and state information pertaining to the packet processing operations that were previously being performed at the failed FPPN may be obtained at the replacement FPPNs from the repository.

Configuration settings (and/or the logic used for vendor-supplied pipelines) used to determine the actions at the slower-path nodes may be modified over time in various embodiments, in which case invalidation of cache entries at the FPPNs may be required. In at least one embodiment, a timeout-based cache entry re-validation technique may be employed at one or more FPPNs. For at least some cache entries, respective timeouts may be set in such an embodiment. When a timeout expires, the FPPN may initiate a re-validation operation for the corresponding cache entry, e.g., by issuing a re-validation query to an SPPN, in effect asking the SPPN whether the entry remains valid or not. If the SPPN fails to revalidate the entry, the entry may be deleted from the FPPN cache in some embodiments. In at least one embodiment, if a cache entry is no longer valid, and the SPPN is able to generate a replacement entry that is valid, the replacement entry may be provided to the FPPN. In some embodiments, a multi-layer timeout-based scheme may be used for FPPN cache entry revalidation or replacement. According to such a scheme, both a soft timeout and a hard timeout may potentially be used for a given cache entry, with the soft timeout interval being set to a smaller value than the hard timeout interval. When a soft timeout STO1 expires at an FPPN for a cache entry CE1 for a packet flow PF1, an indication of the STO1 expiration may be provided to an SPPN (enabling the SPPN to either re-validate CE1 and start a new set of soft and hard timeout periods, or indicate that CE1 is no longer valid), but the FPPN may continue to use CE1 to process other received packets of PF1. In contrast, if/when a hard timeout HTO1 corresponding to CE1 expires, the FPPN may stop using CE1, in effect invalidating or discarding CE1 from the cache. In some embodiments, multiple soft timeout expiration indications (corresponding to several different cache entries) may be batched and send as a single message to the SPPNs to amortize the communication costs of the scheme. In embodiments in which timeout-based techniques are implemented for FPPN cache management, the SPPS clients on whose behalf the cache entries are stored may not have to explicitly request that cached entries be invalidated. For example, after the traffic of a given packet flow ceases, the corresponding cache entries may eventually be automatically invalidated based on timeout expirations.

As indicated earlier, slower-path packet processing operations (such as making decisions in response to cache misses at FPPNs) may be referred to as exception-path operations (as they are primarily intended for less frequent or "exceptional" scenarios, for which higher latencies may be acceptable) in some embodiments, and SPPNs may also be referred to as exception path nodes. According to one embodiment, an SSPN client (such as a vendor of a packet processing appliance) may specify, using one or more programmatic interfaces, a set of target resources to be used for exception-path processing for at least some packet flows reaching an instance of the appliance. Such custom target resources may, for example, comprise a set of compute instances or other computing devices of the client, at which custom packet processing operations which are not to be performed at the FPPNs of the SPPS (e.g., because of resource constraints of the FPPNs, security reasons, etc.) may be implemented. In some embodiments, the target resources for exception path processing may be indicated in the same programmatic interaction in which establishment of a packet processing pipeline (to be implemented using some number of FPPNs) is requested; in other embodiments, different programmatic requests for the pipeline and the configuration of custom exception paths may be used. A rule indicated in a pipeline may be used, e.g., at an FPPN or SPPN, to determine whether a given packet should be transmitted to such target resources in various embodiments. In some embodiments, the target exception-path packet processing resources specified by a client may be configured within a separate IVN from the IVNs at which sources/destinations of the packets are configured, and/or a separate IVN from an IVN in which at least a subset of the FPPNs/SPPNs used for the pipeline are configured. In one embodiment, at least some target resources for exception-path processing may be located at premises outside the provider network at which the majority of the SPPS resources are located.

Even in scenarios in which custom exception path processing is configured for one or more stages of a pipeline, IVN configuration related packet processing may still be performed when needed for a particular packet flow, and a set of FPPNs may be identified for the traffic to be processed, just as FPPNs are identified when custom exception path processing is not required. When a packet of a flow is received at the SPPS, the SPPS may determine whether the packet satisfies one or more IVN-related constraints such as security requirements, and reject the packet if such requirements are not satisfied. If the packet does satisfy the IVN configuration-related requirements, a determination may be made, using a rule or criterion specified for a pipeline stage, whether the packet is to be processed using fast path operations, or whether exception path processing is required for the packet. If the packet can be processed using the fast path operations (e.g., indicated via an eBPF program specified in the pipeline definition earlier), an FPPN may be used to complete the fast path processing. If non-custom exception path processing is required for the packet, one or more SPPS resources may be used; if custom exception path processing is needed, the packet may be sent to the target exception path resource specified by the SPPS client in at least some embodiments.

A wide variety of packet processing applications may be supported at an SPPS via the pipeline-based approach discussed above in different embodiments. Such applications may include (but may not be limited to), for example, implementing respective algorithms for custom or policy-driven routing, network address translation (e.g., with source address or source port substitution), multicast, cross-IVN packet transmission (transmission from one IVN to another), transferring data securely to or from a virtual private network, intrusion detection, per-user or per-group bandwidth usage tracking, load balancing, secure transmission of data between a provider network data center and a premise external to the provider network, data exfiltration detection, or implementing business logic of an application designed by a vendor. In some embodiments, an online marketplace of pre-designed pipelines implementing various types of packet processing pipelines may be supported (e.g., by the operator of a provider network at which the SPPS is implemented), and a vendor may assemble or construct new pipelines by combining pre-designed pipelines obtained from such a marketplace.

According to some embodiments, portions of the SPPS data plane may be set up at premises external to the data centers of a provider network at which the control plane of the SPPS is implemented. Metadata associated with resource groups (e.g., IVNs) of the provider network may be stored at one or more of the provider network's data centers. A set of packet processing nodes of the SPPS may be configured at a premise external to the data centers, e.g., at a co-location facility (at which resources of the provider network are co-located with resources owned by other entities), or at a client-owned facility. At an administrative or control plane component at one of the data centers of the provider network, an indication of a packet processing pipeline to be implemented for at least a subset of packets associated with the resource group may be received, e.g., via one or more programmatic interfaces in various embodiments. A representation of the packet processing pipeline may be transmitted from a data center of the provider network to the external premise, along with one or more configuration settings of the resource group. In response to detecting a particular packet at the external premise, one or more security-related operations based on the configuration settings of the resource group may be performed. Then, at one or more of the packet processing nodes established at the external premise, packet processing operations of the pipeline may be performed. At least one packet corresponding to the detected packet (e.g., a re-written or transformed version of the packet) may be transmitted towards a destination from the one or more packet processing nodes in some cases based on the results of the packet processing; in other cases, the detected packet may simply be dropped. When a configuration change that would affect packet processing operations (or that would require additional SPPS nodes at the external premise) is detected at the SPPS control plane resources within the provider network, the appropriate actions may be initiated from the SPPS control plane—e.g., the configuration changes may be propagated to the external premise, new versions of pipeline stage programs may be transmitted to the external premise, and so on. For applications that are implemented at least in part at such external premises, the ability to logically extend the SPPS data plane may be extremely beneficial, as the SPPS data plane functionality may in effect be implemented very close to the resources where the rest of the applications are run.

Example System Environment

FIG. 1 illustrates an example system environment in which a packet processing service may be implemented, according to at least some embodiments. As shown, system 100 may comprise resources and artifacts of a server-less packet processing service (SPPS) 102 which is implemented as a component of a virtualized computing service 105 at a provider network 101. As mentioned earlier, networks that provide one or more network-accessible services (such as various types of cloud-based computing, storage or analytics services) accessible via the Internet and/or other networks to a distributed set of clients may be termed provider networks in various embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

The SPPS 102 may include a collection of fast-path resources 122, exception path or slower-path resources 123 and isolated virtual network (IVN) integration resources 124 in the depicted embodiment. Source-based dynamic provisioning of data plane resources may be implemented at the SPPS 102 in the depicted embodiment: that is, for a given packet processing pipeline instance, the number of fast-path and/or slow-path resources assigned may be selected (and dynamically changed if needed) based on the number of traffic sources of the pipeline instance. Note that while data plane components of the SPPS are shown in FIG. 1, the SPPS may also comprise a set of administrative or control plane resources in various embodiments. The VCS 105 may comprise a collection of virtualization hosts 160, such as VH 150A, 150B, 105K and 150L, at each of which zero or more compute instances (CIs) 160 (such as guest virtual machines) may be running at a given point in time on behalf of VCS clients. For example, CIs 160A and 160B are running at VH 150A, CI 160P is running at VH 150K, and CI 160T is running at VH 150L.

At least some of the compute instances and other resources of the VCS 105 may be organized as a collection of isolated virtual networks (IVNs) 120 in the depicted embodiment. A given isolated virtual network, such as IVN 120A, 120B or 120C may comprise a collection of networked resources (including, for example, compute instances, virtualized and/or physical networking devices, hosts, etc.) allocated to a given client, which are logically isolated from (and by default, inaccessible from) resources allocated for other clients in other isolated virtual networks. The client on whose behalf an IVN is established may be granted substantial flexibility regarding network configuration for the resources of the IVN—e.g., private IP addresses for compute instances may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. Multiple IVNs may be set up on behalf of the same client in some embodiments. In the example scenario depicted in FIG. 1, IVNs 120A and 120B have been established for a client C1 of the VCS 105, while IVN 120C has been established for a different client C2. Note that although virtualization hosts 150 are shown as hosting compute instances within a single IVN in FIG. 1, at least some virtualization hosts may be utilized in multi-tenant mode in some embodiments—that is, a given VH 150 may be used for compute instances of several different clients and/or several different IVNs 120.

Clients of the VCS may utilize the compute instances 160 to run various types of applications in different embodiments. In some cases, the applications running at a given VH may communicate with resources elsewhere within the provider network 101, and/or resources outside the provider network 101, such as external network 150. Individual ones of the compute instances may be programmatically attached to one or more virtual network interfaces (VNIs) in the depicted embodiment, while individual ones of the virtualization hosts (and resources outside the VCS) may have physical network interface cards (NICs) configured. A given VNI may have one or more network addresses (e.g., Internet Protocol (IP) version 4 or version 6 addresses) assigned to it, and a NIC may also have one or more network addresses assigned to it. In order to transmit contents of packets from a CI 160 at a VH 150 to a destination external to the VH, an encapsulation protocol may be implemented at the VCS, which may be used to map VNI network addresses to physical NIC addresses (in addition to being used for other functions). Furthermore, for at least some network packet sequences sent from or directed to compute instances 160, packet processing actions such as load balancing, source address substitution or the like may be performed, e.g., with the help of the SPPS 102. For example, some number of the CIs 160 may be collectively used to implement a particular application App1 of client C1, and App1 service requests may have to be load balanced among the CIs.

A sequence of network packets, referred to as a packet flow, may be transmitted between a given CI 160 and one or more traffic destinations or sources using a packet processing pipeline implemented at least in part at the SPPS 102. A number of different example packet flow types are illustrated in FIG. 1; each flow may, for example, be distinguished from other flows based on an N-tuple comprising an identifier of a network protocol being used, a source network address, a source network port, a destination network address, and/or a destination network port. In some embodiments, the N-tuple used to uniquely identify a network packet flow may also comprise other elements such as an identifier of a virtual network interface used for the packets, or an indication of a direction of packet transmission. Example flows 192A may comprise packets transmitted between CIs 160A and 160C within the same IVN 120A. Flows 192B may comprise packets transmitted between CI 160A and a storage service 140 of the provider network 101, e.g., via a fleet of VCS boundary networking devices 130. Flows 192C may comprise packets sent between a CI 160B at IVN 120A and external network 150 (e.g., a client data center or a co-location facility). Flows 192D may comprise packets transmitted between a CI 160T and a database service 144. Flows 192E may include packets sent between CIs at two IVNs of the same VCS client: IVN 120A and 120B, both set up on behalf of client C1. Flows 192F may include packets transmitted between IVNs of different VCS clients: IVN 120B of client C1 and IVN 120C of client C2.

For each of these types of network flows, various types of IVN configuration settings included in IVN networking metadata 170 (e.g., metadata 170A, 170B or 170C), such as security rules for inbound or outbound traffic and/or network access control lists (NACLs) may be enforced efficiently and transparently at the SPPS 102 in the depicted embodiment. Furthermore, depending on the specific application for which the network packets are sent to or from the CIs 160, additional packet processing operations, represented for example by a pipeline comprising one or more stages designed or developed by a third-party application vendor, with each stage comprising one or more rules and/or one or more actions, may be performed at the SPPS 102. In some embodiments, respective pipelines may be implemented for a given network packet flow for (a) IVN configuration-related packet processing tasks and (b) vendor defined packet processing tasks. IVN integration resources 124 implemented at one or more computing devices of the SPPS may for example obtain IVN networking metadata 170 from various IVNs, generate corresponding packet processing programs and rules that enforce security and other requirements of the IVNs, and transmit the programs and rules to fast-path resources 122 (e.g., via exception-path resources 123, or directly).

A vendor of a packet processing application, such as an intrusion detection operation or a data exfiltration detection application, may submit a programmatic request to the SPPS to set up an instance of a vendor-defined packet processing pipeline to be employed for traffic to/from a set of CIs 160 of one or more IVNs 120 in some embodiments. The vendor need not specify the particular SPPS resources to be used for the pipeline in the depicted embodiment, and in fact may not even be aware of the architecture or constituent layers and nodes of the SPPS. The request may include information about various stages of the pipeline, including for example respective rules to be applied (and/or programs to be run) to perform packet processing at the various stages, as well as rules to determine whether a given packet is eligible for a program. The programs and/or rules may be expressed using custom frameworks optimized for packet processing operations in various embodiments, such as eBPF or the like. A number of fast path packet processing nodes (FPPNs) (implemented using a combination of hardware and software fast path resources 122) may be assigned to the CIs 160, for which the pipeline is requested, e.g., by components of the SPPS control plane in the depicted embodiment. The programs and/or rules of the pipeline may be transmitted or pushed to the FPPNs automatically in some embodiments, e.g., in advance of receiving eligible packets that are to be processed using the pipelines; in other embodiments, the programs and/or rules may be stored at one or more slower-path resources 123 and transmitted to FPPNs on demand. The pipeline components (rules, programs/actions and/or associated metadata such as lookup tables) may be cached at the FPPNs in some embodiments. In various embodiments, as another preliminary configuration operation associated with pipelines, one or more entry and/or exit points (e.g., using one or more virtual network interfaces at the appropriate IVNs) may be established for each pipeline instance in response to respective programmatic requests (for example, from the vendor on whose behalf the pipeline instance is being configured).

After the pipeline elements have been deployed, in various embodiments connectivity may be enabled between the assigned FPPNs and the sources/destinations of the traffic for which the pipeline has been deployed. When a packet of a flow is received at such an FPPN, the FPPN may attempt to find a cached rule and/or program that is to be used to perform packet processing operations on the received packet. If such a rule or program is found in the cache, the operations indicated in the cache entry may be performed; otherwise, in at least some embodiments, a query indicating that a cache miss has occurred may be sent along with the received packet to an exception-path resource 123. The exception-path resource 123 may look up its own metadata repository comprising IVN configuration information and/or vendor-supplied pipelines. If an appropriate set of one or more pipelines (e.g., for enforcing IVN configuration settings and/or for performing vendor-defined operations) is identified, corresponding programs and/or rules may be supplied to the requesting FPPN in the depicted embodiment, where the programs/rules may be applied and cached for potential re-use. Depending on the specifics of the pipeline(s) identified, one or more packets corresponding to the received packet (e.g., versions of the packet in which one or more headers have been modified) may be transmitted to one or more destinations, and/or additional actions (such as simply dropping the received packet and/or raising an alarms about a potential network attack) may be initiated in various embodiments.

Example Subcomponents of a Packet Processing Service

Figure 2:
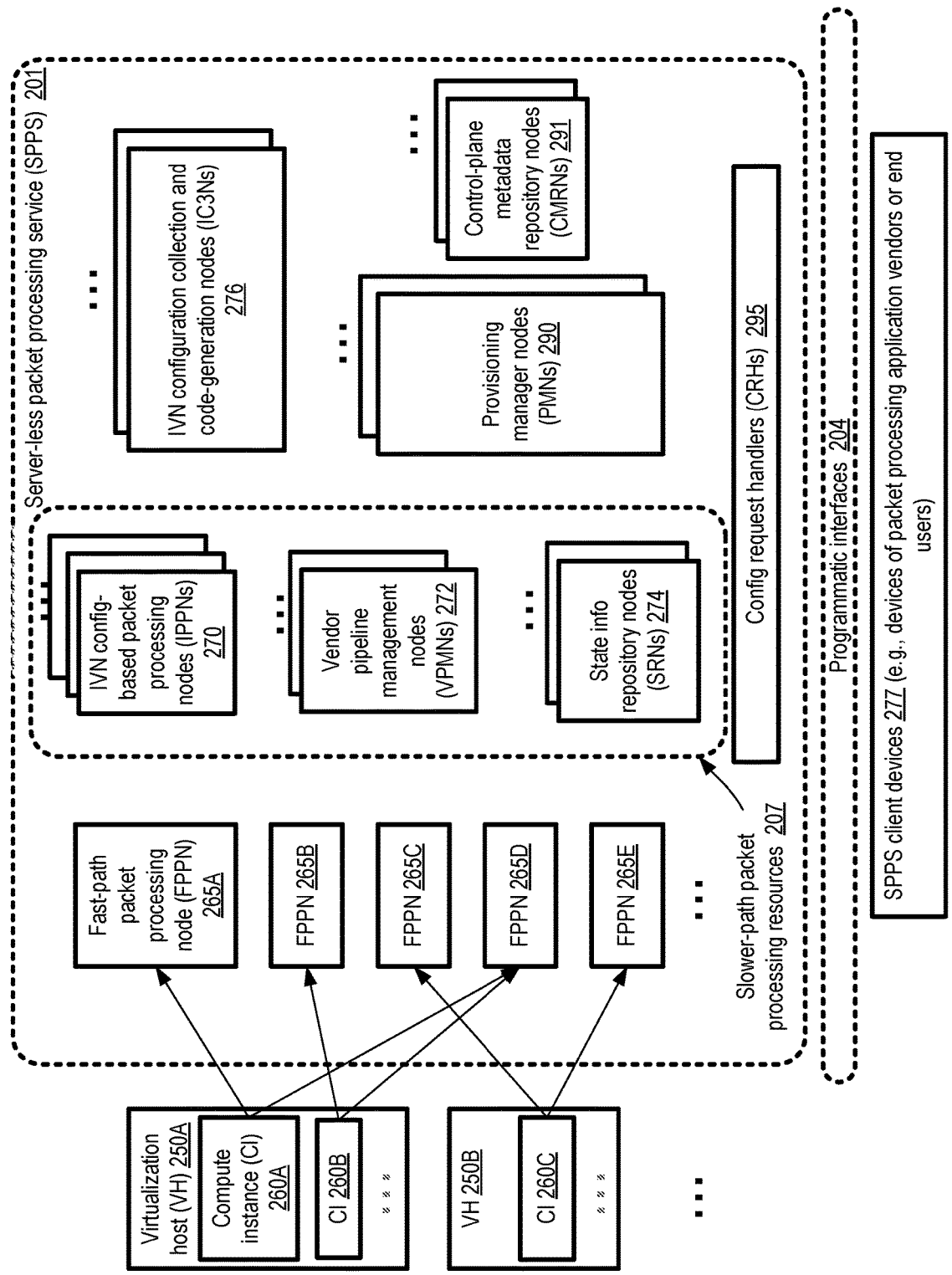
FIG. 2 illustrates example subcomponents of a packet processing service, according to at least some embodiments.

FIG. 2 illustrates example subcomponents of a packet processing service, according to at least some embodiments. In the depicted embodiment, a server-less packet processing service 201 may comprise a number of fast-path processing nodes (FPPNs) 265, a collection of slower-path packet processing resources 207, isolated virtual network (IVN) configuration collection and code-generation nodes 276, provisioning manager nodes (PMNs) 290, control plane metadata repository nodes (CMRNs) 291 and configuration request handlers (CRHs) 295. The slower-path packet processing resources 207 in turn may comprise IVN configuration-based packet processing nodes 270, vendor pipeline management nodes 272 and state information repository nodes (SRNs) 274. Individual ones of each of the depicted types of nodes may comprise some combination of hardware and software components in various embodiments. The FPPNs 265 and the slower-path packet processing resources 207 may be examples of SPPS data plane components, while the IC3Ns 276, the PMNs 290, the CMRNs 291 and the CRHs 295 may be examples of SPPS control plane components. SPPS clients, such as networking application vendors and end users of such vendor-defined applications, may utilize a variety of programmatic interfaces 204 to submit configuration-related requests to the SPPS control plane in the depicted embodiment, and receive corresponding replies. The programmatic interfaces 204 may for example include a set of APIs (application programming interfaces), a web-based console, command-line tools, graphical user interfaces and the like. When a request is received via interfaces 204, it may be examined at a CRH and then passed on to the appropriate internal component of the SPPS 201.

In the depicted embodiment, the SPPS 201 may be employed for implementing various types of packet processing operations (corresponding to one or more stages of one or more pipelines) on traffic originating at a plurality of compute instances (CIs) 260 running at virtualization hosts (VHs) 250, such as CIs 260A and 260B of VH 250A and CI 260C at VH 250B. The compute instances 260 may be configured within one or more isolated virtual networks (IVNs) of a virtualized computing service. In at least some embodiments, the number of FPPNs that are automatically provisioned and/or assigned by provisioning manager nodes 290 to process traffic for a given packet processing application pipeline or appliance instance may be determined based on the number of traffic sources (such as compute instances 260) whose traffic is to be processed. Thus, for example, if more CIs 260 are instantiated over time within an IVN whose outbound traffic is to be processed via a pipeline, additional FPPNs (and/or additional slower-path packet processing resources) may be assigned. In some embodiments, a shuffle-sharding algorithm may be utilized to assign specific FPPNs 265 to a given CI 260, such that distinct (but potentially overlapping) subsets of the FPPN pool are assigned to each CI. As shown by way of example, FPPNs 265A and 265D have been assigned to process traffic originating at CI 260A, FPPNs 265B and 265D have been assigned to CI 260B, and FPPNs 265C and 265E have been assigned to CI 260C. In some embodiments, a given FPPN may be assigned to a virtualization host 250 (i.e., to process traffic from all the CIs at the host), instead of being assigned on a per-CI basis. In one embodiment, in addition to or instead of determining the number of FPPNs based on the count of traffic sources, the number of FPPNs may be determined based on the count of traffic destinations associated with a given packet processing pipeline or appliance. The PMNs 290 may also be responsible for configuring replacement FPPNs if one of the FPPNs assigned to a pipeline fails, for scaling slower-path resources 207 up and down as needed, and/or for configuring replacement slower-path resources in the event of failures at the slower-path resources.

At least two categories of packet processing operations may be performed on packets originating at the compute instances 260 in the depicted embodiment: operations corresponding to pipelines defined and specified programmatically by networking application vendors, and operations corresponding to configuration settings of the IVNs to which the CIs 260 (and/or IVNs to which destinations of traffic generated at CIs 260) belong. In some embodiments, a vendor may submit a request indicating a pipeline via one or more APIs from an SPPS client device 295 (e.g., a desktop, laptop or mobile computing device). Each of the one or more stages of the vendor defined pipeline may comprise at least one rule (e.g., indicating an executable program to be run, or an action to be performed). The rules, programs and/or actions may be provided in any of various formats to the SPPS by the vendor—e.g., in some embodiments, a rule, program or action may be written in eBPF, while in other embodiments, other programming languages or scripting languages may be used. To enable traffic to be directed to and from a pipeline instance, a virtual appliance may be created at the SPPS and one or more entry and exit endpoints such as virtual network interfaces may be configured for the virtual appliance in various embodiments. Metadata representing an instance of a vendor-defined pipeline, as well as the entry and exit points, may be stored in the SPPS CMRNs 291, and/or propagated to vendor pipeline management nodes (VPMNs 272) in the depicted embodiment. The programs and rules of the vendor-supplied pipeline may be pushed or propagated to the FPPNs 265B by the VPMNs, e.g., either as soon as the pipeline information is received at the VPMNs or when requested by the FPPNs in some embodiments. The FPPNs may store the received programs and rules in local caches in various embodiments.

Configuration information pertaining to the IVNs to which the CIs 260 belong may be obtained at the IC3Ns 276 in the depicted embodiment, e.g., from the control plane of the virtualized computing service in which the IVNs are configured. The configuration information may include, for example, security rules for restricting inbound and outbound traffic of the IVN, network access control lists (NACLs), routing rules based on route tables and the like in various embodiments. At least some of the security settings of an IVN may have been selected by the client on whose behalf the IVN is established. The IVN configuration settings may be transformed into one or more stages of an internal (i.e., not a vendor-defined) packet pipeline in some embodiments, e.g., at the IC3Ns. The operations of the internal IVN configuration-based pipeline as well as the vendor-defined pipeline may thus be performed for various received packets in the depicted embodiment; in effect, a single pipeline that comprises the IVN-configuration based operations and the vendor-defined operations may be executed. In at least some embodiments, the security and routing related requirements of the IVN configurations may determine the sequencing of the IVN configuration-related packet processing operations relative to the operations of the vendor-defined pipeline. For example, in one scenario, for security-related reasons, some IVN configuration related packet processing operations on a given packet may be performed before any vendor-defined operations are performed, and for routing-related reasons, other IVN configuration-related packet processing tasks may be performed after all vendor-defined operations are performed on the given packet. In some embodiments, program code (e.g., in eBPF or some other language) to perform the IVN configuration related operations may be generated at code generation components or modules of the IC3Ns. The IVN configuration based packet processing nodes (IPPNs) 270 may obtain indications of the internal pipelines from the IC3Ns in the depicted embodiment, and pass on programs/rules of the pipelines to the FPPNs for caching. If/when an IVN's configuration is changed, the IC3Ns may automatically determine that the change has occurred, and make changes to the IVN configuration-related pipelines if needed. Note that as presented in FIG. 1, the role of the IPPNs with respect to IVN configuration based packet processing is somewhat analogous to the role of the VPMNs with respect to vendor-defined packet processing operations. In some embodiments, IPPNs and VPMNs may be replaced by a common data SPPS plane component (e.g., a pipeline intermediary node) responsible for transmitting both IVN configuration-related and vendor-defined operation information to the FPPNs.

In some cases, state information pertaining to the packet processing task being performed may be stored at one or more SRNs 274. For example, a decision made with respect to an initial packet of a given flow (such as whether the packet satisfies an ingress or inbound traffic restriction of the IVN), which influences the operations that may have to be performed for subsequent packets of the same flow (e.g., that no further checking of the ingress restrictions is necessary), may be stored in a state information entry at an SRN. In the event that an FPPN to which the decision had been propagated fails, its replacement FPPN may query one or more slower-path packet processing resources to determine how to proceed with the processing of another packet of a flow that was being handled by the now-failed FPPN, and the state information entry may be used to respond to such a query. The slower-path resources 207 may be responsible for handling cache misses of the FPPNs in the depicted embodiments, as well as for re-validating (or invalidating) cache entries. As mentioned earlier, in some embodiments a timeout may be associated with a given cache entry at an FPPN when the entry is stored in the cache. When the timeout expires, the FPPN may send a request to a slower-path resource 207, to determine whether the rule/action of the cached entry is still valid. If the entry remains valid (e.g., if no changes have been made to the pipeline or the IVN configuration), a response indicating that the timeout is to be extended may be provided to the FPPN in some embodiments; otherwise, the entry may be allowed to expire or replaced with a new entry generated at the slow-path resources.

Example Customer View of a Packet Processing Service

Figure 3:
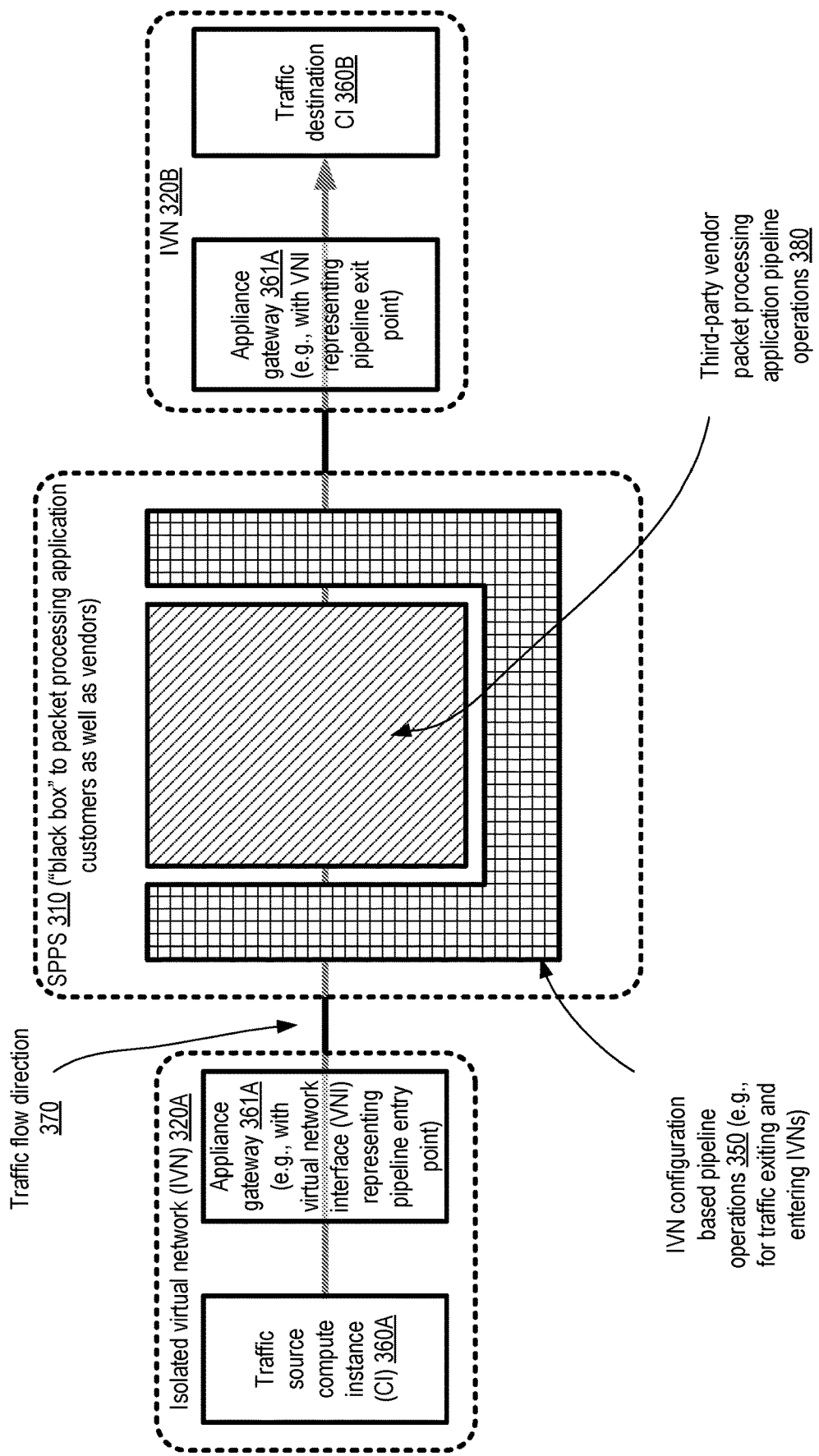
FIG. 3 illustrates an example customer view of operations performed at a packet processing service, according to at least some embodiments.

FIG. 3 illustrates an example customer view of operations performed at a packet processing service, according to at least some embodiments. In the depicted embodiment, network packets originating at a set of source compute instances (e.g., CI 360A) of one isolated virtual network (IVN) 320A are to be transmitted to another set of destination compute instances (e.g., CI 360B) within a second IVN 320B, as indicated by arrow 370. Operations of a pipeline defined by a third party vendor (i.e., an entity other than the SPPS operator and other than the source of the traffic), as well as IVN configuration-related operations (such as security and routing operations) are to be performed for the packets of CIs such as 360A. The vendor defined pipeline may include any desired application-level processing, such as per-user data bandwidth usage analysis, data exfiltration detection, network infiltration detection, policy-based routing, etc.

From the perspective of the clients of the SPPS, including the end users and the third party vendor, the SPPS 310 may appear to be a "black box" comprising a near-infinite set of packet processing resources that can be employed for the desired kinds of packet processing tasks. A virtual appliance representing the vendor-defined pipeline may be created at the SPPS in response to a programmatic request from the vendor, and a pair of appliance gateways 361A and 361B (entry and exit points of the pipeline) may be configured on behalf of the vendor. In at least some embodiments, the gateways may be assigned respective virtual network interfaces in the IVNs in which the gateways are configured—e.g., an entry point VNI for gateway 361A within IVN 320A, and an exit point VNI for gateway 361B within IVN 320B. The gateways may be visible to the clients on whose behalf the CIs are configured, while other details of the SPPS (e.g., the number of FPPNs and other nodes assigned to the appliance) may remain inaccessible. Neither the vendor nor the users of the pipeline may have to concern themselves with requesting or selecting FPPS resources in the depicted embodiment. Internally, within the SPPS, IVN configuration based (e.g., security related and routing related) operations 350 may be performed, as well as the operations 380 of the third party vendor pipeline, e.g., using a combination of data plane nodes that are dynamically provisioned based on the number of traffic sources in the source IVN 320A. As suggested by the shapes used to represent the operations 350 and 380, some of the IVN configuration related operations may be performed before the vendor pipeline operations, while other IVN configuration related operations may be performed after the vendor pipeline operations in the depicted example scenario.

Example Overview of Fast-Path and Slower-Path Operations

Figure 4:
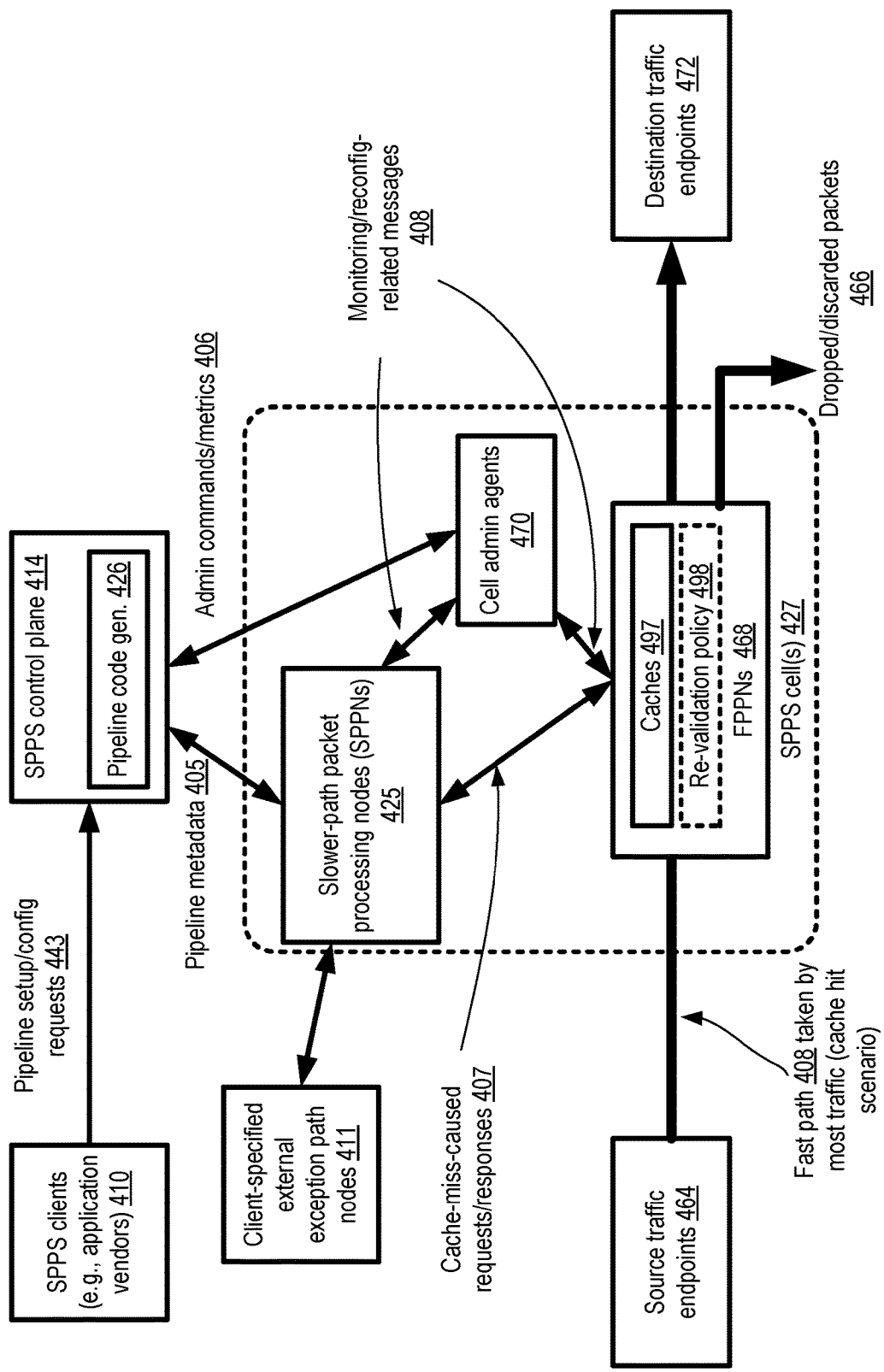
FIG. 4 illustrates an example overview of fast-path and slower-path operations at a packet processing service, according to at least some embodiments.

FIG. 4 illustrates an example overview of fast-path and slower-path operations at a packet processing service, according to at least some embodiments. In the depicted embodiment, the resources of the SPPS are organized as a collection of cells 427, with individual cells comprising a respective collection of fast-path and slow-path resources. An SPPS client 410 such as an application vendor may submit requests 443 to the SPPS control plane 414 to set up instances of one or more pipelines, which may be exposed to end users in the form of virtual appliances.

For a given instance of an appliance, the SPPS control plane 414 may select one or more SPPS data plane cells 427 in the depicted embodiment. A given cell 427 may include a collection of fast-path packet processing nodes (FPPNs) 468 and a collection of slower-path packet processing nodes (SPPNs) 425 (which may also be termed exception path nodes). A given FPPN 468 may comprise a cache 497 within which representations of the rules, actions and/or programs of the pipeline stages to be implemented at the node are stored. Pipeline stage logic may be stored in executable form in the caches in some embodiments, e.g., as byte code expressed using instructions of a register-based virtual machine optimized for implementing network processing operations, which can be used to perform operations similar to those of the extended Berkeley Packet Filter (eBPF) interface. In one implementation, for example, an eBPF program may be restricted in several ways—the maximum number of instructions may be limited, only a few 64-bit registers may be available, only forward conditional jumps may be supported, and so on. As a result of the restrictions, the pipeline logic expressed as an eBPF program may be executed very quickly, but the complexity of the work that can be accomplished using a given program may be limited. For at least some stages of the vendor-defined pipeline, the vendor may supply the program code to be used and cached in the depicted embodiment. For at least some IVN configuration related operations, code may be produced at the SPPS control plane 414 (e.g., using pipeline code generators 426) and also cached at the FPPNs 468.

Metadata 405 about the pipelines (comprising both IVN configuration related operations as well as vendor-defined operations) may be transmitted from the SPPS control plane 414 to the SPPNs 425, and commands to administer (e.g., monitor the health of) the cell 427 may be transmitted to one or more cell administration agents instantiated within the cell by the control plane 414. When a network packet is received from a source traffic endpoint 464 at an FPPN 468, the local cache 497 may be examined (e.g., using a lookup table or a prefix matching table) to determine whether code to process the packet is present in the cache. If a cache hit occurs, i.e. if appropriate code is found, the code may be executed, and one or more packets (which may be rewritten versions of the received packet) may be sent to a destination traffic endpoint along the fast path 408. If a cache miss occurs, a request 407 may be sent to the SPPNs 425 from the FPPNs 468. In some embodiments, the SPPNs 425 of the SPPS may be able to provide the code (using pipeline metadata 405) to process the packet to the FPPN, where the code may be cached for use with subsequent packets. In other embodiments, the vendor may have indicated that for at least some packets, one or more external exception-path nodes 411 may have to be used to perform at least some packet processing actions. Such client-specified external exception path resources may, for example, comprise one or more compute instances within a separate IVN (e.g., different from the IVN in which the source traffic endpoints 464 and the destination endpoints 472 are configured, and different from an IVN in which the SPPS cell is configured), or even a set of computing devices outside the provider network at which the SPPS is implemented. If external exception path nodes 411 are to be used, which may be determined at the internal SPPNs 425 based on the pipeline metadata 405, the packet may be transmitted to the external nodes 411, where the required operations may be performed. Depending on the nature of the application being implemented using the vendor pipeline, in some cases the external nodes 411 may only have to be used for a subset of the packets of a given flow; in other cases (e.g., when decryption/encryption operations are needed for each packet, and when such operations can only be performed securely using the external nodes), each packet of the flow may have to be transmitted to the external nodes 411 in some embodiments. In at least one embodiment, just as an internal SPPN 425 may be able to provide packet processing code that can be cached at an FFPN 468 for subsequent packets of a flow, an external exception-path node 411 may also be able to provide packet processing code than can be cached as the FPPNs for subsequent packets of a flow. Depending on the results of the processing performed at the FPPNs and/or based on IVN configuration settings, some received packets may simply be discarded or dropped (as indicated by arrow 466) in the depicted embodiment; as such, the actions taken with respect to a given packet may not necessarily include sending a corresponding packet from the SPPS towards a destination. For example, a packet received from a traffic origin may be dropped if a determination is made that the packet is part of a network attack or data exfiltration effort, or if configuration settings of an IVN prohibit packets from that traffic origin to be transmitted to a targeted destination indicated in the received packet, and so on.

In some embodiments, a timeout-based cache entry re-validation policy 498 may be employed at the FPPNs 468 to ensure that out-of-date cache entries are not used for processing packets received at the FPPNs. When an entry is stored in a cache 497, a corresponding timeout may be set in such embodiments. When the timeout expires, the FPPN 468 may transmit a re-validation request for the entry to an SPPN 425. If the cache entry remains valid, that is, if the FPPN can continue to use it for additional packets, the SPPN 425 may provide a response indicating that the entry can be retained. If, on the other hand, a configuration change has occurred which renders the entry invalid, the SPPN may inform the FPPN accordingly, and the entry may be removed from the cache 497. In some embodiments, when an SPPN determines that a cache entry is no longer valid, it may provide a replacement entry to the FPPN. As mentioned earlier, in some embodiments a multi-layer timeout-based cache entry revalidation technique may be employed, in which both soft and hard timeouts may be set for a given cache entry. In at least one embodiment, an SPPN 425 may have to communicate with an external exception-path node 411 and/or the SPPS control plane 414 to verify whether a cache entry remains valid. In some embodiments, other cache invalidation or re-validation schemes may be used. Cell admin agents 470 may monitor the health of the SPPNs and FPPNs (as indicated by arrows 408) in the depicted embodiment and report their findings to the control plane 414, where decisions about provisioning replacement FPPNs or SPPNs may be made based on the findings.

Example Overview of Source-Based Node Provisioning

Figure 5:
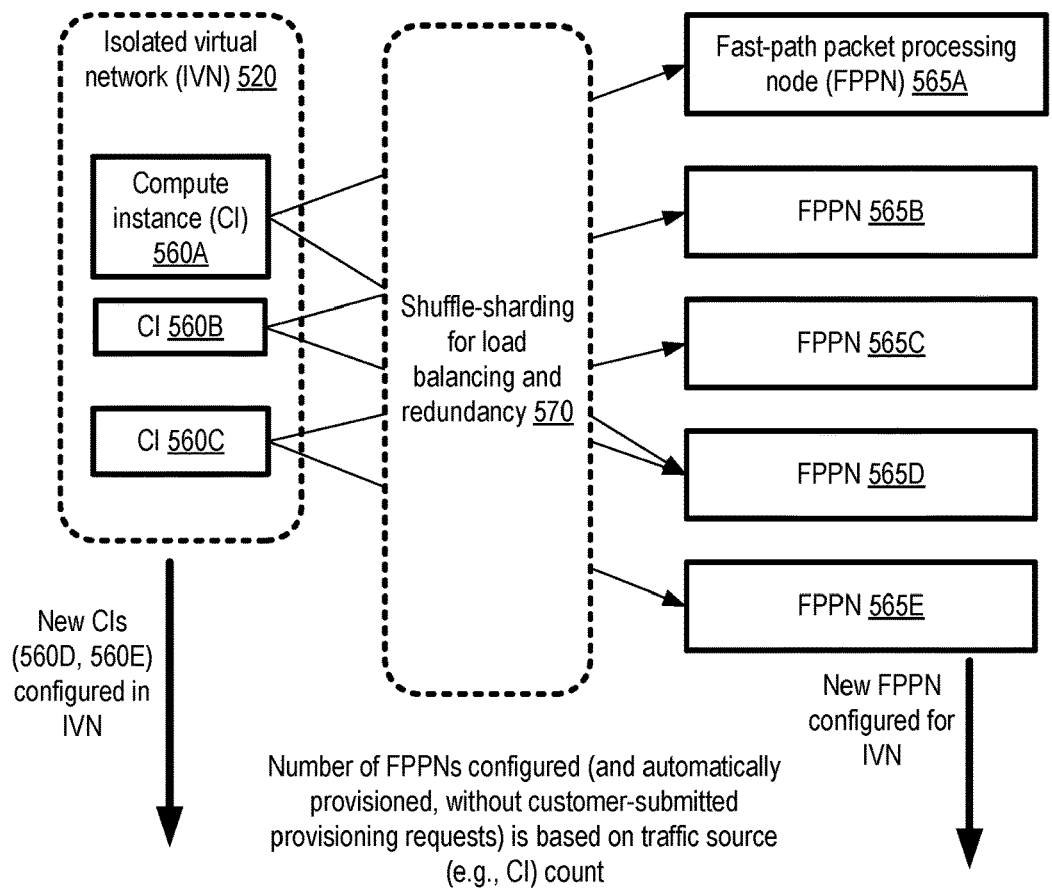
FIG. 5 illustrates an example overview of traffic source based dynamic provisioning of nodes at a packet processing service, according to at least some embodiments.
Figure 5:
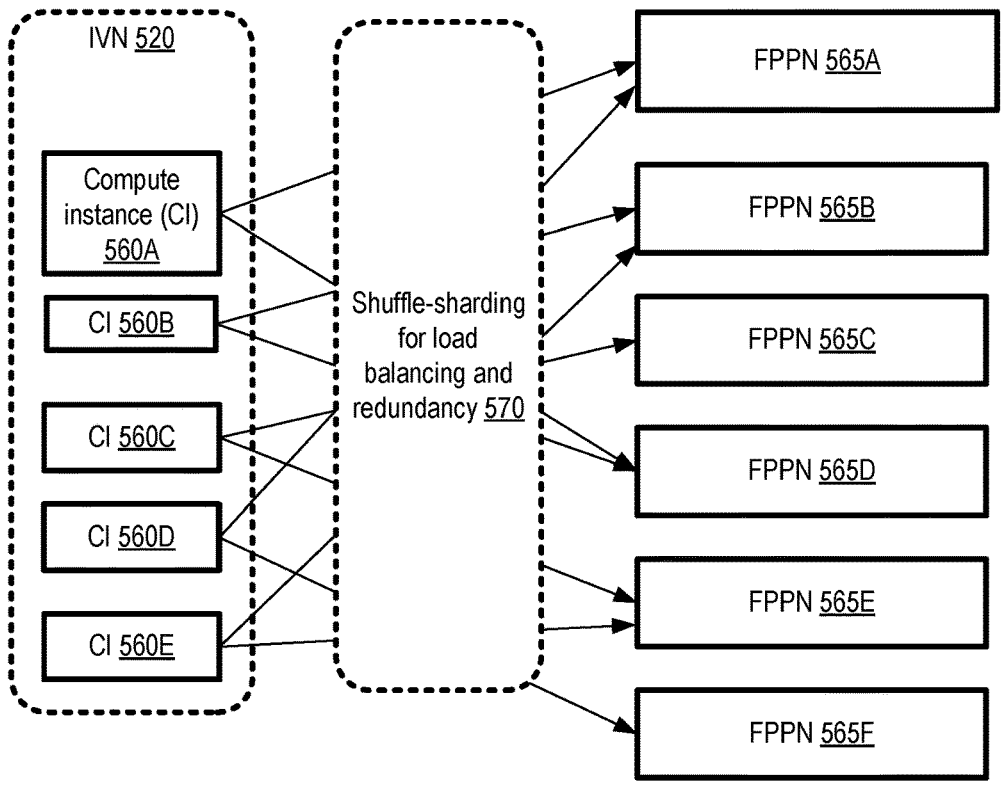

As mentioned earlier, in at least some embodiments the number of data plane nodes configured for a given packet processing appliance or pipeline may depend on the number of traffic sources of the pipeline. FIG. 5 illustrates an example overview of traffic source based dynamic provisioning of nodes at a packet processing service, according to at least some embodiments. An isolated virtual network 520 may, at a given point of time, comprise three compute instances 560A, 560B and 560D from which traffic to be processed using a pipeline originates. A set of five fast-path packet processing nodes (FPPNs) 565A-565E may be configured initially to process packets generated at the CIs 560A-560C in the depicted embodiment, with the number being selected based on the count of CIs. SPPS clients (the vendors on whose behalf a pipeline is being executed, and the clients on whose behalf the CIs 560 are set up at IVN 520) may not have to request the SPPS to configure a particular number of FPPNs in various embodiments; instead, the FPPN control plane may use its own algorithms to select the number. A shuffle-sharding algorithm 570 may be employed to assign respective subsets of the five FPPNs to individual ones of the CIs 560, e.g., to help provide a desired level of redundancy and load balancing. Thus, for example, each CI is assigned a pair of FPPNs in the depicted example: FPPNs 565A and 565D are assigned to CI 560A, FPPNs 565B and 565D are assigned to CI 560B, and FPPNs 565C and 565E are assigned to CI 560C. The specific set of FPPNs to be assigned to the traffic of a given CI 560 may be chosen at random from among the available pool of FPPNs in some embodiments, and based at least partly on considerations such as physical proximity in other embodiments. For example, in one embodiment, numerous FPPNs may configured in a set of racks that are well distributed across a data center, and a pair of FPPNs that happen to be (a) relatively close to the rack at which a given CI's host is configured and (b) are not overloaded (e.g., with respect to the number of CIs whose traffic they are configured to handle, or with respect to the number of packets that they have processed per unit time during a recent time interval) may be selected for the given CI. In some embodiments, instead of being assigned to individual compute instances, FPPNs may be assigned to virtualization hosts using similar shuffle-sharding algorithms. In at least some embodiments, the assignment of FPPNs to traffic sources/destinations such as compute instances may be changed over time, e.g., by the SPPS control plane. For example, a given FPPN FPPN-A may initially be assigned to process packets originating at a compute instance CI1 when CI1 is brought online, with FPPN-A being selected for CI1 based at least partly on physical proximity. Later, a different FPPN, FPPN-B, may be assigned as a replacement for FPPN-A with respect to CI1's traffic, even though FPPN-B may be physically further away from CI1 than FPPN-A. Such dynamic reassignments may be performed for any of a variety of reasons in different embodiments—e.g., because the network pathways/links between CI1 and FPPN-A have become more congested than network pathways/links available between CI1 and FPPN-B, because the resource utilization levels of FPPN-A exceed a threshold, or for other reasons.

If and when additional compute instances such as 560D and 560E which can add to the traffic to be processed using the FPPNs is configured in the IVN 520, the SPPS control plane may obtain an indication of the new CIs in the depicted embodiment. Based on a set of scale-up policies for the FPPNs, the SPPN control plane may automatically configure an additional FPPN (565F) to handle the anticipated additional traffic in the depicted embodiment, without requiring a client to submit a request for additional resources. The shuffle sharding algorithm may be used to identify the FPPNs to be used for each of the new CIs. In one embodiment, if the number of configured traffic sources decreases by some threshold, the SPPS may reduce the number of assigned FPPNs for a pipeline. In some embodiments, similar source-based scaling policies may be implemented to scale up (or scale down) other data plane nodes of the SPPS.

Example Distribution of Nodes

Figure 6:
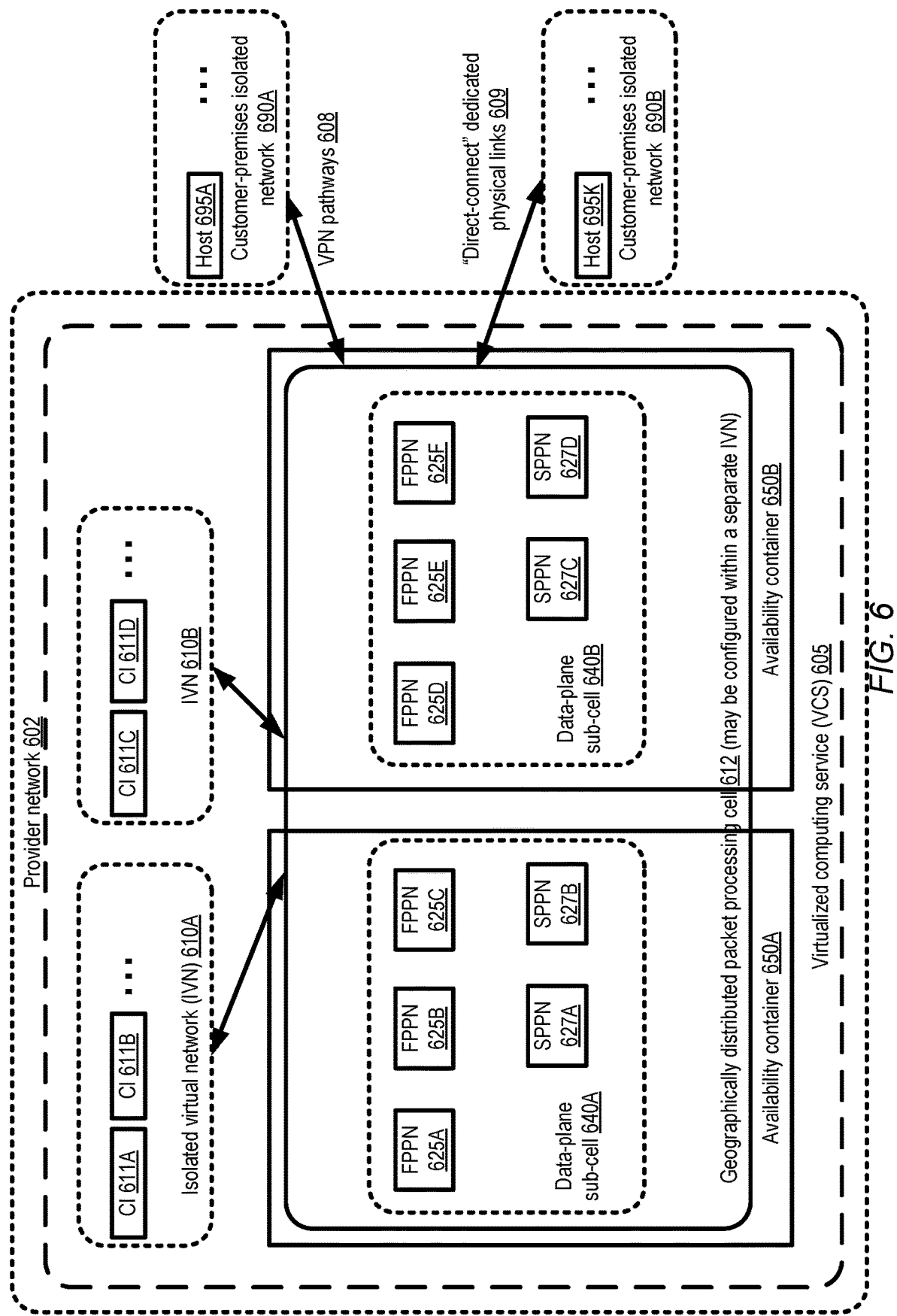
FIG. 6 illustrates an example distribution of nodes of a packet processing service across availability containers of a provider network, according to at least some embodiments.

FIG. 6 illustrates an example distribution of nodes of a packet processing service across availability containers of a provider network, according to at least some embodiments. In the depicted embodiment, provider network 602 comprises virtualized computing service (VCS) 605 at which isolated virtual networks (IVNs) such as 610A or 610B may be established on behalf of various customers or clients. Processing of packets flowing between compute instances 611 (e.g., CIs 611A and 611B in IVN 610A, and CIs 611C and 610D in IVN 610B), and/or flowing between the compute instances and customer-premises isolated networks 690A or 690B is performed using resources of a geographically distributed SPPS cell 612. The SPPS cell 612 may itself be implemented using VCS resources in the depicted embodiment as discussed below. In some embodiment, the SPPS nodes may be configured within one or more separate IVNs (i.e., IVNs dedicated to the SPPS, and not to VCS clients whose traffic is to be processed using the SPPS).

In at least some embodiments, the resources of the VCS 605, such as the hosts on which various compute instances are run, may be distributed among a plurality of availability containers 650, such as 650A and 650B. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container.

In the depicted embodiment, fast-path packet processing nodes (FPPNs) 625 (e.g., 625A, 625B, 625C, 625D, 625E and 625F), as well as slow-path packet processing nodes (SPPNs) 627 (e.g., 627A, 627B, 627C and 627D) may be implemented at least in part using respective compute instances of the VCS 605. The illustrated cell 612 may comprise at least two data-plane sub-cells 640A and 640B, with one data plane sub-cell implemented in each of at least two availability containers 650A and 650B. As a result of the use of multiple availability containers, the probability that the entire cell is affected by any given failure event may be minimized in the depicted embodiment. In some embodiments, SPPS control plane components for managing the data plane components may be distributed in a similar manner across multiple availability containers.

As shown, SPPS cell 612 may be used for packet processing applications involving traffic between at least four isolated networks—IVNs 610A and 610B, and customer-premises isolated networks 690A and 690B in the depicted embodiment. Isolated network 690A, which may for example be set up at a customer premise or location outside the provider network's own data centers and may include some number of hosts such as host 695A, may communicate with the SPPS via a set of virtual private network (VPN) pathways 608 in the depicted embodiment. Isolated network 690B may also be set up at a set of customer premises or locations outside the provider network 602 and may comprise some number of hosts such as host 695K in the depicted embodiment. Traffic between the isolated network 690B and the SPPS may flow over a set of dedicated physical links 609 in the depicted embodiment (e.g., instead of a set of links that may be shared with traffic of the public Internet), which may also be referred to as "direct-connect" links. As such, the SPPS implemented using the VCS 605 of provider network 602 may be capable of processing packets generated at (or directed towards) a variety of network configurations in the depicted embodiment, including (but not necessarily limited to) isolated virtual networks within the VCS itself, external networks such as 690A which use VPN connections over shared links to communicate with the VCS, and external networks such as 690B which use dedicated links to communicate with the VCS. The SPPS may be used to implement the VPN and/or direct-connect functionality in some embodiments. Other types of networks may also be connected using the SPPS in various embodiments. In at least some embodiments, the nodes of the SPPS may not utilize the type of multi-availability-container architecture shown in FIG. 6, may use non-virtualized hosts instead of or in addition to virtual machines, and/or may not necessarily use a virtualized computing service or other services of a provider network.

Example Pipeline Elements and Mappings to SPPS Nodes

Figure 7:
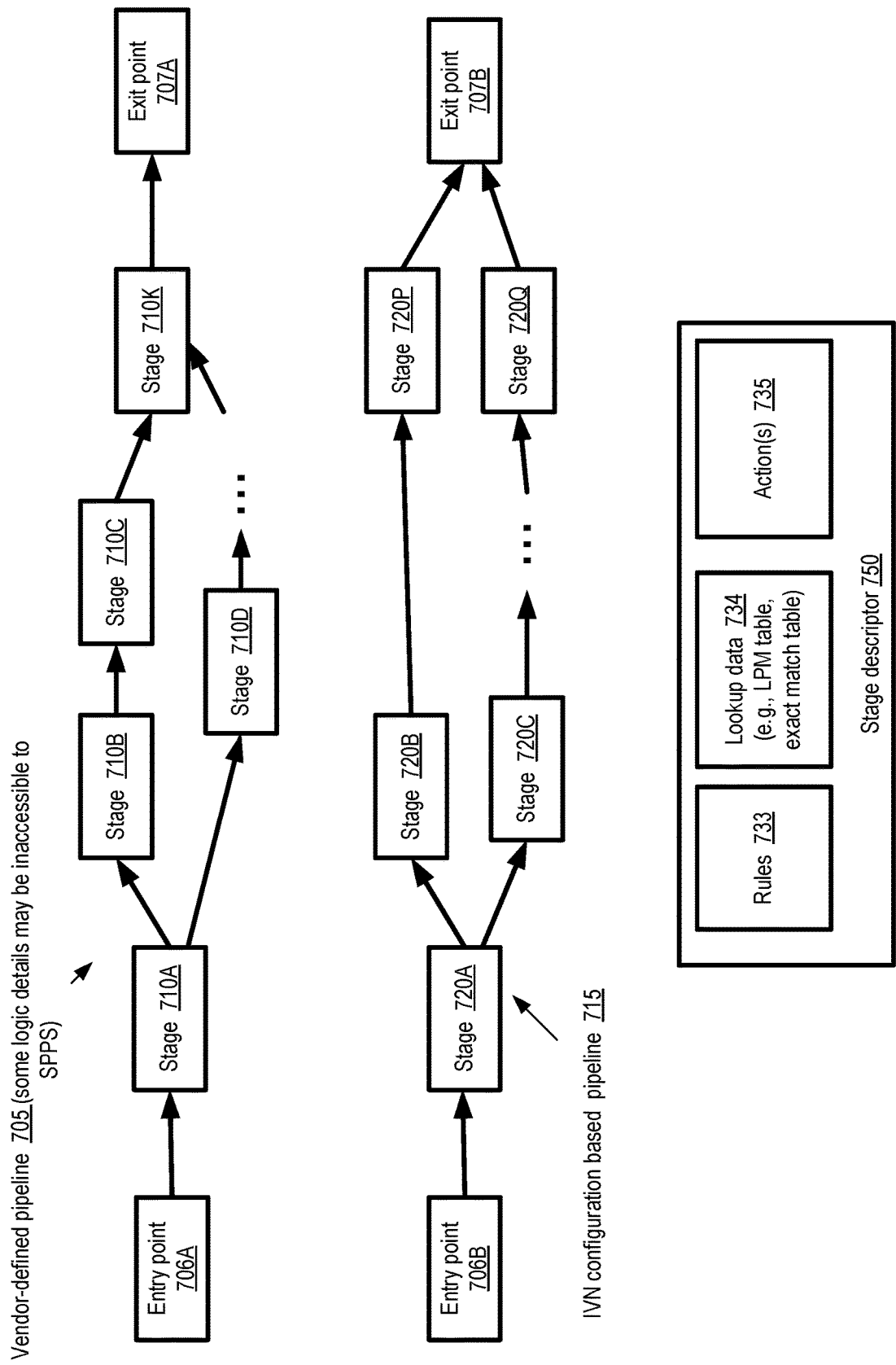
FIG. 7 illustrates example packet processing pipelines comprising multiple stages, according to at least some embodiments.

FIG. 7 illustrates example packet processing pipelines comprising multiple stages, according to at least some embodiments. Two types of pipelines are shown: a vendor-defined pipeline 705, and an IVN configuration based pipeline 715. Each of the pipelines 705 and 715 may have one or more stages represented by respective nodes in a directed acyclic graph (DAG), one or more entry points and one or more exit points in the depicted embodiment. An exit point may comprise a networking construct (such as a virtual network interface) that can be used to direct traffic to, or transfer traffic from, the nodes at which the pipeline logic is implemented. Vendor-defined pipeline 705 may comprise stages 710A, 710B, 710C, 710D, and 710K, entry point 706A, and exit point 707A in the example of FIG. 7, while IVN configuration based pipeline 715 may comprise stages 720A, 720B, 720C, 720P, and 720Q, entry point 706B and exit point 707B.

The two types of pipelines may differ in their sources in the depicted embodiment (i.e., in the entities responsible for defining the pipelines), but may otherwise be fairly similar. For example, a descriptor 750 of a given stage may comprise one or more rules 733, optional lookup data 734 (e.g., lowest prefix match tables, exact match tables such as hash tables etc.) and/or one or more actions 735 to be taken based on the results of applying the rules. In at least some embodiments, executable representations of the rules and/or the actions, e.g., in the form of a program or set of functions expressed in eBPF may be provided by a client of the SPPS as part of a pipeline setup request and/or via other programmatic interactions. Other languages/formats may also or instead be used in other embodiments. In some embodiments, if a stage has multiple rules, each of the rules may be applied in sequence. In at least one embodiment, rules and/or actions may be conditional. For example, a rule of stage 720A may lead to either the execution of stage 720B or the execution of stage 720C for a given packet. Conditional rules may also be used to decide whether a particular packet processing program or action is to be performed for a given packet at a given stage in various embodiments: e.g., a rule may result in the execution of a particular program Prog1 for a packet Pkt1 at a stage S1, and the same rule may result in a decision not to execute Prog1 at stage S1 for another packet Pkt2.

Figure 8:
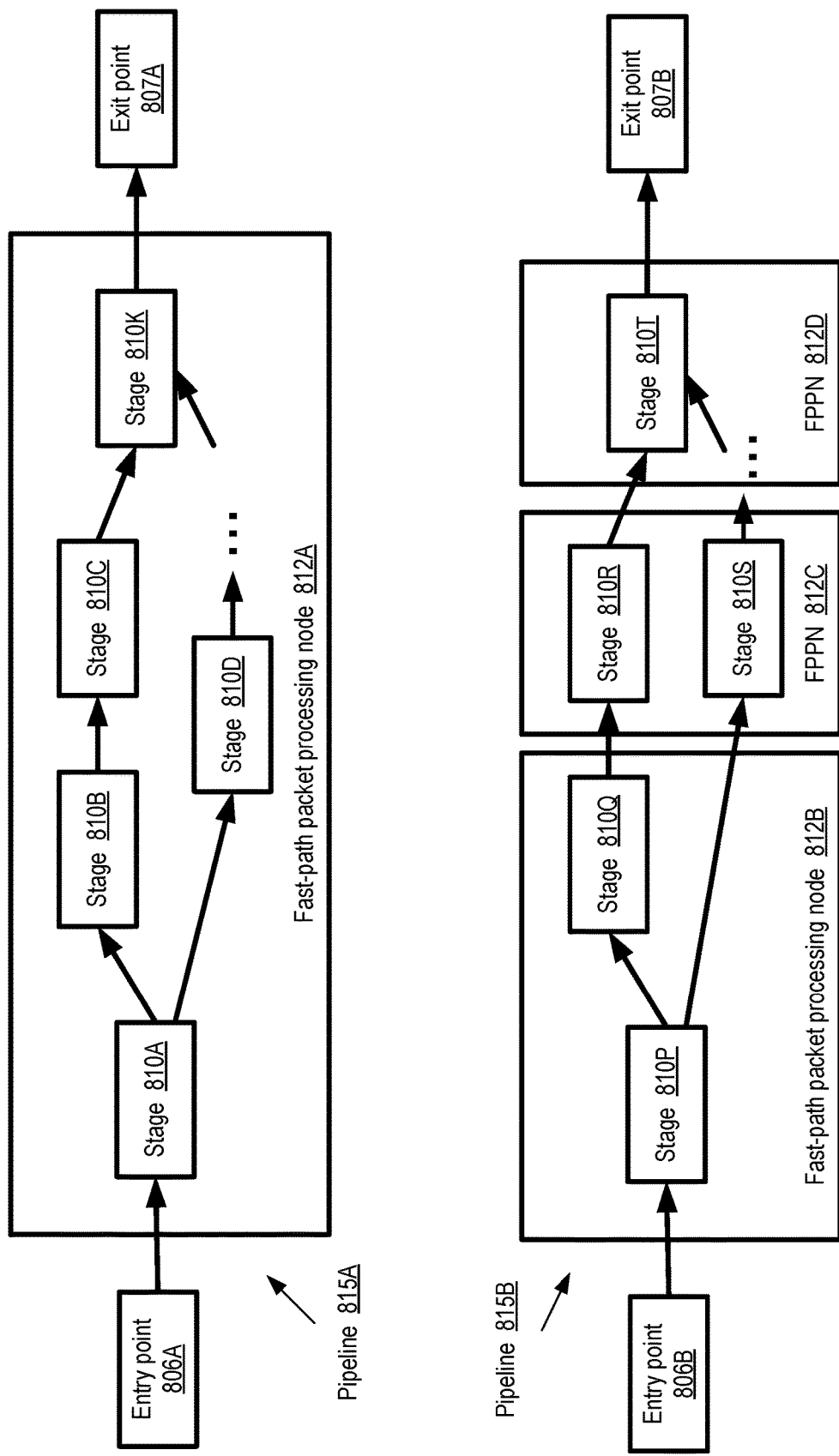
FIG. 8 illustrates example mappings of packet processing pipeline stages to nodes of a packet processing service, according to at least some embodiments.

FIG. 8 illustrates example mappings of packet processing pipeline stages to nodes of a packet processing service, according to at least some embodiments. Depending on the logic of the packet processing application being implemented, a given pipeline may be implemented entirely within an FPPN, or the work of different groups of one or more stages may be performed at respective FPPNs. For example, an FPPN 812A may be used to perform operations corresponding to each of the stages (810A, 810B, 810C, 810D 810K, etc.) of one pipeline 815A. In contrast, for pipeline 815B, several different FPPNs may be used: FPPN 812B for stages 810P and 810Q, FPPN 812C for stages 810R and 810S, and FPPN 812D for stage 810T. Multiple FPPNs may be used, for example, in scenarios in which network packets of a given flow are transmitted from one availability container of a provider network to another, or from one geographical region of a provider network to another region. In some such scenarios, information needed to perform packet processing may not be easily transferable across availability container boundaries or region boundaries, so respective FPPNs in the different availability containers or regions may be employed.

Example Packet Context Information

Figure 9:
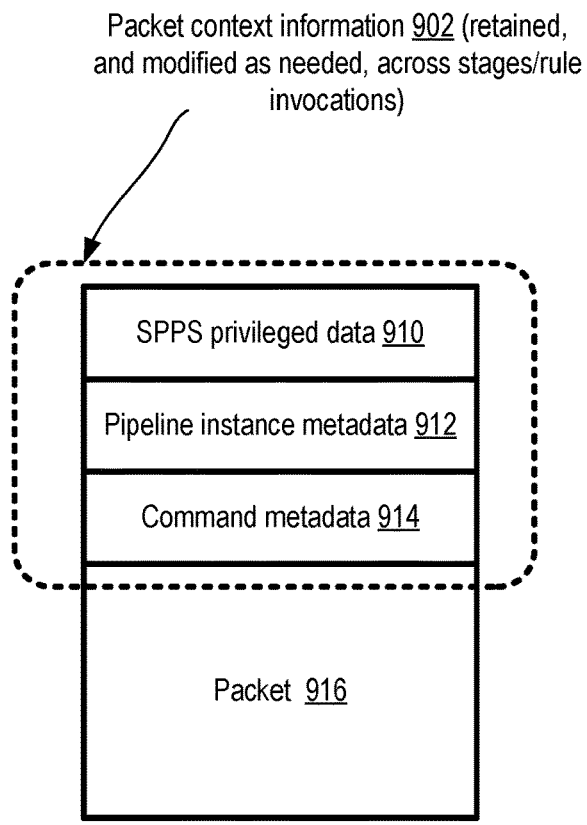
FIG. 9 illustrates example context information which may be maintained and modified as a packet is processed at various stages of a pipeline, according to at least some embodiments.

As a network packet is processed at various stages of a pipeline of the kind introduced earlier, information regarding what has been done at earlier stages of the pipeline may sometimes be useful at subsequent stages. FIG. 9 illustrates example context information which may be maintained and modified as a packet is processed at various stages of a pipeline, according to at least some embodiments. Three types of context information which may be generated and transmitted from stage to stage for a given received packet 916 are illustrated in FIG. 1: privileged data 910 of the SPPS, pipeline instance metadata 912, and command metadata 914.

Privileged SPPS data 910 may comprise configuration information pertaining to the flow to which the packet belongs, which is only accessed by SPPS nodes, and not accessible from a vendor supplied packet processing program of the pipeline. Such privileged information may comprise, for example, results of IVN configuration security checks, network access control lists and the like, which may indicate that the packet has satisfied IVN security or other constraints and that further processing of the packet is therefore allowed. Pipeline instance metadata 912 may include, for example, an identifier of an instance of the virtual pipeline appliance at which the packet is being processed, and/or other metadata that is (a) applicable to the pipeline instance as a whole and (b) accessible from vendor-supplied programs of the pipeline if needed in the depicted embodiment. The command metadata portion 914 of the context may be used to store specific commands that are to be used when the packet exits the pipeline, if any such commands are needed, e.g., to route a re-written version of the packet towards its eventual destination. Context information 902 may be considered the logical equivalent of a "scratchpad" in which information pertinent to the processing of the packet is retained temporarily, and from which such information is discarded when the pipeline has been traversed. In effect, the original packet received at the pipeline entry point may be temporarily enclosed within an envelope containing the context information 902 (as well as the packet itself) as the packet travels through the pipeline stages.

Example Multi-Stage Pipeline for IVN Configuration Related Tasks

Figure 10:
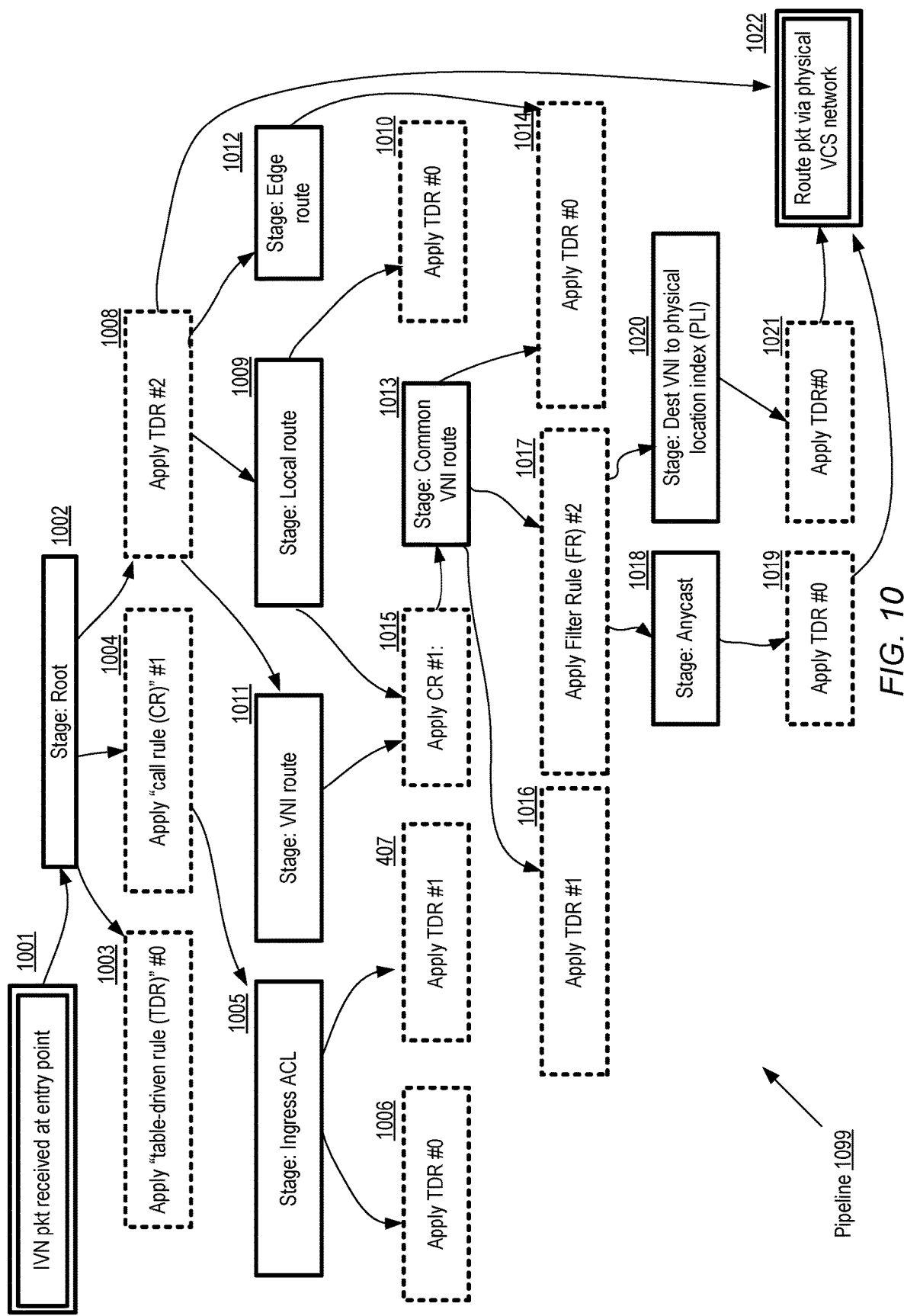
FIG. 10, FIG. 11 and FIG. 12 collectively illustrate example stages of a multi-stage pipeline at which isolated virtual network configuration-related packet processing operations may be performed, according to at least some embodiments.
Figure 11:
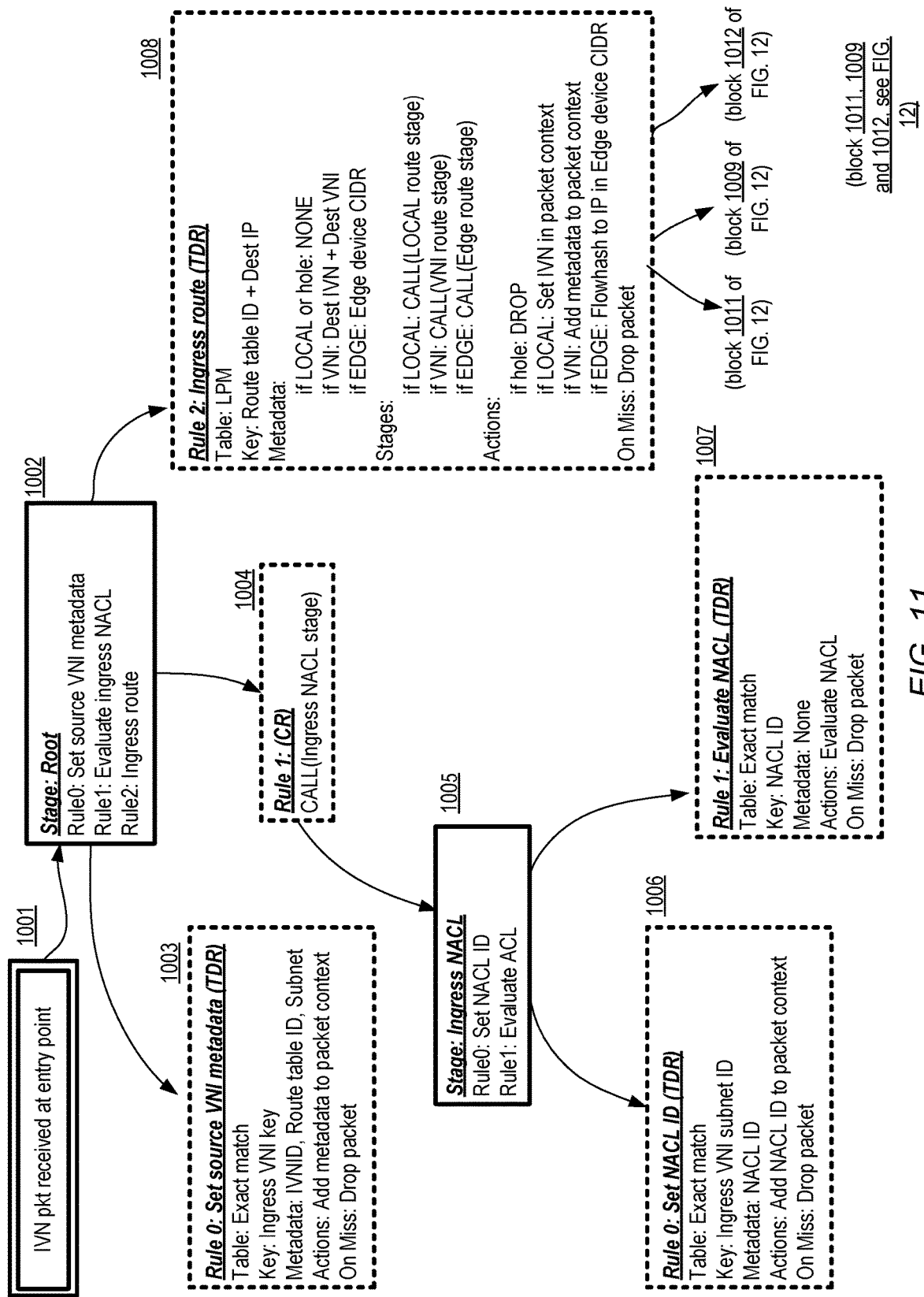
Figure 12:
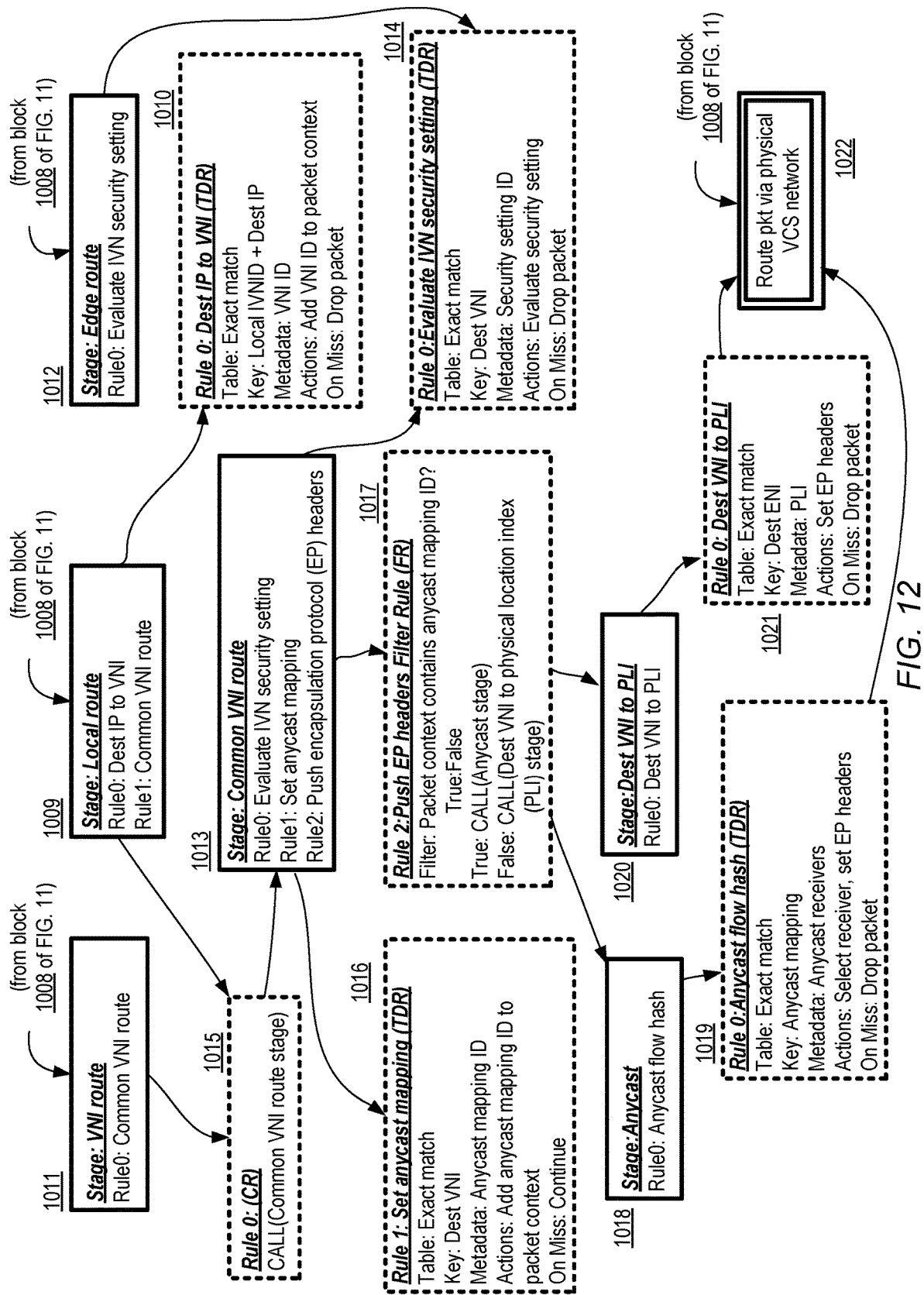

FIG. 10, FIG. 11 and FIG. 12 collectively illustrate example stages of a multi-stage pipeline at which isolated virtual network configuration-related packet processing operations may be performed, according to at least some embodiments. FIG. 10 provides a summary view of all the stages of the multi-stage pipeline 1099, while FIG. 11 and FIG. 12 show additional details of various stages and their constituent rules. In the depicted embodiment, each stage comprises one or more rules which are executed sequentially; in other embodiments, such sequential execution may not be required. A rule may be applied to determine whether a corresponding action is to be performed on a packet being processed at a stage; the rule and/or the action itself may comprise an eBPF function or program in some embodiments. At least some of the operations performed at a stage may be driven by determining whether an entry can be found for the received packet in a lookup table or cache, such as a longest-prefix-match (LPM) table or a hash table indexed by a key generated from properties of the received packet. Three types of rules are shown by way of example in FIG. 10-FIG. 12: call rules (CRs), table-drive rules (TDRs) and filter rules (FRs). Call rules may be used to invoke or call one stage from another stage. Table-driven rules may utilize lookup tables to determine the action (if any) to be performed for a packet; an example action may for example include copying information contained in the lookup table entry into the packet's context information (similar to the context information discussed with respect to FIG. 9), to enable further processing to be performed based on the copied information. Table-driven rules may themselves comprise other stages as well as actions in some embodiments, with the stages being executed before the actions. Filter rules may be used for some types of conditional operations—e.g., to determine, based on information in a packet context, which stage should be executed next.

The pipeline 1099 shown at a high level in FIG. 10 (and in greater detail in FIG. 11 and FIG. 12) comprises the following stages: Root (block 1002), Ingress ACL (access control list) (block 1005), VNI (virtual network interface) route (block 1011), Local route (block 1009), Edge route (block 1012), Common VNI route (block 1013), Anycast (block 1018), and Destination VNI to underlying physical location index (PLI) (block 1020). The blocks with dashed outlines represent rules that are invoked at the stages; rules are numbered to indicate the sequence in which they are to be applied, with the numbers being shown using "#" symbols. Doubly-outlined block 1001 represents the entry of a packet into the pipeline, and doubly outlined block 1022 indicates an action performed when a packet exits the pipeline.

In the depicted embodiment, the pipeline represents IVN-related packet processing that may be performed to route packets between two virtual network interfaces (VNIs) in the same IVN, between two VNIs that are in different IVNs, or from an IVN to a boundary or edge networking device of a virtualized computing service (similar to members of the boundary device fleet 130 shown in FIG. 1). Various types of analysis are performed with respect to packets entering the pipeline from an IVN via the entry point represented in block 1001, e.g., using cached rules, lookup tables and actions at an FPPN, until the required information to route the packet towards its intended destination via the physical network of the virtualized computing service being used for the IVN (block 1022). The design of pipeline 1099, including the sequence in which the various stages are to be traversed for a given packet may, for example, be determined by VCS network administrators in the depicted embodiment; for other pipelines, application vendors may design the pipelines as discussed above. Hybrid pipelines that comprises both IVN-related and vendor-designed operations may be generated in at least some embodiments (e.g., at the SPPS control plane). In the Root stage 1002, for example, three rules may be applied in sequence (as indicated in FIG. 10 as well as FIG. 11). First, a table driven rule 1003 to add source VNI metadata in the packet's context information may be applied. Then, a call rule 1004 may be used to invoke a stage 1005 in which ingress ACL information may be extracted, stored in the packet context, and evaluated and finally, an Ingress route table driven rule 1008 (which itself comprises several possible stages and actions) may be applied. Depending on the results of the application of these initial rules, different paths may be taken in the graph of stages.

Some of the aspects of the pipeline-based approach towards packet processing, using small efficient programs that can be run very quickly at each stage of a pipeline, illustrated via the pipeline 1099, include the following. A given stage may have one rule (as in stages 1011, 1012, 1018 or 1020) or multiple rules (e.g., stages 1002, 1005, etc.). If a stage has multiple rules, they may be executed in sequence in at least some implementations. As mentioned above, rules may be table-driven rules (TDRs, e.g., rules 1003, 1006, 1007, 1008), call rules used for invoking other stages (CRs, e.g., rules 1004 or 1015). Some stages may be invoked from rules based on evaluated conditions (as in the case of the "if" clauses shown in rule 1008). If a rule comprises stages as well as actions (as in the case of rule 1008), the stages may be executed before the actions in at least some embodiments. Some or all rules may have default actions specified: e.g., if a matching entry in a lookup table is not found for a packet, the packet may be dropped in some cases (indicated by the "On Miss: Drop packet" terminology shown in various rules including 1003 and 1008), while in other cases (as in rule 1016), the fact that an entry was not found may simply be ignored (as indicated by "On Miss: Continue"). Some rules may simply be used to add context information for the packet for analysis during subsequent stages. Some operations performed in the IVN configuration related operations shown in pipeline 1099 may be related to security (e.g., in rules 1014 or 1017), while other operations may pertain to the use of encapsulation protocols (needed in an environment in which the network addresses assigned to sources and destinations may be virtual addresses, which have to be translated to physical addresses in the underlying VCS network) and routing, and so on. Rule 1017 represents an example of a conditional or filter rule, in which the next stage to be used for a given packet is selected based on the contents of the packet context (which were generated and stored in the context at an earlier stage of the pipeline). Note that pipeline 1099 is just one example of a multi-stage pipeline of moderate complexity that may be implemented using an SPPS; in various embodiments, more complex pipelines may be implemented, or less complex pipelines may be used for some types of applications.

Example Platforms for Packet Processing Nodes

Figure 13:
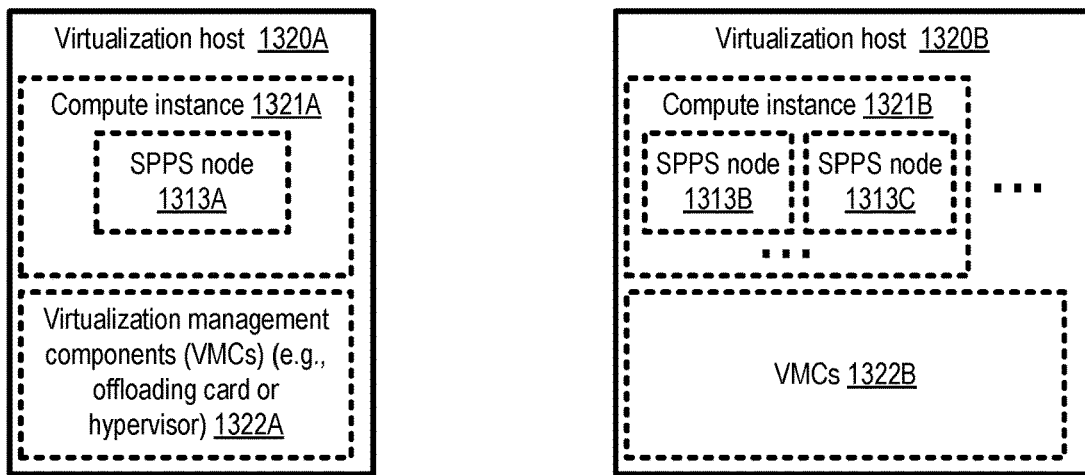
FIG. 13 illustrates example implementation platforms for packet processing nodes, according to at least some embodiments.
Figure 13:
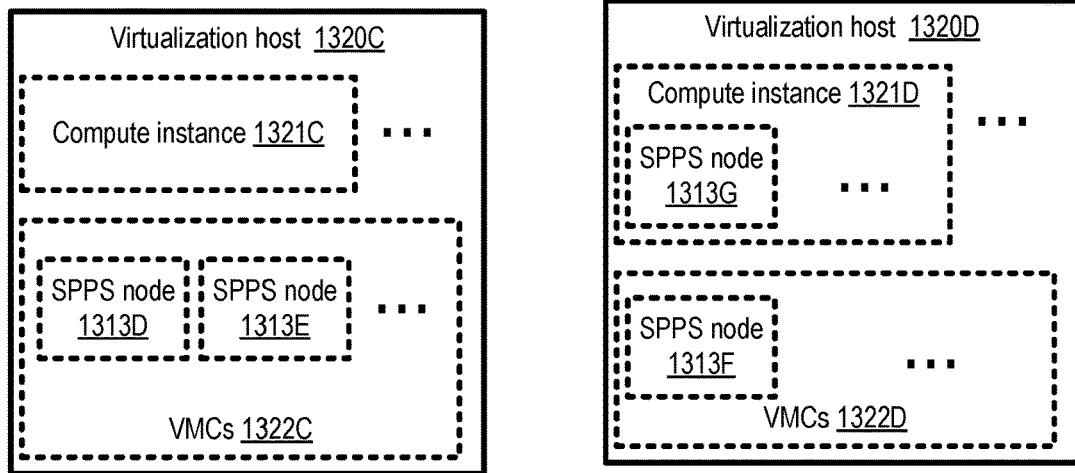
Figure 13:
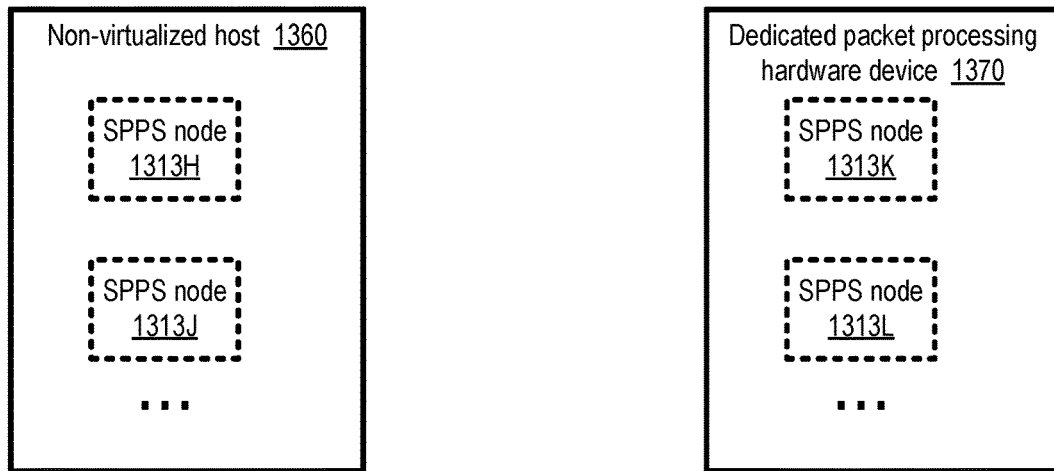

FIG. 13 illustrates example implementation platforms for packet processing nodes, according to at least some embodiments. In some embodiments, SPPS components such as FPPNs, SPPNs and the like may be implemented using virtualization hosts 1320 (e.g., 1320A, 1320B, 1320C or 1320D) of a virtualized computing service (VCS) similar to the VCS illustrated in FIG. 1. At a given point in time, a virtualization host 1320 may include zero or more compute instances (such as guest virtual machines) 1321 (e.g., 1321A-1321D) and a set of virtualization management components 1322 (e.g., 1322A-1322D). A variety of virtualization management components (VMCs) may be used in different embodiments, including for example a hypervisor that runs on the primary processors (CPUs) of the virtualization host, as well as offloaded VMCs that do not utilize the primary processors for at least some of their operations. A VMC may be termed "offloaded" if it takes over some of the virtualization management tasks (e.g., associated with encapsulation protocol processing or the like) that would otherwise be performed on the primary processors of the virtualization host, thereby offloading or reducing the work of the primary processors. In some embodiments, an offloaded VMC may comprise logic that is implemented on systems on chip (SOCs) of a card that is connected to the CPUs via peripheral interconnect such as a PCIe (Peripheral Components Interconnect-Express) interconnect. The computing capabilities of the SOCs or other elements of such cards may be utilized for SPPSs in some embodiments, e.g., in addition to or instead of being used for virtualization management tasks.

A number of alternative approaches with respect to running SPPS nodes on virtualization hosts are shown by way of example in FIG. 13. For example, in one embodiment, an SPPS node 1313A may be run only within a compute instance 1321A of a virtualization host 1320, e.g., using one or more user-mode processes, and no SPPS nodes may be run using VMCs. In another configuration, as shown in virtualization host 1320B, multiple SPPS nodes 1313B and 1313C (e.g., several different FPPNs, SPPNs, or a combination of FPPNs and SPPNs) may be run in a single compute instance in some embodiments. In other embodiments, one or more SPPS nodes such as 1313D and 1313E may run at the VMCs 1322B of a virtualization host. In one embodiment, SPPS nodes may be run within compute instances (such as SPPS node 1313G at CI 1321D of virtualization host 1320D) and also within VMCs (such as SPPS 1313F at VMCs 1322D of virtualization host 1320D). In at least some embodiments, SPPS nodes may be implemented within IVNs of a virtualized computing service, i.e., IVNs that are used specifically for packet processing operations (and thus differ from the IVNs at which the sources/destinations of the packets are configured).

In some embodiments, SPPS nodes may be run at non-virtualized hosts (e.g., SPPS nodes 1313H and 1313J at host 1360). According to one embodiment, dedicated special purpose packet processing hardware devices 1370 may be employed for some SPPS nodes such as 1313K and 1313L. In some data centers of a provider network, or at external networks at which SPPS data plane extensions are set up as described below, a combination of the SPPS node implementation approaches illustrated in FIG. 13 may be used.

Example Packet Processing Applications

Figure 14:
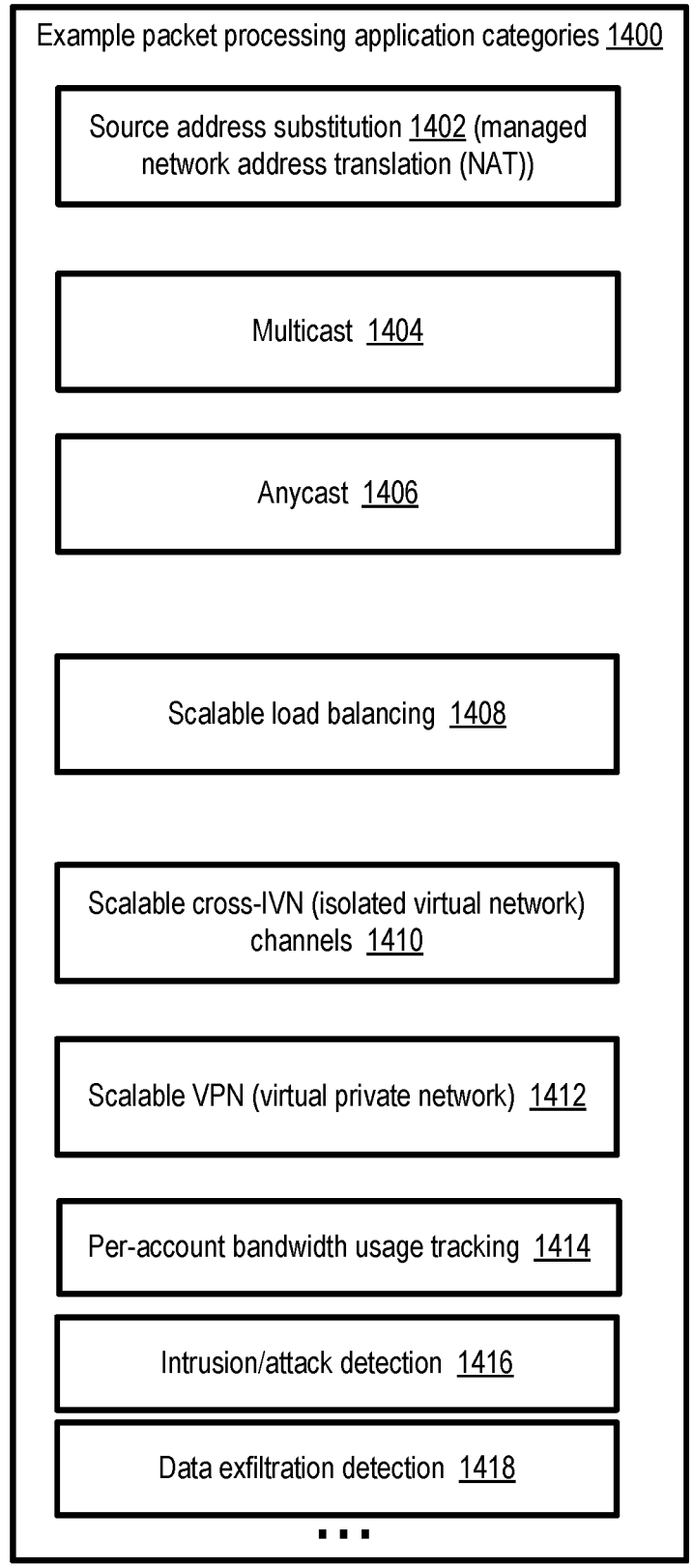
FIG. 14 illustrates example categories of packet processing applications that may be implemented using pipelines at a server-less packet processing service, according to at least some embodiments.

FIG. 14 illustrates example categories of packet processing applications that may be implemented using pipelines at a server-less packet processing service, according to at least some embodiments. In general, an SPPS with capabilities similar to that of the SPPS 102 shown in FIG. 1 may be configurable to implement any desired type of packet processing or transformations (or combinations of different types of packet processing or transformations), with nodes being assignable dynamically at each layer to support a large range of traffic rates in a transparent and scalable manner.

Source address substitution applications 1402, as the name suggests, may involve replacing, for the packets of a particular flow, the source address and port in a consistent manner. (As mentioned earlier, packet flows may be distinguished from one another in some embodiments based on a combination or tuple of properties such as the network protocol being used, the source and destination network address, the source and destination ports, a virtual network interface identifier associated with a pipeline or virtual appliance, and/or a direction of traffic.) Source address substitution techniques may be useful, for example, when an overlap exists between the private address ranges of two or more isolated networks, or when the actual addresses of one or more servers implementing a service using a load balancer are to be hidden from service consumers, and the SPPS may be employed as the intermediary responsible for such substitutions in some embodiments. Such address substitution operations may also be referred to as "managed network address translation (NAT)" in some embodiments. Multicast 1404 is a networking technique, implementable using an SPPS in some embodiments, in which contents (e.g., the body) of a single packet sent from a source are replicated to multiple destinations of a specified multicast group. In contrast, anycast 1406 may involve selecting, for all the packets of a given flow that are received at an SPPS, a particular destination from among a specified set of destinations.

Scalable load balancing 1408, as indicated by the name, involved distributing packets among a set of servers so as to prevent overloading of individual ones of the servers. For scalable cross-IVN channels 1410, the SPPS may in effect be used as an intermediary between the private address spaces of two or more different IVNs in some embodiments. In at least one embodiment, an SPPS may also or instead be used to support scalable VPN connectivity 1412 between some set of resources within a provider network and one or more client networks or client premises outside the provider network, or between multiple client-premises networks each linked via VPN connections to the SPPS. In some embodiments, a provider network may support connectivity with external networks via dedicated physical links called "direct connect" links, and the traffic between such external networks (and between such external networks and IVNs or VPN-connected external networks) may be managed using the SPPS.

In one embodiment, an SPPS may be employed for per-account bandwidth usage tracking 1414, e.g., by a telecommunications service provider. In at least some embodiments, the SPPS may be used for intrusion or attack detection 1416 (e.g., for detection of unexpected or unwanted traffic at resources of a particular business or governmental entity). Data exfiltration detection 1418 (e.g., the detection of undesired/unauthorized transmission of data out of a network of an organization) may be performed using SPPS pipelines in some embodiments. Note that at least in some embodiments, a single instance of virtual appliance or pipeline set up at an SPPS may combine several of the packet processing functions indicated in FIG. 14 (and/or other packet processing techniques). Other categories of packet processing applications may be supported using the SPPS in different embodiments, while some of the types of applications indicated in FIG. 14 may not be supported in some embodiments.

Example Entities Managed Using APIs

Figure 15:
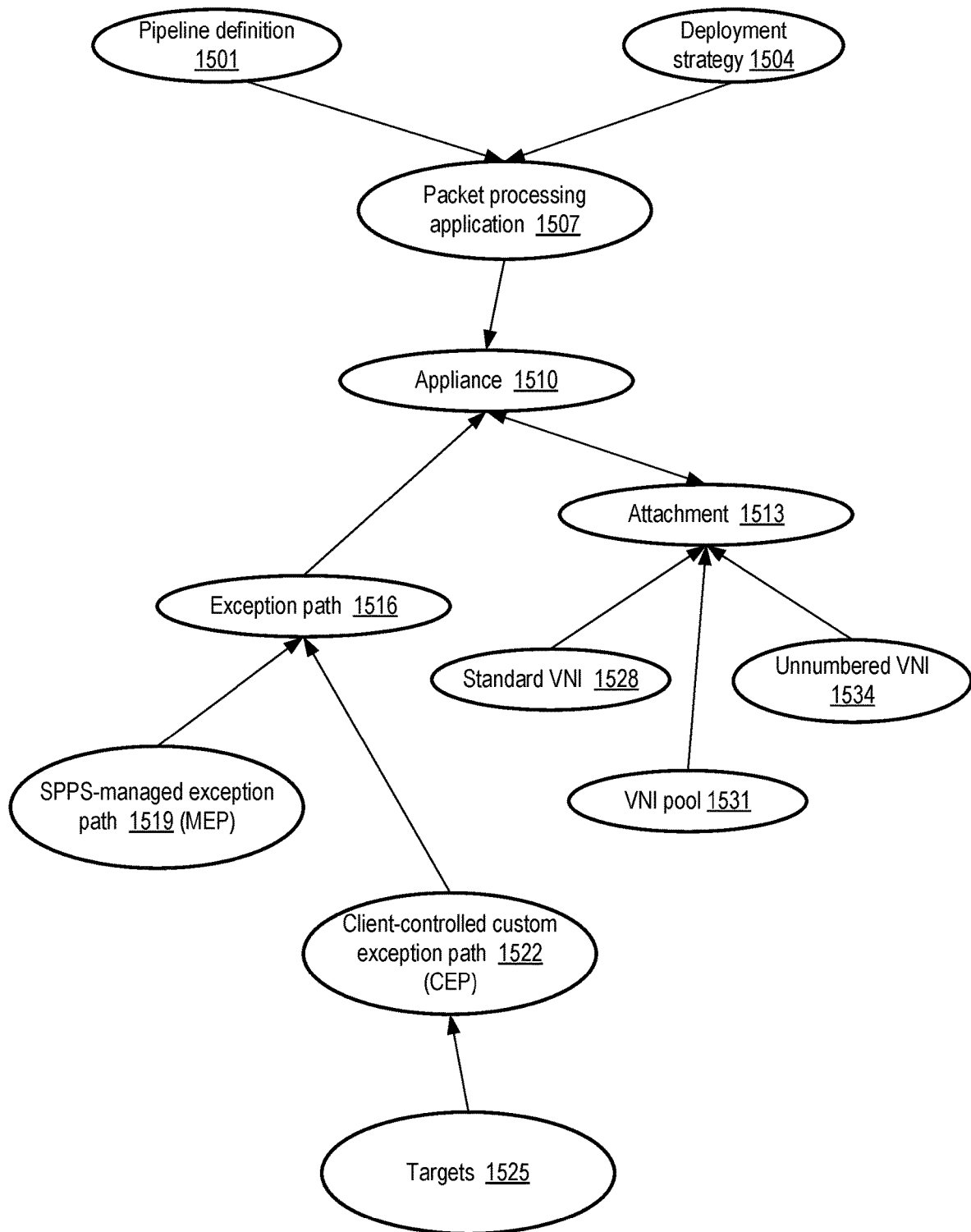
FIG. 15 illustrates example types of entities for which application programming interfaces may be implemented at a packet processing service, according to at least some embodiments.

Data structures representing various types of objects and entities associated with packet processing may be stored at an SPPS similar in features and functionality to SPPS 102 of FIG. 1 in various embodiments, and application programming interfaces to access and manipulate such data structures may be supported. FIG. 15 illustrates example types of entities for which application programming interfaces may be implemented at a packet processing service, according to at least some embodiments. Various pipeline definitions 1501, e.g., including information about the stages of the pipelines, the rules to be applied at each stage, the kinds of lookup tables to be used for the stages, etc., may be provided by a client of an SPPS in some embodiments. As mentioned earlier, a given pipeline may comprise stages with operations that are defined by an application vendor, stages with operations associated with IVN configuration (including security and routing related operations) defined by a network administrator, and/or stages for performing a combination of vendor-defined operations and IVN configuration-related operations. A packet processing application 1507 may represent an implementation of a pipeline definition 1501; thus, for example, one application A1 may implement a pipeline definition PD1 for some set of traffic endpoints TE1, and another application A2 may implement the same definition for another set of traffic endpoints TE2. Over time, modifications may be made to a pipeline definition (e.g., eBPF code being used for a stage may be improved), and such changes may have to be propagated for end users without disrupting the use of existing versions. A deployment strategy 1504 may be specified in some embodiments to indicate how various versions of a pipeline definition 1501 are to be rolled out or propagated so that traffic can be shifted as transparently as possible to the new versions.

From the perspective of end users of packet processing applications, the applications may be exposed using at least two types of virtual entities in the depicted embodiment: appliances 1510 and attachments 1513. For example, an application vendor may request an SPPS to (a) create an intrusion detection appliance 1510 that implements an application comprising a pipeline designed by the vendor and (b) make the appropriate networking configuration changes to generate an attachment 1513 at an IVN whose traffic is to be analyzed for intrusion detection. In some embodiments, a specific version of a pipeline may be "pinned" to an appliance, e.g., metadata may be stored at the SPPS indicating that new versions are not to be used for the appliance. An attachment may in effect create one or more entry and/or exit points that are reachable from the sources and destinations of the traffic to be processed in various embodiments. In some embodiments, attachments may also be used to enable connectivity between two appliances or two pipelines.

The networking configuration operations needed to create an attachment may, for example, include the establishment of one or more virtual network interfaces (VNIs). In various embodiments, a VNI may comprise a logical entity with a set of networking and security-related attributes that can be attached to (or detached from) a compute instance and/or other computing devices programmatically, or used for routing purposes within an IVN without necessarily being attached to a compute instance. For example, at least one IP (Internet Protocol) address "IPaddr1" may be assigned to a given virtual network interface VNI1, and security rules restricting inbound and outbound traffic may be set for VNI1. When that VNI is programmatically attached to a given compute instance CI1 launched at a host with a physical network interface card NIC1, network packets indicating IPaddr1 as their destination address (and complying with the security rules) may be received at CI1 via NIC1. In addition, outbound packets generated at CI1 may indicate IPaddr1 as their source address and may be physically transmitted towards their destinations via NIC1. If VNI1 is then programmatically detached from CI1 and attached to CI2 (which is executing at a different host with a different physical network interface card NIC2), the IPaddr1 traffic that was previously being received at CI1 may now be received at CI2, with the same security rules in place. In the depicted embodiment, an attachment 1513 may use one or more VNIs in any of three ways: (a) a standard VNI 1528 (e.g., with a private IP address within a targeted IVN) may be established for the attachment, (b) a VNI pool 1531 comprising a plurality of VNIs may be set up, e.g., as a gateway within a geographical region of a provider network, or (c) an unnumbered VNI 1534 (a VNI with an identifier that can be referred to as a destination in a route table entry, but to which an IP address has not been assigned) may be used.

Objects representing exception paths 1516 may be generated for some appliances to handle packet processing operations that are not to be performed at FPPNs—e.g., because FPPNs may limit the maximum size (and hence the complexity) of programs that can run on the FPPNs, because an application vendor wishes to perform some packet processing at customized or enhanced-security resources, or for other reasons. In some embodiments, as mentioned above, the maximum permitted size of a packet processing program that can run at FPPNs may be too small to accomplish some desired packet processing operations, or the maximum size of a lookup table that can be stored/examined at an FPPN may be too small to perform some desired table-based packet processing tasks, and exception paths may be used in such scenarios in some embodiments. Exception path processing nodes of at least two kinds may be employed in various embodiments: SPPS-managed nodes, and client-controlled nodes. An SPPS-managed exception path (MEP) 1519 may be utilized, for example, if the vendor or designer of a pipeline provides a description or specification of packet processing operations that cannot be performed using FPPNs to the SPPS, and allows the SPPS to perform those operations using a pool of computing devices selected by (and scaled up or down as needed by) the SPPS. The client on whose behalf the MEP is implemented may not have to make resource provisioning decisions for the exception path operations in the depicted embodiment; instead, the SPPS control plane may perform resource provisioning, health monitoring, failure recovery and so on for the exception path.

In an alternative approach, some clients may not provide the details of their exception path operations to the SPPS, and may instead use client-controlled or custom exception paths (CEPs) 1522. In such scenarios, the client may be responsible for resource provisioning, health management, failure recovery and so on for the computing devices used for the exception path processing in various embodiments. In the depicted embodiment, a client may provide an indication of a set of target resources 1525 (e.g., IP addresses of one or more client-controlled or client-owned devices) to which packet should be sent for exception path operations. In at least one embodiment in which traffic generated at (or directed to) one or more end-user IVNs is to be processed using a pipeline of the kind described above, the resources used for client-controlled CEPs may reside in a different IVN (e.g., an IVN configured on behalf of the application vendor) or even outside the provider network at which the end-user IVNs. Other types of entities than those shown in FIG. 15 may be used for representing metadata associated with packet processing operations in some embodiments.

Example Programmatic Interactions

Figure 16:
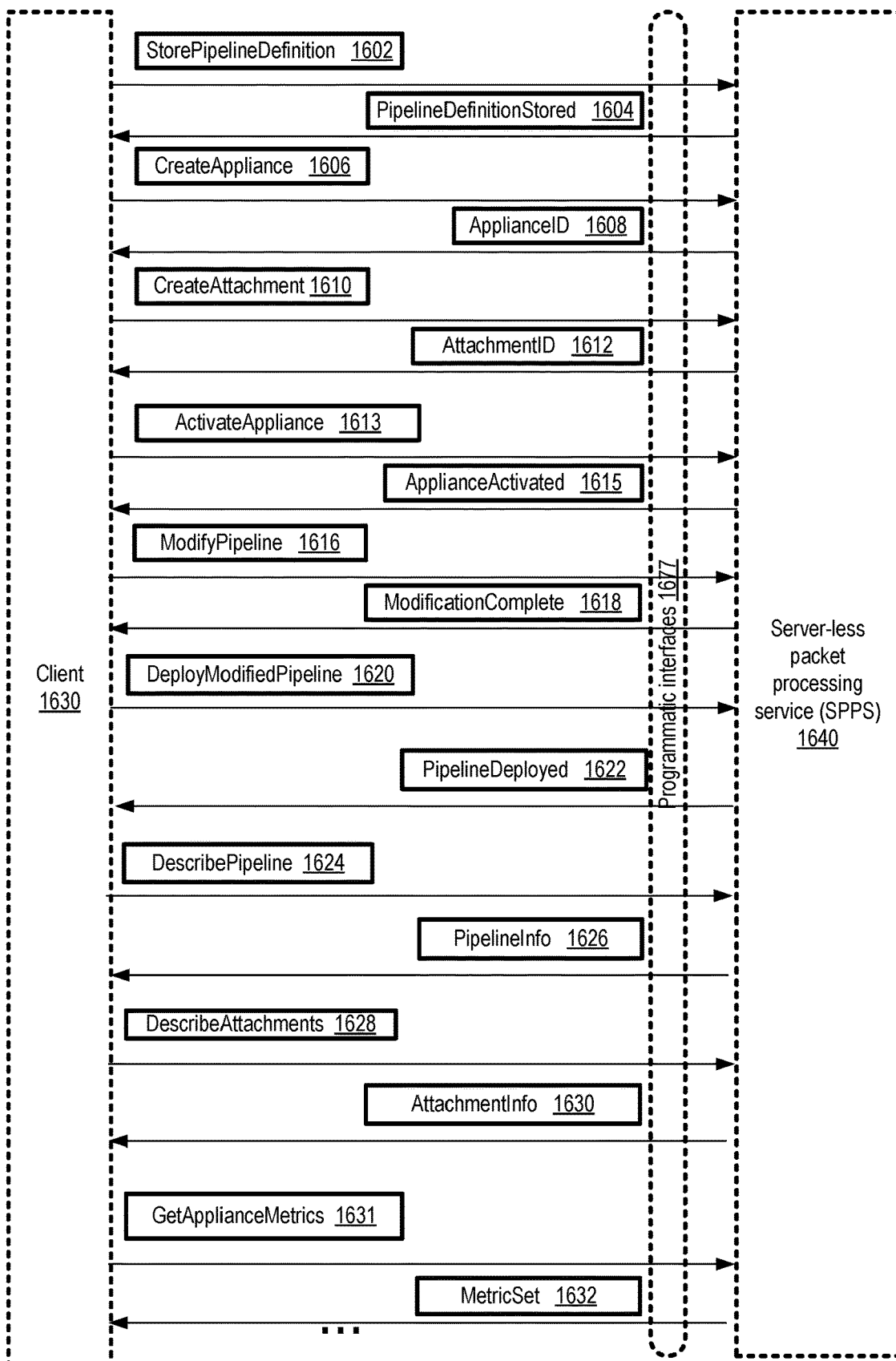
FIG. 16 and FIG. 17 illustrates example packet processing pipeline-related programmatic interactions, according to at least some embodiments.
Figure 17:
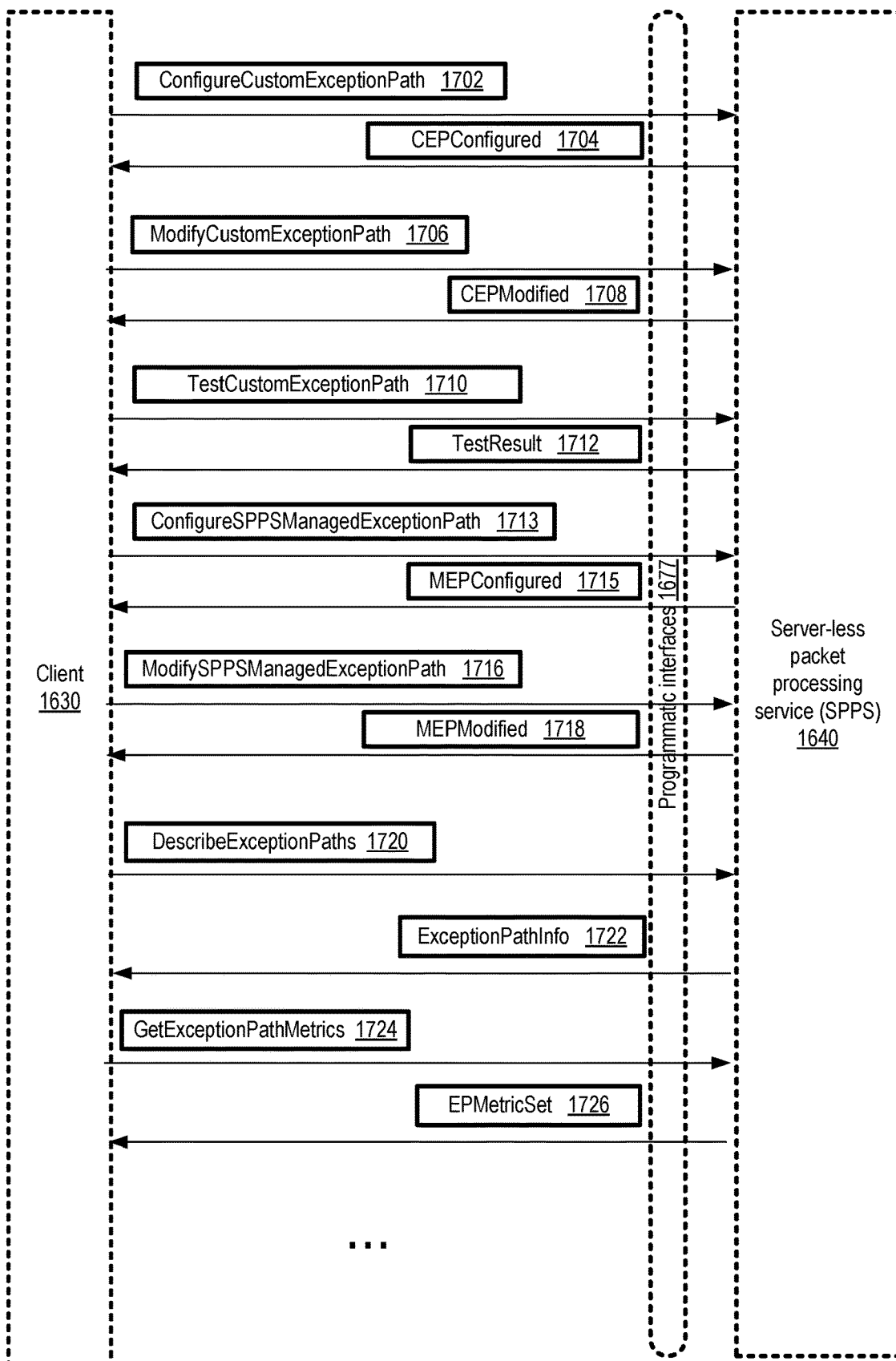

FIG. 16 and FIG. 17 illustrates example packet processing pipeline-related programmatic interactions, according to at least some embodiments. An SPPS 1640, similar in features and functionality to SPPS 102 of FIG. 1, may implement a set of programmatic interfaces 1677 which can be used by clients such as application vendors and/or end users of packet processing pipelines to submit various types of configuration-related requests and receive corresponding responses in the embodiments depicted in FIG. 16 and FIG. 17. The programmatic interfaces 1677 may include, for example, a set of application programming interfaces, command-line tools, graphical user interfaces, web-based consoles and the like in different embodiments.

As shown in FIG. 16, an SPPS client 1630 (such as a vendor of a packet processing application, or a network administrator of a virtualized computing service) may submit a pipeline definition to the SPPS 1640 in StorePipelineDefinition request 1602. Descriptors for the stages of the pipeline, including the rules to be executed at each stage, the kinds of lookup tables to be used, the actions to be performed, and so on, may be included in the StorePipelineDefinition request in the depicted embodiment. Executable or source code versions of programs (e.g., in eBPF) to be executed to implement the rules and actions may be included in the request in at least some embodiments. In one embodiment, the SPPS may provide an integrated development environment (IDE) and/or other tools that can be used by clients 1630 to generate pipelines, verify that pipelines meet the resource restrictions (e.g., memory size limit, program length limit, etc.) of FPPNs of the SPPS, and so on. In at least some embodiments, before accepting or deploying a pipeline, the SPPS may implement an internal administrative workflow to ensure that the programs provided by a pipeline submitter meet desired isolation criteria—e.g., that a given pipeline's programs do not attempt to access data structures that are intended to be accessed only from other pipelines. Programs/pipelines that meet such isolation criteria may be run safely in a multi-tenant manner, e.g., programs of pipeline P1 (provided by application vendor V1) may be run, if needed, at the same FPPN or host as programs of pipeline P2 (provided by application vendor V2). In response to receiving the StorePipelineDefinition request 1602, a representation of the pipeline may be stored at a repository of the SPPS, and a PipelineDefinitionStored response 1604 may be provided in some embodiments.

To present an instance of the pipeline to a set of end users, the client on whose behalf the definition was stored may submit a CreateAppliance request 1606, e.g., indicating the pipeline definition to be implemented using the appliance and/or the set of compute instances whose traffic is to be processed using the instance. In response, the SPPS control plane may in some embodiments assign a set of FPPNs and/or other nodes, e.g., based on the count of traffic sources, store metadata identifying the appliance and the nodes selected for the appliance, and provide an appliance identifier of the newly-created appliance in an ApplianceID message 1608 in the depicted embodiment.

The client 1630 may submit a CreateAttachment request 1610 via programmatic interfaces 1677 in some embodiments, e.g., to set up one or more VNIs (virtual network interfaces) or other constructs that can be used as targets (pipeline entry points) for the traffic to be processed, or as sources (pipeline exit points) from which the results of the packet processing operations performed at the pipeline can be obtained. The appropriate networking configuration operations (e.g., creation of the VNIs, assignment of addresses, generation of route table entries, etc.) may be performed at the SPPS, and an attachment identifier may be provided in an AttachmentID message 1612 in some embodiments.

In some embodiments, the creation of an attachment in response to the request 1610 may enable traffic to flow to the pipeline. In other embodiments, an ActivateAppliance request 1613 may be sent to cause packets to be directed to the pipeline via an attachment; that is, the creation of an attachment by itself may be insufficient to start processing packets at the appliance. In response to an ActivateAppliance request 1613, the appropriate networking configuration changes to enable packet to be directed to the FPPNs of the appliance may be made at the SPPS 1640, and an ApplianceActivated response 1615 may be sent to the client.

If the creator of a pipeline, or some other authorized client, wishes to change a pipeline (e.g., by modifying the rules/actions/programs corresponding to one or more stages, by adding/combining/eliminating one or more stages, etc.), a ModifyPipeline request 1616 indicating the changes may be submitted to the SPPS in some embodiments. If the changes are found acceptable, they may be applied, e.g., by creating a new version of the pipeline without removing the existing version, and a ModificationComplete message 1618 may be sent to the requester.

A DeployModifiedPipeline request 1620 may be sent by a client to the SPPS to cause the new version of the pipeline to be propagated to the appropriate data plane nodes in some embodiments. After the changes are propagated (e.g., in accordance with a deployment strategy of the kind discussed in the context of FIG. 15), a PipelineDeployed message 1622 may be sent by the SPPS to the client.

A DescribePipeline request 1624 may be submitted by a client 1630 to obtain information about a created pipeline definition. The requested information may be provided in a PipelineInfo message 1626 by the SPPS. Similarly, to learn about the set of attachments created for one or more appliances, a DescribeAttachments request 1628 may be submitted, and the requested information may be provided in an AttachmentInfo message 1630.

In at least some embodiments, the SPPS may capture metrics associated with various appliances, including for example the total number of packets processed per unit time, the total number of bytes transmitted per unit time, and so on. A GetApplianceMetrics request 1631 may be submitted by a client 1630 to obtain such metrics, and the requested metrics may be provided using a MetricSet response message 1632 in the depicted embodiment.

As shown in FIG. 17, a ConfigureCustomExceptionPath request 1702 may be submitted by a client in some embodiments to request the establishment of a client-managed exception path of the kind discussed above in the context of FIG. 15. The request 1702 may, for example, include an indication of one or more targets, selected by the client, to which packets may be sent for exception path processing associated with a pipeline or appliance. The information provided in the request 1702 may be saved at the SPPS, e.g., as part of the metadata of the appliance, and a CEPConfigured message 1704 may be sent in response.

A client may make changes to the custom exception path in various embodiments, e.g., by adding targets, removing targets, or changing the stages of the pipeline from which the exception path is accessed for a given packet, and such changes may be indicated via a ModifyCustomException- Path request 1706. After a representation of the changes has been stored at the SPPS, a CEPModified response 1708 may be provided to the client.

In some embodiments in which a custom exception path is configured for a packet processing application, a client may wish to ensure that the targets set up for the path will respond to packets sent to them, and the SPPS 1640 may provide a mechanism to test the targets. Such a mechanism may be invoked by sending a TestCustomExceptionPath request 1710 (e.g., indicating examples of the kinds of packets to be sent to the custom exception path targets, and the kinds of responses expected), and the results of the testing may be provided in a TestResult message 1712.

A ConfigureSPPSManagedExceptionPath request 1713 may be submitted by a client 1630 to request the establishment of a SPPS managed exception path of the kind also discussed above in the context of FIG. 15. The request 1713 may, for example, include an indication of the operations to be performed at the SPPS managed exception paths. The information provided in the request 173 may be saved at the SPPS, e.g., as part of the metadata of the appliance, and a MEPConfigured 1715 message may be sent in response.

A client may make changes to the SPPS managed exception path in various embodiments, e.g., by indicating new operations sequences to be performed, and such changes may be indicated via a ModifySPPSManagedExceptionPath request 1716. After a representation of the changes has been stored at the SPPS, an MEPModified response 1718 may be provided to the client.

Information describing configured exception paths of an appliance or pipeline may be obtained using DescribeExceptionPaths requests 1720 in at least some embodiments, e.g., for SPPS managed or client-controlled custom exception paths. The SPPS may provide a response containing the available information in an ExceptionPathInfo message 1722.

In at least one embodiments, the SPPS may capture metrics associated with exception paths set up for various appliances, including for example the total number of packets processed per unit time via the exception paths, the total number of bytes transmitted using exception paths per unit time, and so on. A GetExceptionPathMetrics request 1724 may be submitted by a client 1630 to obtain such metrics, and the requested metrics may be provided using an EPMetricSet response message 1726 in the depicted embodiment. In one embodiment, the SPPS 1640 may be able to monitor the health of at least some custom exception path resources (e.g., by sending ping-like messages to ascertain whether the resources are responsive) being used on behalf of a client, and such health metrics may be provided to the clients via EPMetricSet messages 1726. In some embodiments, programmatic interactions other than those shown in FIG. 16 and FIG. 17 may be used to perform pipeline configuration-related operations.

Example Exception-Path Packet Processing Scenarios

Figure 18:
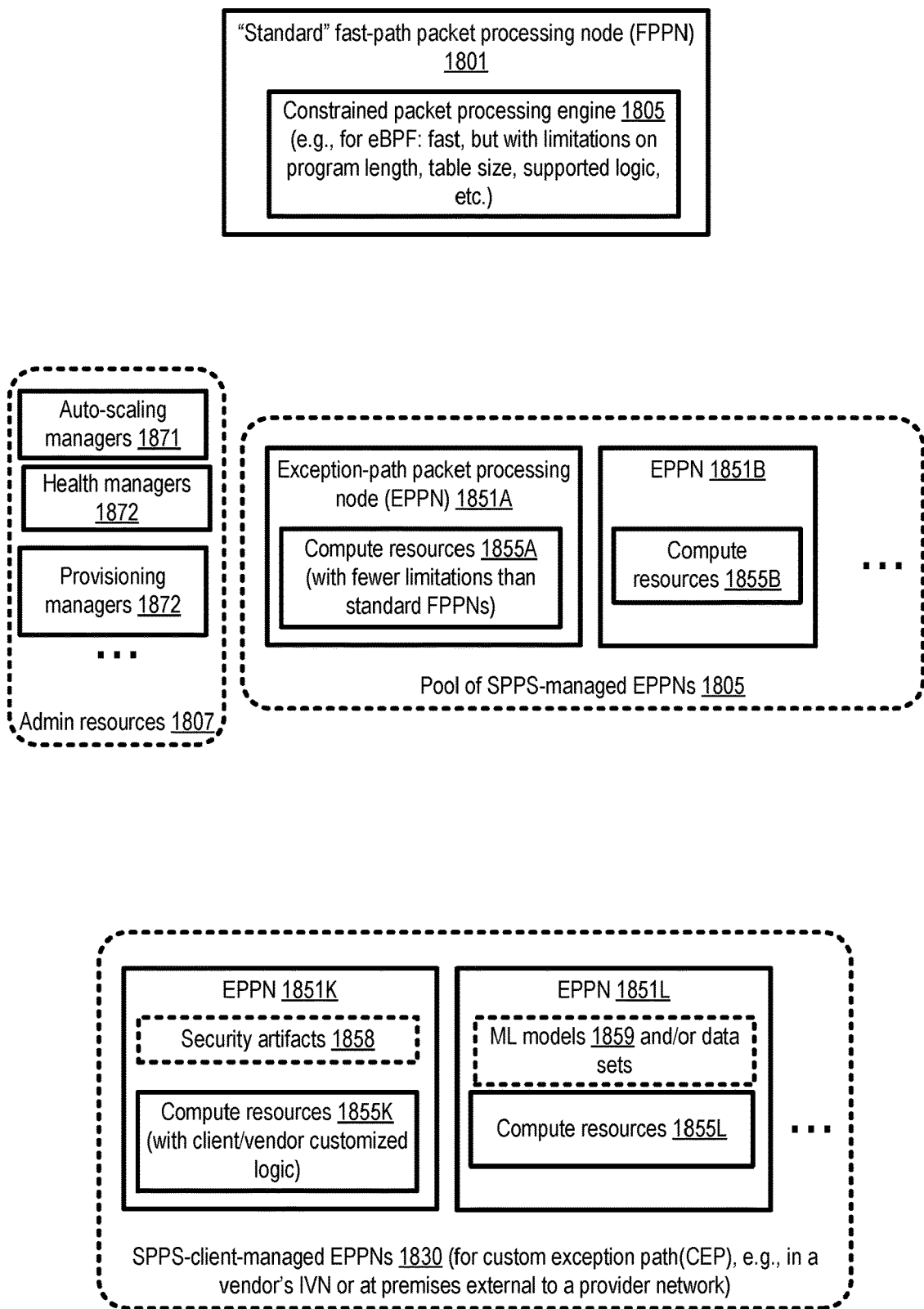
FIG. 18 illustrates example exception-path packet processing scenarios, according to at least some embodiments.

FIG. 18 illustrates example exception-path packet processing scenarios, according to at least some embodiments. In the depicted embodiment, three types of nodes at which packet processing operations may be performed are shown: a "standard" FPPN 1801 of an SPPS, exception path packet processing nodes (EPPNs) 1851A and 1851B which are configured in SPPS-managed pools, and EPPNs 1851K and 1851K which are used for client-controlled custom exception paths.

In the depicted embodiment, the standard FPPN 1801 may include a constrained packet processing engine 1805. Such an engine, which may for example comprise a register-based virtual machine usable for eBPF programs, while capable of executing packet processing programs rapidly, may be constrained with respect to the complexity and size of tasks that can be performed. The total amount of memory available for a given program may be small, for example, so that large lookup tables cannot be used, or the maximum number of instructions that can be included in a program may be low. Only certain types of executable instructions may be supported in some embodiments: e.g., some types of loop constructs may not be permitted in the programs executed at the engine 1805. The engine 1805 may be sufficient for a wide variety of packet processing operations, but some applications may require larger tables to be accessed, or more sophisticated programs to be run for at least a subset of packets received at a pipeline. In some cases the packet processing operations to be performed may require one or more security artifacts (e.g., cryptographic keys) that are not accessible from the standard FPPNs 1801—i.e., the FPPNs may not be granted permissions to, or be provided with, the security artifacts. For example, some packet processing applications may involve terminating secure networking sessions such as TLS (Transport Layer Security) or SSL (Secure Sockets Layer) sessions, and cryptographic keys used for such applications may not be available from FPPNs. In some embodiments, at least some FPPNs may not have the compute resources needed to perform encryption/decryption operations needed for some types of packet processing (even if security artifacts for such operations were available at the FPPNs).

To cater to such demands that cannot be satisfied by standard FPPNs 1801 of the SPPS, one or more EPPNs 1851 may be configured in the depicted embodiment. Such EPPNs may have compute resources 1855 (e.g., 1855A, 1855B, 1855K or 1855L) that are less restricted with respect to the kinds of tasks that can be performed. In some cases, a pool of EPPNs 1805 managed by the SPPS control plane may be set up, administered using SPPS resources 1807 including auto-scaling managers 1871, health managers 1872, and provisioning managers 1872. If and when the exception path workload at such a pool increases (e.g., as a result of the configuration of additional traffic sources), or EPPNs fail, additional resources may be deployed by the administrative resources 1807. In effect, the client on whose behalf the SPPS managed EPPN pool is set up may obtain similar benefits with regard to scalability, availability, and reliability as are obtained for standard FPPNs, without being limited to the restrictions of the standard FPPNs.

In some cases a client may not necessarily want to use SPPS-managed resources for exception path processing. This may be the case, for example, if proprietary, highly sensitive packet processing algorithms that the client does not wish to expose to the SPPS are to be used (e.g., using one or more security artifacts 1858 such as cryptographic keys), or if rapid changes to the packet processing algorithms or lookup tables are anticipated. In some embodiments, the SPPS may enable such users to set up a pool of client-managed EPPNs 1830, such as EPPNs 1851K and 1851L. In some cases, machine learning models 1859 and/or other data sets (which may not necessarily be security-related) may be used for packet processing at EPPNs such as 1851L, e.g., in scenarios in which it may not be practical to use such models or data sets at the standard FPPNs of the SPPS, or simply because an SPPS client does not wish to provide the models or data sets to the SPPS. In some implementations standard FPPNs and/or other data plane resources of an SPPS may be set up within an SPPS-managed IVN, and the client-managed EPPNs 1830 may be configured within a different IVN (e.g., an IVN established on behalf of an application vendor); note that both than these IVNs differ from the IVNs whose traffic is to be processed. In at least one embodiment, client-managed EPPNs may be set up at premises external to the provider network. In some embodiments, at least some security artifacts 1858 (such as cryptographic keys usable for TLS/SSL sessions) that are inaccessible at FPPNs may be transmitted to SPPS-managed EPPNs to enable some types of security-related packet processing operations that cannot be performed at standard FPPNs to be performed at the SPPS-managed EPPNs.

Example Extensions of Packet Processing Service

Figure 19:
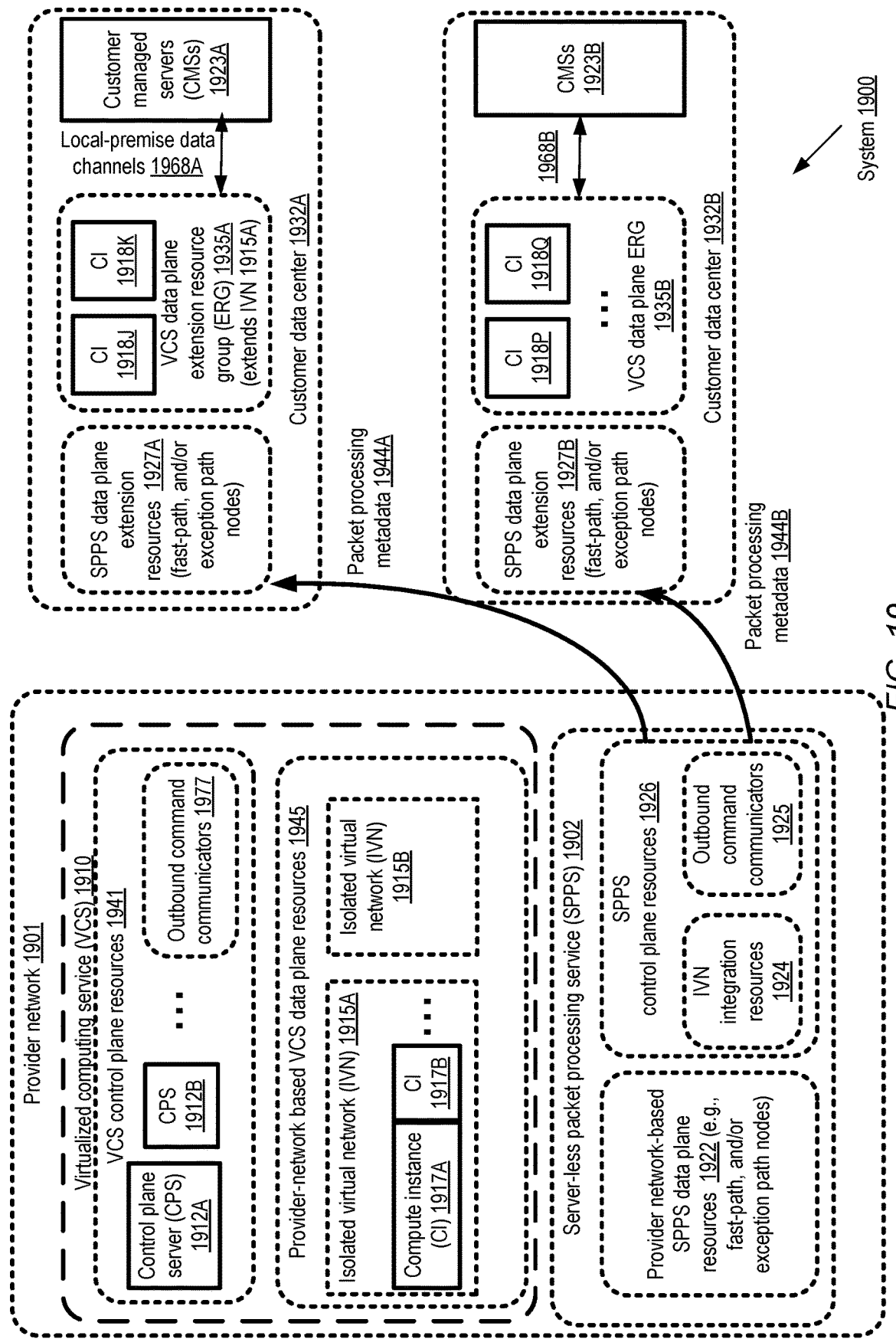
FIG. 19 illustrates an example system environment in which data plane extensions of a provider network's packet processing service may be implemented at premises outside the provider network, according to at least some embodiments.

FIG. 19 illustrates an example system environment in which data plane extensions of a provider network's packet processing service may be implemented at premises outside the provider network, according to at least some embodiments. As shown, system 1900 may comprise resources and artifacts of several network-accessible services of a provider network 1901, including a virtualized computing service (VCS) 1910 and a server-less packet processing service (SPPS) 1902. The provider network 1901 may comprise one or more data centers in the depicted embodiment. Each of the provider network services may comprise a set of administrative or control plane resources (e.g., SPPS control plane resources 1926 and VCS control plane resources 1941, which may include a plurality of control plane servers 1912 such as 1912A or 1912B), located within the data centers of the provider network.

At a high level, the VCS 1910 and the SPPS 1902 may provide functionality and features similar to those of the VCS and SPPS discussed in the context of earlier figures including FIG. 1, with the added capability of extending the data planes of both services at premises outside provider network data centers. For example, some number of data plane nodes 1922 of the SPPS (including, for example, fast-path packet processing nodes, slower-path or exception-path packet processing nodes, nodes used for storing state information, etc.) may be maintained within the provider network data centers with the help of the SPPS control plane resources 1926 as discussed earlier. A subset of data plane resources 1945 of the VCS 1910, located within the provider network, may comprise a plurality of isolated virtual networks (IVNs) 1915, such as IVN 1915A or 1915V, at which respective sets of compute instances (CIs) 1917 such as 1917A or 1917B may be set up, e.g., with the help of the VCS control plane resources 1941.

A subset of data plane resources of both the VCS and the SPPS may be configured (e.g., in response to programmatic requests) at customer data centers such as 1932A and 1932B in the depicted embodiment, and/or at other facilities that are external to the provider network, such as co-location facilities and the like. For example, a VCS data plane extension resource group (ERG) 1935A may include a set of compute instances 1918J and 1918K set up at virtualization hosts at customer data center 1932A, and another VCS data plane extension resource group 1935B comprising compute instances 1918P and 1918Q may be set up at virtualization hosts located at customer data center 1932B. The respective CIs in the VCS data plane ERGs may be configured within corresponding IVNs in the depicted embodiment. CIs 1918J and 1918K may be configured within IVN 1915A, thus logically extending IVN 1915A to the customer data center 1932A, while CIs 1918P and 1918Q may be established within IVN 1915B, thus logically extending IVN 1915B to the customer data center 1932B. In order to perform the configuration operations associated with VCS data plane extensions securely, a combination of techniques may be employed in different embodiments—e.g., a set of enhanced-security virtualization hosts with verified/attested software stacks may be delivered in pre-configured racks to the customer data centers, a special secure boot sequence may be used to launch respective control plane agent processes within the racks, and/or one or more outbound command communicators (OCCs) 1977 may be employed to transmit VCS control plane commands to the agents from the provider network data center via secure (encrypted) communication channels.

In some embodiments, analogous techniques may be used to establish SPPS data plane extension resources such as 1927A or 1927B at the customer data centers 1932A and 1932B. For example, a set of enhanced-security hardware devices with verified/attested software stacks for SPPS data plane nodes (e.g., including some number of FPPNs and some number of SPPNs) may be delivered within pre-configured racks to the customer data centers, a special secure boot sequence may be used to launch respective SPPS control plane agent processes within the racks, and/or one or more outbound command communicators 1925 may be employed to transmit SPPS control plane commands to the agents from the provider network data center via secure (encrypted) communication channels. In some embodiments, a given rack of hardware devices set up for VCS data plane extensions may also be used to house SPPS data plane nodes at an external premise—e.g., some SPPS nodes may be implemented using respective compute instances at virtualization hosts within the same rack as the compute instances whose packets are to be processed using SPPS-implemented pipelines. In one embodiment, the SPPNs set up at a customer data center 1932 may include one or more state information repository nodes (similar to SRNs 274 shown in FIG. 1). Only a subset of state information of the pipelines being implemented, needed for processing the traffic of the customer data center 1932, may be stored at such SRNs in such an embodiment. Note that in at least some embodiments, when a client of an SPPS or the VCS issues configuration or administration related requests pertaining to data plane extensions of either service, the requests may be transmitted to the service control planes using the same kinds of paths that are used for requests related to data plane resources within the provider network; that is, command communicators 1977 or 1925 may not be required for inbound requests in such embodiments.

In various embodiments, the SPPS control plane resources 1926 may transmit packet processing metadata 1944 (e.g., 1944A or 1944B) from the provider network data centers to the external premises at which SPPS data plane nodes are set up, e.g., using one or more outbound command communicators 1925. For example, an SPPS client such as a vendor of a packet processing pipeline or appliance may transmit an indication of a pipeline to be implemented for traffic of a given IVN 1915 to the SPPS control plane resources. The IVN integration resources 1924 of the SPPS control plane may collect configuration information of the IVNs, and corresponding IVN configuration-related packet processing pipelines may be generated in various embodiments as discussed earlier. A representation of at least a portion of the vendor-submitted pipeline and the IVN configuration-related operations (e.g., in the form of eBPF programs that can be cached at FPPNs) may be transmitted to the SPPS data plane extension resources 1927A or 1927B in the depicted embodiment. In various embodiments, instances of packet processing appliances, as well as entry and exit points of the appliances, may be set up at the external premises, e.g., in response to programmatic requests received at the SPPS control plane. The number of external premise-based nodes allocated to a given appliance or pipeline instance may be increased or increased dynamically by the SPPS control plane in various embodiments, e.g., based on the number of traffic sources of the pipeline. Similarly, shuffle-sharding techniques similar to those illustrated in FIG. 5 may be used to identify the particular set of external premise-based SPPS nodes that are to handle packet processing for a given traffic source of a pipeline in at least some embodiments.

When a packet is received at the SPPS extension resources from a traffic source of a pipeline instance (e.g., a source at the external premise, or a source within the provider network data centers), the appropriate combination of IVN configuration-related and vendor-defined packet processing operations may be performed at the extension resources. For example, if rules and/or actions for the packet are found in a FPPN cache at the external premise, they may be executed; otherwise a slower-path resource may be consulted to determine the operations to be performed by the FPPNs. Based on the results of the packet processing performed at the SPPS data plane extensions on a given received packet, one or more packets corresponding to the received packet (e.g., a transformed version of the received packet) may be transmitted to a destination (either in the provider network data centers, at the local premise, or at a different location) in some cases; in other cases, the given received packet may simply be dropped based on the packet processing results. In at least some embodiments, custom exception path targets (similar to the targets discussed earlier, used for performing operations that are not performed at the FPPNs of the SPPS) may also be set up for the pipelines instantiated at the external premises—e.g., targets that may be co-located with the SPPS data plane extensions at the external premises may be used, targets within the provider network data centers may be used, or targets at other external premises may be used.

In some embodiments, external premises such as customer data centers 1932 may include respective sets of customer managed servers (CMSs) such as 1923A and 1923B, which may be linked to the VCS data plane ERGs via local-premise data channels 1968A or 1968B. The CMSs may serve as sources and/or destinations of some of the traffic processed using the SPPS data plane extensions in various embodiments. In some embodiments, the CMSs may for example comprise servers used for applications being run from the CIs of the local VCS data plane ERGs, and locating the CIs near such applications may help achieve lower latencies for the message traffic associated with such applications.

According to at least some embodiments, SPPS data plane extension resources 1927 may also or instead be set up at other types of premises, and may not be limited to customer data centers. In some cases, the external premise at which SPPS data plane extension nodes are set up may not necessarily include VCS data plane ERGs. In some embodiments, a portion of a given pipeline may be implemented using provider network-based SPPS data plane nodes, and another portion of the same pipeline may be implemented using one or more SPPS data plane extensions. In one embodiment, an outbound packet, generated as the result of packet processing at an SPPS data plane extension node at one external premise, may be transmitted to another SPPS data plane extension node at another external premise—that is, some pipelines may be implemented using SPPS data plane extensions at multiple premises outside the provider network data centers.

Example Premises for Packet Processing Service Extensions

Figure 20:
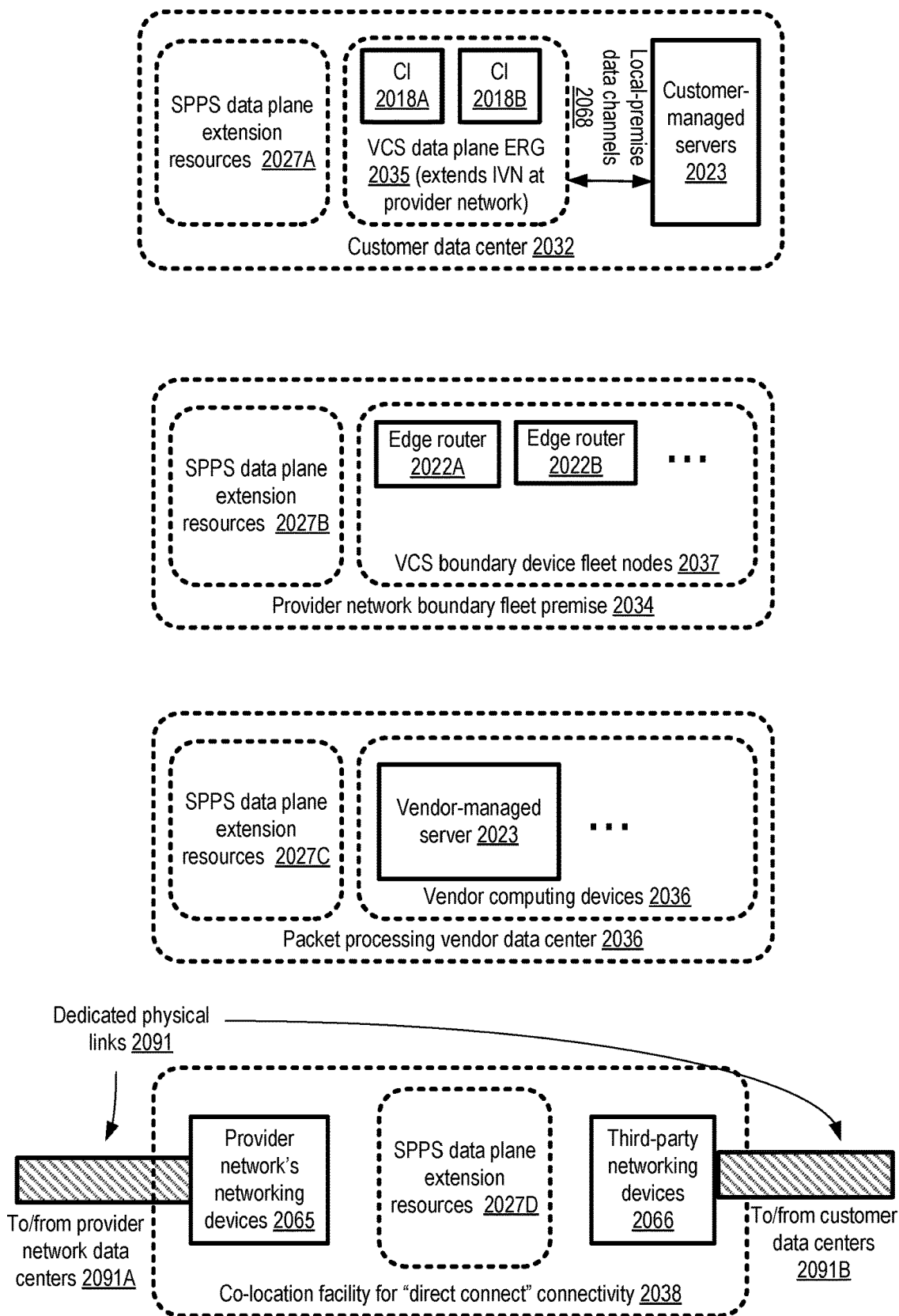
FIG. 20 illustrates examples of types of premises at which packet processing service extensions may be implemented, according to at least some embodiments.

FIG. 20 illustrates examples of types of premises at which packet processing service extensions may be implemented, according to at least some embodiments. As was also illustrated in FIG. 19, in one example scenario extension resources 2027A of the data plane of a server-less packet processing service (SPPS) may be deployed at a customer data center 2032. The customer data center 2032 may in some cases include an extension resource group 2035 of a virtualized computing service (VCS), e.g., comprising some number of compute instances (CIs) such as 2018A and 2019B set up at enhanced-security virtualization hosts, although the establishment of VCS ERGs 2035 may not be required for SPPS data planes functionality to be extended to customer data centers in at least some embodiments. Local-premise data channels 2068 may connect the SPPS data plane resources 2027A and/or the VCS ERG 2035 to a set of customer-managed servers 2023 in the depicted embodiment.

According to at least one embodiment, SPPS extension resources may be deployed at a premise 2034 at which a portion of a provider network's boundary device fleet is located. For example, VCS boundary device fleet nodes 2037 may comprise some number of edge routers (e.g., 2022A and 2022B) configured as intermediaries for network packets received from (or sent to) the public Internet or from other networks, and such edge routers may be established within special geographically distributed premises 2034, separate from the primary data centers of the provider network, in some embodiments. Housing SPPS data plane extension resources 2027B in the same premises as the boundary devices may help improve the performance of packet processing applications for traffic leaving or entering the provider network in such embodiments, e.g., via virtual private network (VPN) tunnels and the like.

As mentioned earlier, in at least some embodiments SPPS resources may be employed on behalf of packet processing application vendors, as well as other provider network clients that use applications developed by such vendors. In some embodiments, SPPS data plane extension resources 2027C may be deployed at data centers 2036 of the application vendors, which may also comprise vendor-owned computing devices 2036 including vendor-managed servers 2023. Such placements of SPPS extension resources may be especially beneficial in some embodiments in which custom exception path targets (similar in functionality to the exception path resources discussed earlier, e.g., in the context of FIG. 17 or FIG. 18) are set up using vendor-managed servers.

Some provider network clients may wish to utilize dedicated high-bandwidth physical links (i.e., links that are not shared with traffic of the public Internet) for traffic flowing between the provider network and client premises outside the provider network. In various embodiments, connectivity enabled using such dedicated physical links may be referred to as "direct connect" connectivity. Co-location facilities 2038, at which networking resources 2065 (e.g., routers) of the provider network, as well as third-party networking devices 2066 (or customer-owned networking devices) are housed may be employed for facilitating direct connect traffic in some embodiments. In some embodiments, SPPS data plane extension resources 2027D may be deployed at such co-location facilities as well, e.g., to allow sophisticated packet processing pipelines of the kind introduced earlier to be implemented for traffic flowing via the dedicated physical links 2091A (to/from provider network data centers) and 2091B (to/from customer data centers). In some embodiments, SPPS data planes may be extended to other types of premises, not shown in FIG. 20.

Example SPPS Extension-Related Programmatic Interactions

Figure 21:
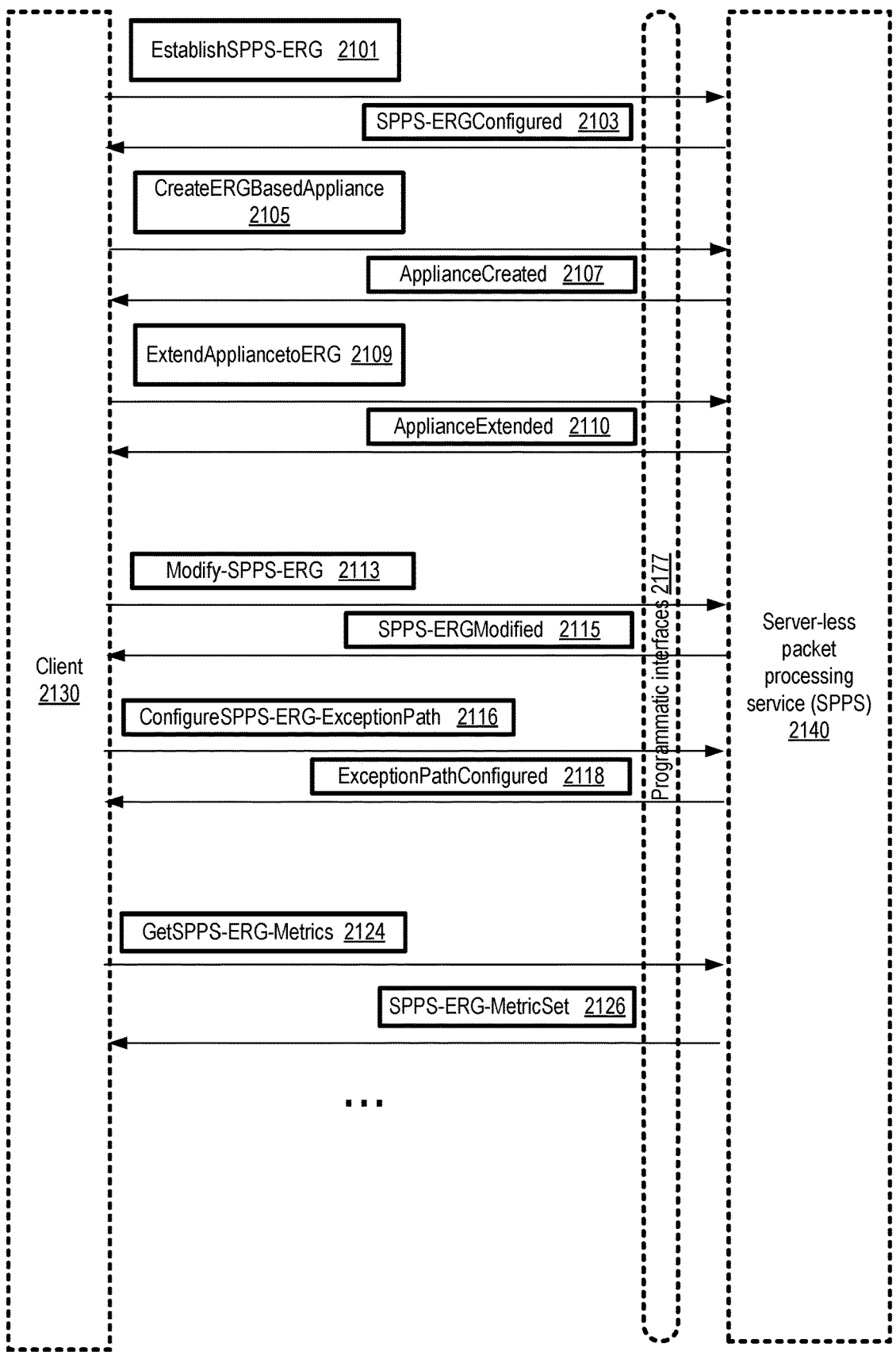
FIG. 21 illustrates example programming interactions related to packet processing service extensions, according to at least some embodiments.

FIG. 21 illustrates example programming interactions related to packet processing service extensions, according to at least some embodiments. In the depicted embodiment, an SPPS 2140 which supported data plane extensions to premises outside a provider network may implement one or more programmatic interfaces 2177 such as a set of APIs, command-line tools, web-based consoles, graphical user interfaces and the like. An EstablishSPPS-ERG request 2106 may be submitted via the programmatic interfaces 2177 by an SPPS client 2130 to request the establishment of an extension resource group of the SPPS (SPPS ERG) at a specified premise. After the appropriate control plane operations to set up the SPPS ERG are initiated or completed, an SPPS-ERGConfigured message 2103 may be sent to the client 2130 in the depicted embodiment. In some embodiments, the request 2106 may include an indication of one or more resource groups such as IVNs that have already been established on behalf of the client, enabling the SPPS to determine the packet processing related configuration settings of the resource groups, the number of traffic sources etc. for which fast-path packet processing nodes may have to be set up, etc. In some embodiments, as mentioned earlier, e.g., in the context of FIG. 19, extensions of the data planes of a virtualized computing service (VCS) and a server-less packet processing service (SPPS) may be logically and/or physically linked—e.g., the sets of resources used for both types of extensions may be co-located. In at least one such embodiment, a programmatic request submitted to the VCS control plane to establish a VCS extension resource group (VCS ERG) may also include a parameter indicating that a corresponding SPPS resource group is to be established as well—in effect, an EstablishSPPS-ERG request 2106 may be incorporated within a request for the VCS ERG.

In various embodiments, after an SPPS ERG has been created, programmatic interactions analogous to those described earlier (e.g., in the context of FIG. 16 and FIG. 17) with respect to pipeline deployment and configuration may be used to establish and use pipelines at the SPPS ERG. For example, a CreateERGBasedAppliance request 2105 indicating the targeted SPPS ERG may be submitted via interfaces 2177 in the depicted embodiment to create an instance of a packet processing appliance, and an ApplianceCreated response 2107 may be transmitted after the appliance is configured using the SPPS ERG. In some embodiments, an ExtendApplianceToERG 2109 request may be submitted to extend the functionality of a packet processing appliance that was created using data plane resources within a provider network data center to a premise outside the provider network at which an SPPS ERG has been established. For example, programs representing the rules and/or actions of a pre-existing pipeline instance set up within the provider network may be transmitted to the external premise in response to an ExtendApplianceToERG request 2109. After the appliance functionality has been extended to the premise, an ApplianceExtended response 2110 may be provided in some embodiments. In at least one embodiments, requests to set up attachments at the SPPS ERGs, activate appliances at the SPPS ERGs, etc., may also be submitted via interfaces 2177.

A Modify-SPPS-ERG request 2113 may be submitted in at least some embodiments to change one or more properties of an SPPS ERG, e.g., to increase the maximum amount of traffic to be handled at the SPPS ERG. After the requested changes are applied (e.g., by configuring additional FFPNs or the like at the SPPS ERG), an SPPS-ERGModified response 2115 may be transmitted to the client 2130. Custom or SPPS-managed exception paths (similar to the exception paths discussed earlier, e.g., in the context of FIG. 15-FIG. 18) may be set up using resources at the external premise, e.g., in response to ConfigureSPPS-ERG-ExceptionPath requests 2116, and the SPPS may transmit ExceptionPathConfigured responses 2118 when the exception paths have been established at the external premises.

In at least some embodiments, the SPPS may collect metrics (e.g., total number of packets processed, rate of packets processed, etc.) associated with various SPPS ERGs, separate from the metrics for SPPS operations performed using in-provider-network data plane resources. To obtain such metrics, a GetSPPS-ERG-Metrics request 2124 may be submitted by a client, indicating the specific ERG or premise for which metrics are to be provided. The requested metrics may be provided via an SPPS-ERG-MetricSet message 2126 in such embodiments. Other types of programmatic interactions related to SPPS extensions may be supported in at least some embodiments than those shown in FIG. 21.

Methods for Implementing Server-Less Packet Processing Services

Figure 22:
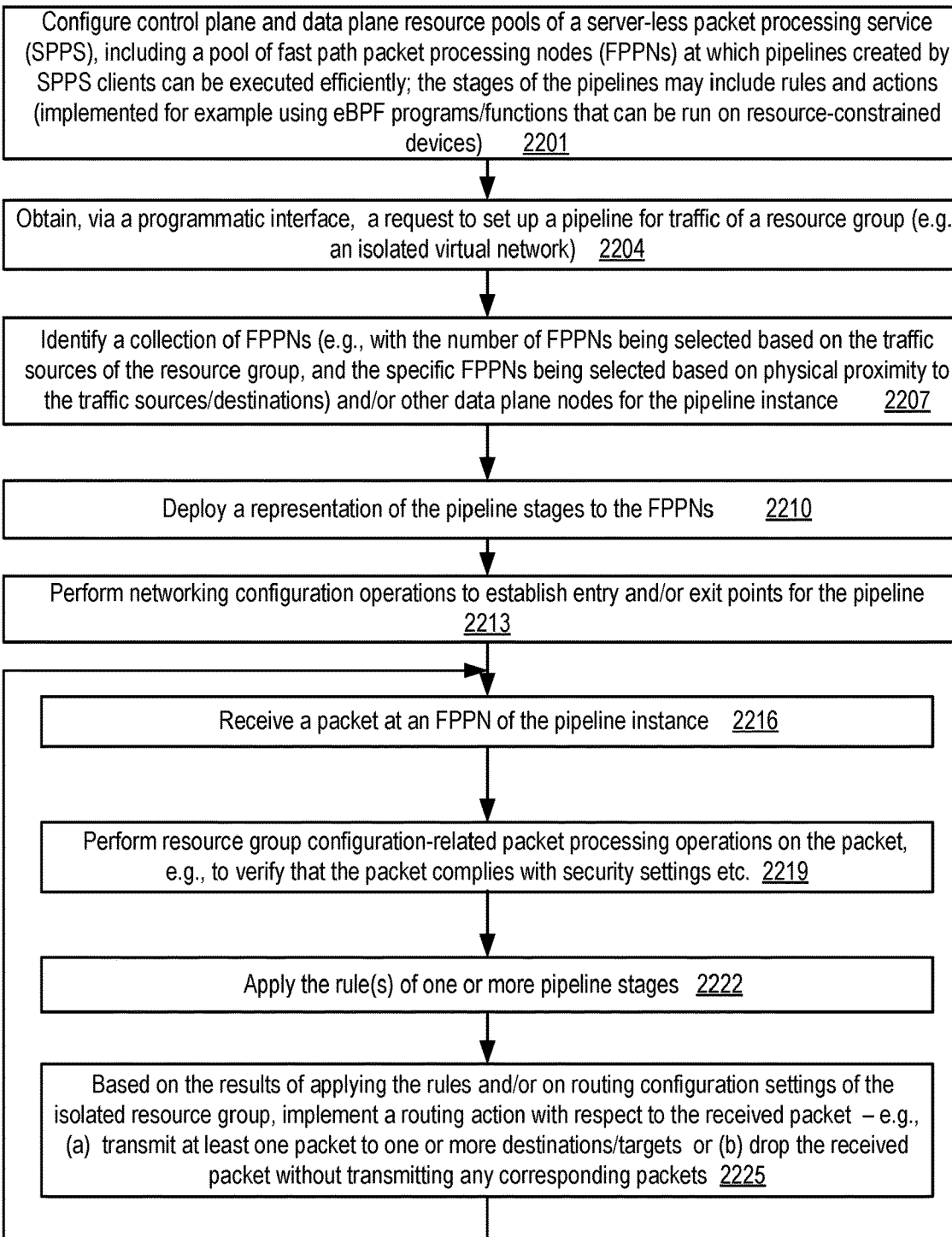
FIG. 22 is a flow diagram illustrating aspects of operations that may be performed to implement packet processing pipelines that are integrated with isolated virtual network configurations, according to at least some embodiments.

FIG. 22 is a flow diagram illustrating aspects of operations that may be performed to implement packet processing pipelines that are integrated with isolated virtual network configurations, according to at least some embodiments. As shown in element 2201, pools of resources may be configured for control plane and data plane operations of a server-less packet processing service (SPPS) similar in functionality to SPPS 120 of FIG. 1. The data plane may for example include a pool of fast path packet processing nodes (FPPNs) at which the majority of packets of various flows are processed, as well as a pool of slower-path packet processing nodes (SPPNs) at which a subset of packets of one or more flows may be processed before representations of the operations to be performed for remaining packets of the flow are transmitted for caching at the FPPNs. In various embodiments, the FPPNs may be configured to efficiently execute programs corresponding to one or more stages (each with one or more rules and/or actions) of a packet processing pipeline of the kind discussed earlier. At least a portion of the logic of a given stage may be implemented using eBPF programs or functions in some embodiments, or other similar programs that can be run in a relatively constrained environment (e.g., with programs being limited in the maximum number of instructions, the memory that can be used, and so on).

A request to set up a pipeline instance (which may also be termed an instance of a packet processing appliance) for traffic of a resource group such as an isolated virtual network (IVN) may be received via a programmatic interface (element 2204), e.g., at control plane resources of the SPPS from a networking application vendor or designer. A collection of data plane resources, including a set of FPPNs of the previously-established pool may be identified for the pipeline instance (element 2207). In at least some embodiments, the number of FFPNs may be determined based on configuration information of the resource group, such as the number of compute instances, virtualization hosts or other traffic sources of the resource group. In one embodiment, the specific FPPNs to be used for the pipeline instance may be selected based on physical proximity to the traffic sources and/or destinations of the pipeline instance.

A representation of the pipeline stages (e.g., comprising executable programs that can be run using eBPF engines and associated lookup tables at the FPPNs) may be deployed/transmitted to the selected FPPNs in various embodiments (element 2210). In addition, one or more entry points and/or exit points of the pipeline instance or appliance instance may be set up, for example using one or more networking configuration operations such as operations to establish virtual network interfaces (VNIs) (element 2213). In some embodiments, the entry and/or exit points may be set up in response to one or more attachment requests of the kind discussed earlier. In one embodiment, a programmatic request to activate the instance of the pipeline may also be submitted before traffic is directed to the instance.

A network packet may be received from one of the traffic sources of the pipeline instance at an entry point and directed to a particular FPPN (element 2213), e.g., using a shuffle-sharding algorithm in some embodiments. One or more resource group configuration related packet processing operations, e.g., corresponding to one or more security settings of the group, may be performed in the depicted embodiment with respect to the received packet (element 2216). In some embodiments, a separate pipeline may be executed for such resource group configuration related packet processing, while in other embodiments a single integrated pipeline that includes such operations as well as application vendor specified operations may be implemented. One or more rules of one or more pipeline stages may be applied to the received packet (element 2222). Based at least in part on the results of the rules and/or in part on routing related configuration settings of the resource group, a routing action may be implemented with respect to the received packet. For example, one or more packets corresponding to the received packet (e.g., rewritten versions of the received packet) may be sent to one or more destinations or targets, or the packet may simply be dropped without transmitting any corresponding packets, in the depicted embodiment (element 2225). Operations corresponding to elements 2216 onwards may be performed for subsequent packets as well.

Figure 23:
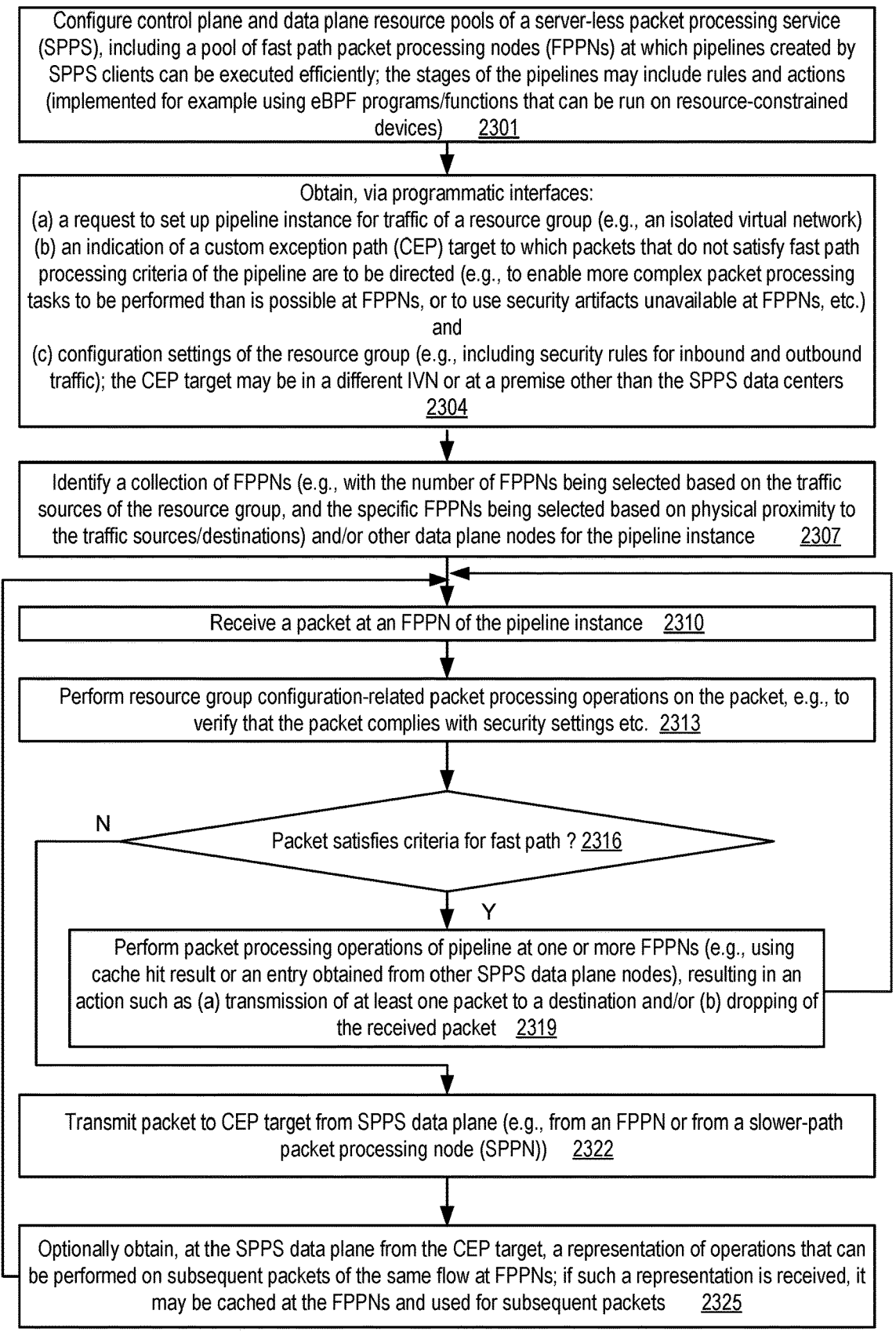
FIG. 23 is a flow diagram illustrating aspects of operations that may be performed to implement custom exception paths for packet processing pipelines, according to at least some embodiments.

FIG. 23 is a flow diagram illustrating aspects of operations that may be performed to implement custom exception paths for packet processing pipelines, according to at least some embodiments. As shown in element 2301, pools of resources may be configured for control plane and data plane operations of a server-less packet processing service (SPPS) similar in functionality to SPPS 120 of FIG. 1, including a pool of fast path packet processing nodes (FPPNs). In various embodiments, the FPPNs may be configured to efficiently execute programs corresponding to one or more stages (each with one or more rules and/or actions) of a packet processing pipeline of the kind discussed earlier. At least a portion of the logic of a given stage may be implemented using eBPF programs or functions in some embodiments, or other similar programs that can be run in a relatively constrained environment (e.g., with programs being limited in the maximum number of instructions, the memory that can be used, and so on). As such, while the FPPNs may be extremely efficient for numerous classes of packet processing operations, they may be inappropriate for more complex or more resource-intensive packet processing tasks in at least some embodiments.

A request to set up a pipeline instance for traffic of a resource group such as an IVN may be received via one or more programmatic interface at the SPPS (element 2304). In at least some embodiments, while the request may provide rules and/or actions (e.g., in the form of eBPF program code) for the pipeline stages, the request may not specify resources to be used for fast path packet processing at one or more stages of the pipeline; that is, the SPPS may be responsible for assigning FPPNs for the stages. In addition, an indication of a custom exception path (CEP) processing target (e.g., one or more computing devices) to which packets that do not satisfy fast path processing criteria of the pipeline are to be directed may also be received via the programmatic interfaces in the depicted embodiment. The CEP target may be responsible for performing one or more operations on received packets in various embodiments, including for example operations that cannot be performed at the FPPNs or operations that the pipeline designer has decided should not be performed at the FPPNs. The CEP target may have fewer restrictions than the FPPNs with respect to the kinds of operations that can be performed—e.g., longer and more complex programs may be run using more powerful computational resources than are available at the FPPNs, more programming languages may be supported, more memory may be available, and so on. In effect, the CEP target may be configured in some embodiments to perform packet processing operations whose usage with respect to a particular resource exceeds a resource usage limit of an FPPN. In at least some embodiments the CEP target may have permission to access one or more security artifacts (such as cryptographic keys) that may be used for some types of packet processing tasks, including for example terminating secure communication sessions and the like, and such security artifacts may not be accessible from the FPPNs themselves. In at least one embodiment, the operations performed at a CEP target on a received packet may include examining contents of the body portion of the received packet (in addition to or instead of examining the header portion of the packet), while the operations performed at the FPPNs may only access the headers of received messages and may not even read the body portions. In one embodiment, the CEP target may perform encryption/decryption of packets, whereas FPPNs may not be able to perform such cryptographic operations due to the complexity of the computations involved, and/or because the FPPNs are not provided the requisite cryptographic artifacts needed for the encryption or decryption operations.

In at least one embodiment, a number of different IVNs may participate in the packet processing application: e.g., one or more IVNs may comprise compute instances that are sources/destinations of the traffic to be processed, another IVN may be used for SPPS data plane nodes including FPPNs and yet another may be used for the CEP target. In some embodiments, a CEP target may be located at a premise other than the data centers used for the SPPS data plane or control plane—e.g., a data center of an application vendor may be used to house the CEP target. In at least one embodiment, a pool of CEP targets may be indicated to the SPPS, from which a particular CEP target may be selected at the FPPNs, e.g., based on client-specified criteria, or at random. In various embodiments, a network address (e.g., an IP address) may be provided for a CEP target in the request to configure the CEP target. Programmatic interfaces may also be used at the SPPS to obtain (e.g., from a control plane of a virtualized computing service) configuration settings of the resource group, including security rules for inbound and outbound traffic, routing rules, and so on.

In response to the request for the pipeline instance, a collection of FPPNs may be identified and assigned to perform packet processing resources of the traffic associated with the resource group in the depicted embodiment (element 2307). Techniques similar to those discussed above may be used to determine the number of FPPNs, and select the specific FPPNs from the pre-configured pools in various embodiments—e.g., the number may be based on the count of traffic sources and/or destinations, and the specific SPPNs may be selected based on physical proximity to the source and/or destinations. Other data plane resources (e.g., slower-path packet processing nodes) may also be assigned to the pipeline instance, and connectivity between the CEP target and the SPPS data plane may be established/verified in the depicted embodiment.

When a packet from one of the traffic sources is received at an FPPN of the pipeline instance (element 2310), in at least some embodiments one or more resource group configuration-related packet processing operations may first be performed, e.g., to ensure that the packet complies with the resource group's security settings or the like (element 2313). If the packet does not satisfy the configuration related requirements of the resource group, in at least some embodiments the packet may be dropped. In some embodiments the configuration related operations corresponding to element 2310 may be part of the same packet processing pipeline for which a programmatic request was obtained in operations corresponding to element 2304.

A determination may be made as to whether the packet satisfies one or more criteria for fast path packet processing in the depicted embodiment (element 2316). For example, if a cache of an FPPN contains an entry indicating that one or more operations can be performed at the FPPN itself to process the packet, this may indicate that the fast path processing criteria are satisfied in some embodiments. In some embodiments, it may be the case that the cache does not include an entry, but an entry may be obtained from another SPPS data plane node, such as a slower-path packet processing node of the kind discussed earlier without requiring the participation of the CEP target. If the fast path criteria are met, either as a result of a cache hit at the FPPN or as a result of a cache miss that is satisfied from within the SPPS data plane, the packet processing operations may be performed at the FPPN layer in the depicted embodiment (element 2319). Depending at least in part on the results of the packet processing operations, a final routing-related action to conclude the processing of the received packet may be identified and performed. For example, in some cases one or more packets may be transmitted towards a destination, while in other cases, the received packet may simply be dropped without sending any corresponding packets towards a destination.

If, however, the criteria for fast path are not satisfied (as also determined in operations corresponding to element 2316), the packet may be transmitted to the CEP target from an SPPS data plane node (e.g., either from an FPPN or from a slower-path packet processing node), as indicated in element 2322. One or more packet processing operations may be performed at the CEP target with respect to the received packet in various embodiment. Optionally, in some embodiments, after the CEP target has processed the packet sent from the SPPS data plane, a representation of packet processing operations which can be performed for subsequent packets of the flow to which the packet belongs may be sent to the SPPS data plane from the CEP target (element 2325). If such a representation is obtained at the SPPS data plane, it may be stored at one or more FPPN caches and used later for other packet of the flow. Operations corresponding to elements 2310 onwards may be repeated for other packet received at the FPPNs assigned to the pipeline instance in various embodiments.

In some embodiments, as indicated earlier, e.g., in the context of FIG. 15, FIG. 17, and FIG. 18, at least some exception path resources may be managed by the SPPS—e.g., the SPPS control plane may automatically instantiate additional resources for an exception path based on the analysis of one or more metrics (e.g., metrics indicating the number of traffic sources for a pipeline, or the number of packets processed during a time interval at the existing exception path resources). In contrast, in at least some embodiments, CEP resources may be managed by the clients on whose behalf the corresponding pipeline instances were established—e.g., the clients may be responsible for analyzing metrics, scaling up (or down) CEP resources as needed, and so on.

Figure 24:
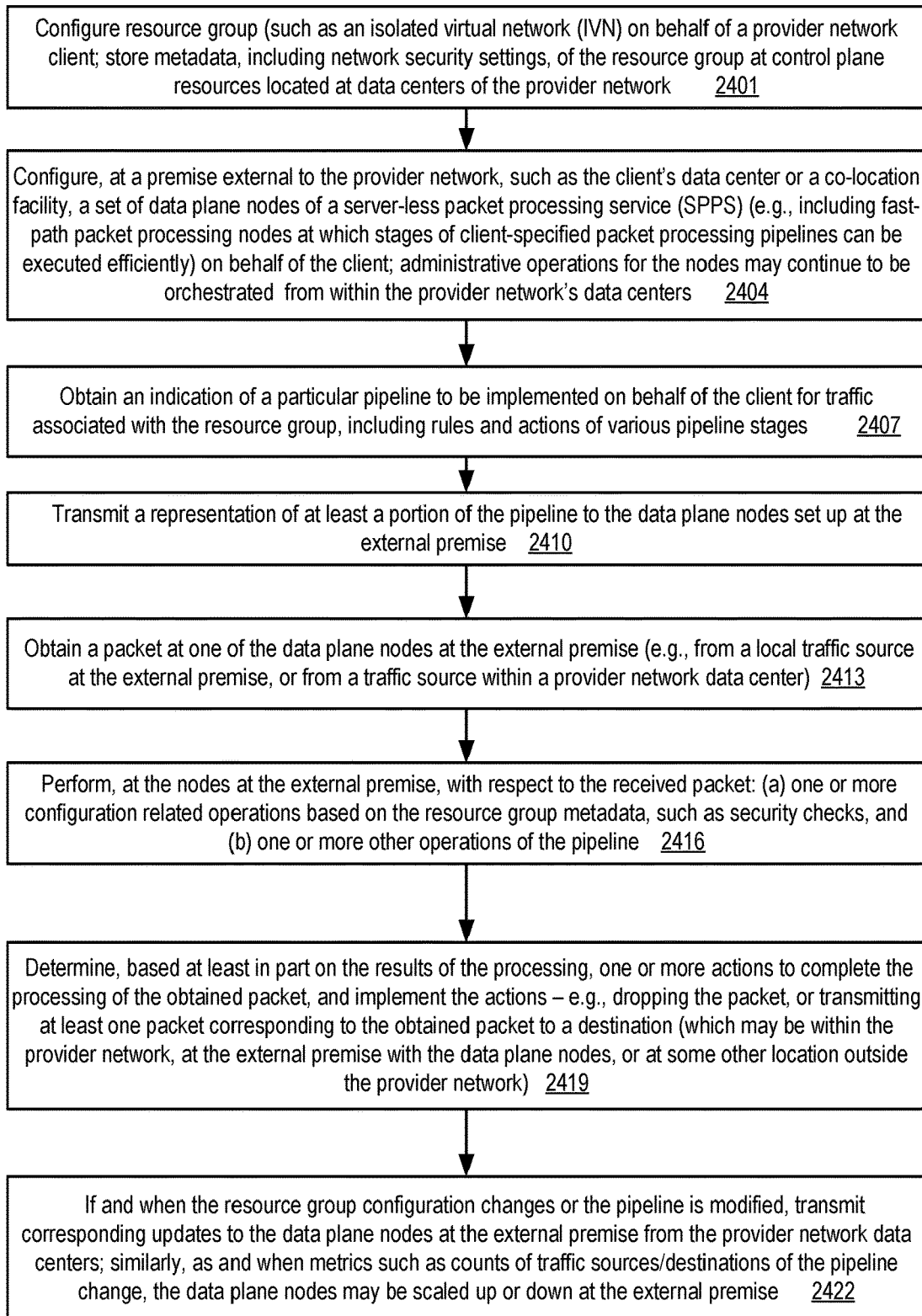
FIG. 24 is a flow diagram illustrating aspects of operations that may be performed to support extensions of packet processing services outside a provider network's data centers, according to at least some embodiments.

FIG. 24 is a flow diagram illustrating aspects of operations that may be performed to support extensions of packet processing services outside a provider network's data centers, according to at least some embodiments. As shown in element 2410, a resource group such as an isolated virtual network (IVN) similar to the IVNs discussed earlier may be configured on behalf of a provider network client. Metadata of the resource group, including at least some network security-related settings, may be stored at a control plane repository within data centers of the provider network. In at least some embodiments, the resource group may be set up using the resources of a virtualized computing service (VCS), with the metadata being stored at VCS control plane servers within the provider network. In at least one embodiment, the VCS's data plane may be extended (e.g., using VCS data plane extension resource groups similar to ERGs 1935 shown in FIG. 19) to one or more premises outside the provider network's data centers. Using such remote resources, in at least some embodiments the IVN set up on behalf of the client may also be extended to the premises, with a number of compute instances being configured at the remote premises on behalf of the client. In other embodiments, such VCS data plane extension resource groups may not necessarily be established.

As shown in element 2404, a set of data plane nodes of a server-less packet processing service (SPPS) similar in functionality of SPPS 102 may be configured on behalf of the client at a premise outside the provider network, such as a client's data center or a co-location facility. The SPPS data plane nodes set up at the external premise may include, for example, one or more fast path packet processing nodes (FPPNs), slower-path packet processing nodes, state information repository nodes, and the like, similar to the data plane components shown in FIG. 2. The FPPNs may, for example be configured to efficiently apply rules and perform actions corresponding to various stages of packet processing pipelines similar to those introduced earlier. In some embodiments in which a VCS data plane extension resource group has been set up at a premise external to the provider network, the same external premise may be used for housing the SPPS data plane nodes, in effect setting up an extension resource group of the SPPS that is co-resident with the VCS extension resource group. Note that control plane or administrative operations associated with the data plane nodes may continue to be initiated from and orchestrated at the provider network data centers in various embodiments—e.g., configuration related commands may be transmitted to the external premise from SPPS control plane resources within the provider network via secure communication channels in such embodiments.

An indication of a particular packet processing pipeline to be implemented with respect to traffic associated with the resource group may be obtained, e.g., at the SPPS control plane via a programmatic interface (element 2407). Rules and/or actions of one or more stages of the pipeline (expressed for example using eBPF or a similar framework for efficient packet processing) may be defined via the programmatic interface in at least some embodiments.

A representation of at least a portion of the pipeline may be transmitted from the provider network data centers to the SPPS data plane nodes at the external premise (element 2410). In at least some embodiments, an instance of an appliance corresponding to the pipeline may be established, and a set of FPPNs may be configured for the instance (e.g., with the number of FPPNs being selected based on the number of traffic sources and/or destinations). One or more entry points and/or exit points for the pipeline may be set up at the external premise as well, e.g., in response to additional programmatic requests similar to the attachment related requests discussed earlier. In at least one embodiment, a given pipeline may include some data plane nodes within the provider network data centers and some data plane nodes at the external premise. The instance of the appliance or pipeline may be activated, e.g., networking configuration changes that cause traffic to be directed to an entry point of the pipeline may be made in various embodiments at the initiative of the SPPS control plane and/or the VCS control plane.

A network packet may be obtained, received or detected at a particular data plane node at the external premise (element 2413). Depending on the nature of the application being implemented using the pipeline, the packet may originate at a traffic source at the provider network, or at a local traffic source at the external premise. At least two types of operations may be performed with respect to the obtained packet in the depicted embodiment (element 2416): (a) security checks and/or other operations required by the configuration settings of the resource group, and (b) operations corresponding to pipeline stages that are not related to the resource group's configuration.

Based at least in part on the results of such packet processing, one or more routing-related actions to be performed to complete the processing of the obtained packet may be performed. For example, one or more packets corresponding to the processed packet (e.g., re-written versions of the processed packet) may be transmitted on a path towards a destination, or the packet may be dropped, in the depicted embodiment (element 2419). The destination may be, for example, within the provider network data centers, at the external premise at which the SPPS data plane nodes are located, or at some other external premise, depending on the specific application being implemented. If and when the resource group configuration changes or the pipeline is modified, corresponding updates may be transmitted to the data plane nodes at the external premise from the provider network data centers (element 2422). Similarly, as and when changes to metrics such as counts of traffic sources/destinations of the pipeline are detected, the data plane nodes may be scaled up or down at the external premise in at least some embodiments.

It is noted that in various embodiments, at least some operations other than those illustrated in the flow diagrams of FIGS. 22, 23 and 24 may be used to implement the packet processing techniques described above. Some of the operations shown may not be implemented in some embodiments or may be implemented in a different order, or in parallel rather than sequentially.

Use Cases

The techniques described above for implementing an extensible and customizable server-less packet processing service (SPPS) may be extremely beneficial in a variety of scenarios. As more and more distributed applications are migrated to provider network environments, especially environments in which isolated virtual networks (IVNs) are established for different clients, the need for efficient and fault-tolerant management of packet processing operations that also take IVN configuration requirements into account is also increasing. By eliminating the need for vendors as well as users of packet processing operations to make requests to allocate packet processing nodes, an SPPS may simplify client administrative workload substantially. The clean separation of function between a layer of fast path processing nodes and other slower-path processing nodes may enable the rollout of improved functionality or additional nodes at each layer without affecting the work being done at the other layer. The support for custom exception path processing may allow application vendors to design and deploy sophisticated applications that are not restricted to utilizing provider network resources alone. Extensions of the SPPS data plane to premises outside provider network data centers, while retaining much of the SPPS control plane functionality within the data centers, may provide the ideal combination of security and low latency for packet processing. For example, some portions of a given application may be run using proprietary resources of an SPPS client at the client's data centers, and the packets generated at the proprietary resources may be processed with very low latencies using SPPS nodes configured at the client's data center before being forwarded to their intended destinations. A wide variety of client-selected packet processing pipelines may be implemented using the described techniques, including for example virtual routing applications, intrusion detection operations and the like. The overall responsiveness of applications that utilize the packet processing operations may be improved, e.g., by quickly adding packet processing resources as the number of traffic sources increases.

Illustrative Computer System

Figure 25:
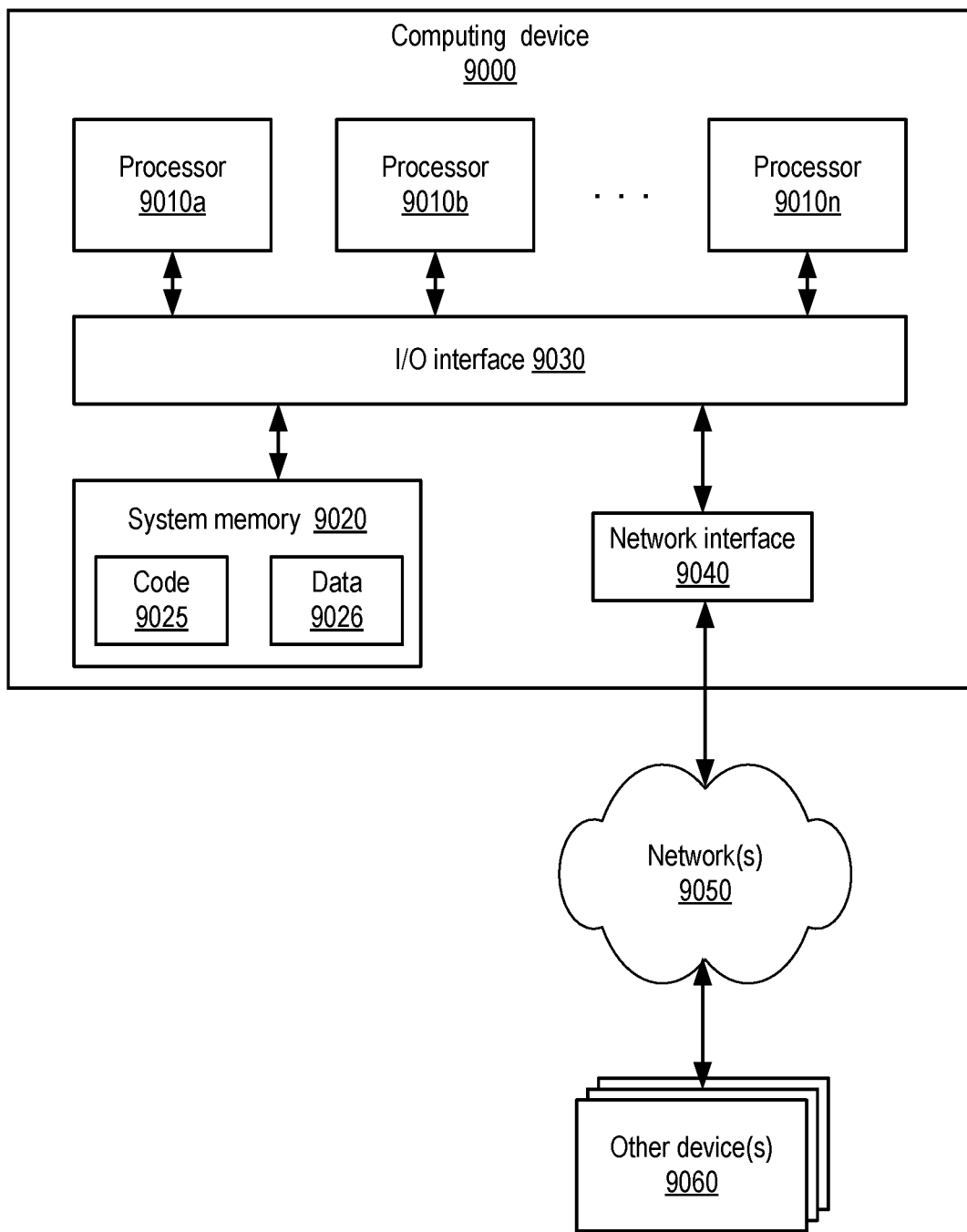
FIG. 25 is a block diagram illustrating an example computing device that may be used in at least some embodiments.

In at least some embodiments, a server that implements a portion or all of one or more of the technologies described herein, including various components of a packet processing service, a virtualized computing service and the like may include a general-purpose computer system that includes or is configured to access one or more computer-accessible media. FIG. 25 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030. In at least some embodiments computing device 9000 may include a motherboard to which some or all of such components may be attached.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 24, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 24 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 25 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across one or more processors cause the one or more computing devices to:
obtain, via one or more programmatic interfaces:
(a) a request for a packet processing pipeline to be implemented for at least a subset of packets sent from or to a first isolated virtual network, the first isolated virtual network configured on behalf of a first client of a network-accessible service, wherein the request does not indicate fast path packet processing nodes to be used for the pipeline;

(b) an indication of an exception path target configured to perform at least one operation on a packet sent from or to the first isolated virtual network which does not satisfy a criterion for fast path processing at the packet processing pipeline; and (c) one or more security requirements of the first isolated virtual network;

in response to obtaining the request, identify a collection of fast path packet processing nodes to implement at least a portion of the requested packet processing pipeline according to the obtained criterion for fast path processing and the obtained one or more security requirements of the first isolated virtual network;

in response to (a) receiving a first packet at the collection of fast path packet processing nodes and (b) determining by the collection of fast path packet processing nodes that the first packet satisfies the one or more security requirements and the criterion for fast path processing, perform one or more packet processing operations of the packet processing pipeline at one or more fast path packet processing nodes of the collection; and in response to (a) receiving a second packet at the collection and (b) determining by the collection that the second packet satisfies the one or more security requirements and does not satisfy the criterion for fast path processing, transmit, over a network from a particular fast path packet processing node of the collection, the second packet to the exception path target.

2. The system as recited in claim 1, wherein the first isolated virtual network is configured at one or more data centers, wherein the collection of fast path processing nodes is configured within a second isolated virtual network, and wherein the exception path target comprises one or more of: (a) a computing device in a third isolated virtual network, or (b) a computing device located at a premise external to the one or more data centers.

3. The system as recited in claim 1, wherein the second packet belongs to a particular packet flow, and wherein the one or more computing devices include further instructions that upon execution on or across one or more processors further cause the one or more computing devices to:

obtain, at a particular fast path packet processing node subsequent to the transmission of the second packet, an indication of one or more additional packet processing operations to be performed for subsequent packets of the particular packet flow;

cache, at the particular fast path packet processing node, an executable version of the one or more additional packet processing operations; and perform, at the particular fast path packet processing node using the executable version, the one or more additional packet processing operations on one or more subsequent packets of the particular packet flow.

4. The system as recited in claim 1, wherein a fast path packet processing node of the collection has a resource usage limit, and wherein the exception path target is configured to perform a packet processing operation whose resource usage exceeds the resource usage limit.

5. The system as recited in claim 1, wherein the exception path target is configured to perform one or more of: (a) a decryption operation on a packet or (b) an encryption operation on the packet.

6. A method, comprising:

performing, at one or more computing devices:

obtaining (a) an indication of an exception path target of a packet processing pipeline, wherein the packet processing pipeline is to be implemented for at least a subset of packets sent from or to a resource group and (b) one or more configuration settings of the resource group;

in response to (a) receiving a first packet at a collection of fast path packet processing nodes configured for the packet processing pipeline and (b) determining by the collection of fast path packet processing nodes that the first packet satisfies one or more requirements of the configuration settings and a criterion for fast path processing, performing one or more packet processing operations of the packet processing pipeline at one or more fast path packet processing nodes of the collection; and in response to (a) receiving a second packet at the collection of fast path packet processing nodes and (b) determining by the collection of fast path packet processing nodes that the second packet does not satisfy the criterion for fast path processing, transmitting by one of fast path packet processing nodes the second packet over a network to the exception path target.

7. The method as recited in claim 6, wherein the second packet belongs to a particular packet flow, the method further comprising performing, at the one or more computing devices:

obtaining, at the particular fast path packet processing node from the exception path target, subsequent to said transmitting the second packet, an indication of one or more additional packet processing operations to be performed for subsequent packets of the particular packet flow;

caching, at the particular fast path packet processing node, an executable version of the one or more additional packet processing operations; and performing, at the particular fast path packet processing node using the executable version, the one or more additional packet processing operations on one or more subsequent packets of the particular packet flow.

8. The method as recited in claim 6, wherein a packet processing node of the collection has a resource usage limit, and wherein the exception path target is configured to perform a packet processing operation whose resource usage exceeds the resource usage limit.

9. The method as recited in claim 8, wherein the resource usage limit comprises one or more of: (a) a memory limit, (b) a compute resource limit, or (c) a program instruction count limit.

10. The method as recited in claim 6, further comprising performing, by the one or more computing devices:

accessing, by the exception path target a security artifact to perform one or more operations associated with the second packet, wherein the security artifact is inaccessible at the one or more fast path packet processing nodes.

11. The method as recited in claim 6, further comprising performing, at the one or more computing devices:

examining, at the exception path target, contents of a body of the second packet, wherein packet processing operations performed at the one or more fast path packet processing nodes (a) include reading contents of one or more headers of network packets and (b) do not include reading contents of bodies of network packets.

12. The method as recited in claim 6, further comprising performing, at the one or more computing devices:
automatically instantiating, by a control plane component of a packet processing service based on analysis of one or more metrics, an additional exception path target resource.

13. The method as recited in claim 6, wherein determining that the second packet does not satisfy the criterion for fast path processing comprises determining that a cache stored at the one or more fast path packet processing nodes does not include an entry indicating an executable program to be implemented to perform a packet processing operation.

14. The method as recited in claim 6, further comprising performing, at the one or more computing devices:
obtaining, via a programmatic interface, program code representing a packet processing operation of the one or more packet processing operations performed with respect to the first packet at a fast path processing node.

15. The method as recited in claim 6, further comprising performing, at the one or more computing devices:
causing, at the exception path target, execution of at least a portion of one or more of: (a) a custom routing algorithm, (b) a network address translation algorithm, (c) a multicast algorithm, (d) a source substitution algorithm, (e) an algorithm for transmitting packets from one isolated virtual network of a virtualized computing service to another isolated virtual network, (f) an algorithm for transferring data securely to or from a virtual private network, (g) an intrusion detection algorithm, (h) a bandwidth usage tracking algorithm, (i) a load balancing algorithm, (j) an algorithm for secure transmission of data between a provider network data center and a premise external to the provider network, (k) a data exfiltration detection algorithm, (l) a secure session termination protocol, or (l) a proprietary algorithm implementing business logic of an application.

16. One or more non-transitory computer-accessible storage media storing program instructions that when executed on or across one or more processors cause one or more computer systems to:
obtain (a) an indication of one or more packet processing operations to be implemented for at least a subset of packets sent from or to a resource group and (b) one or more configuration settings of the resource group;
in response to (a) receiving a first packet at a collection of fast path packet processing nodes configured for the resource group, (b) determining by the collection of fast path packet processing nodes that the first packet satisfies one or more requirements indicated in the one or more configuration settings and (c) determining by the collection of fast path packet processing nodes that the first packet satisfies a criterion for fast path processing, perform the one or more packet processing operations at one or more fast path packet processing nodes of the collection; and
in response to (a) receiving a second packet at the collection of fast path packet processing nodes and (b) determining by the collection of fast path packet processing nodes that the second packet does not satisfy the criterion for fast path processing, transmit by one of fast path packet processing nodes the second packet over a network to an exception path target.

17. The one or more non-transitory computer-accessible storage media as recited in claim 16, storing further program instructions that when executed on or across one or more processors further cause one or more computer systems to:
obtain, at the particular fast path packet processing node from the exception path target, subsequent to transmitting the second packet, an indication of one or more additional packet processing operations to be performed for subsequent packets of a particular packet flow to which the second packet belongs;
cache, at the particular fast path packet processing node, an executable version of the one or more additional packet processing operations; and
perform, at the particular fast path packet processing node using the executable version, the one or more additional packet processing operations on one or more subsequent packets of the particular packet flow.

18. The one or more non-transitory computer-accessible storage media as recited in claim 16, wherein a fast path packet processing node of the collection has a resource usage limit, and wherein the exception path target is configured to perform a packet processing operation whose resource usage exceeds the resource usage limit.

19. The one or more non-transitory computer-accessible storage media as recited in claim 16, wherein the exception path target is configured to access a security artifact used for processing associated with the second packet, wherein the security artifact is inaccessible at the one or more fast path packet processing nodes.

20. The one or more non-transitory computer-accessible storage media as recited in claim 16, storing further program instructions that when executed on or across one or more processors further cause one or more computer systems to:
examine, at the exception path target, contents of a body of the second packet, wherein packet processing operations performed at the one or more fast path packet processing nodes (a) include reading contents of one or more headers of network packets and (b) do not include reading contents of bodies of network packets.

* * * * *